(12) United States Patent
Uehara

(10) Patent No.: US 8,446,548 B2
(45) Date of Patent: May 21, 2013

(54) LIGHT SOURCE DEVICE, DISPLAY DEVICE, TERMINAL DEVICE, AND TRANSPARENT/SCATTERING STATE SWITCHING ELEMENT

(75) Inventor: Shin-ichi Uehara, Kanagawa (JP)

(73) Assignee: NLT Technologies, Ltd., Kawasaki, Kanagawa (JP)

( * ) Notice: Subject to any disclaimer, the term of this patent is extended or adjusted under 35 U.S.C. 154(b) by 240 days.

(21) Appl. No.: 11/798,941

(22) Filed: May 17, 2007

(65) Prior Publication Data

US 2007/0268427 A1    Nov. 22, 2007

(30) Foreign Application Priority Data

May 19, 2006 (JP) ................................ 2006-140676

(51) Int. Cl.
*G02F 1/1333* (2006.01)
(52) U.S. Cl.
USPC ............................................................ 349/86
(58) Field of Classification Search
USPC ............................................................ 349/86
See application file for complete search history.

(56) References Cited

U.S. PATENT DOCUMENTS

| | | | | |
|---|---|---|---|---|
| 5,146,355 A | * | 9/1992 | Prince et al. | 349/71 |
| 5,680,185 A | * | 10/1997 | Kobayashi et al. | 349/88 |
| 7,551,239 B2 | | 6/2009 | Fukushima et al. | |
| 2004/0036822 A1 | * | 2/2004 | Yamazaki et al. | 349/86 |

FOREIGN PATENT DOCUMENTS

| | | |
|---|---|---|
| JP | 2-109018 A | 4/1990 |
| JP | 05-072529 | 3/1993 |
| JP | 5-142530 A | 6/1993 |
| JP | 5-159612 A | 6/1993 |
| JP | 5-297372 A | 11/1993 |
| JP | 8-194211 A | 7/1996 |
| JP | 09-244018 | 9/1997 |
| JP | 2002-208307 A | 7/2002 |
| JP | 2005-221756 A | 8/2005 |

OTHER PUBLICATIONS

Notification of Reasons for Rejection dated Feb. 14, 2012, with partial English-language translation.

* cited by examiner

*Primary Examiner* — Mark Robinson
*Assistant Examiner* — Erin Chiem
(74) *Attorney, Agent, or Firm* — McGinn IP Law Group, PLLC

(57) ABSTRACT

A light source device has a transparent/scattering state switching element for switching the range of irradiation angles, and liquid crystal molecules and dichroic dye molecules are dispersed in a polymer matrix in the PDLC layer of the transparent/scattering state switching element. The range of irradiation angles can thereby be switched, and the color can be prevented from changing when the radiation angle is switched.

9 Claims, 38 Drawing Sheets

LIGHT SOURCE DEVICE, DISPLAY DEVICE, TERMINAL DEVICE, AND TRANSPARENT/SCATTERING STATE SWITCHING ELEMENT

BACKGROUND OF THE INVENTION

1. Field of the Invention

The present invention relates to a light source device capable of switching the radiation angle of illuminating light, to a display device provided with this light source device and capable of switching the angle range of visibility, to a terminal device equipped with this display device, and to a transparent/scattering state switching element built into the light source device.

2. Description of the Related Art

Because of their thin profile, light weight, small size, low energy consumption, and other advantages, display devices that use liquid crystals have been widely deployed and used in a range of devices that includes monitors, televisions (TV: Television), and other large terminal devices; notebook-type personal computers, cash dispensers, vending machines, and other mid-sized terminal devices; and personal TVs, PDAs (Personal Digital Assistance: personal information terminal), mobile telephones, mobile gaming devices, and other small terminal devices. These liquid crystal display devices can be generally classified as transmissive, reflective, or transflective (using transmitted light and reflected light jointly) according to the type of light source used. Energy consumption can be reduced in the reflective type, since external light can be utilized in the display device, but contrast and other aspects of display performance are inferior compared to the transmissive type. Therefore, transmissive and transflective liquid crystal display devices are currently in the mainstream. In transmissive and transflective liquid crystal display devices, a light source is installed on the back surface of a liquid crystal panel, and a display is created using the light emitted by the light source. Specifically, a light source that is separate from the liquid crystal panel is essential in current mainstream liquid crystal display devices.

In the liquid crystal panel that is the primary component of a liquid crystal display device, information is displayed by using an electric field to control the orientation of liquid crystal molecules, and numerous modes have been proposed according to the combination of the type and initial orientation of the liquid crystal molecules, the direction of the electric field, and other characteristics. Among these modes, the modes most often used in a conventional terminal device include an STN (Super Twisted Nematic) mode using a simple matrix structure, and a TN (Twisted Nematic) mode using an active matrix structure. However, a liquid crystal panel that uses these modes has a narrow range of angles in which contrasts can be correctly distinguished, and grayscale inversion occurs outside the optimum viewing position.

This problem of grayscale inversion was relatively insignificant in mobile telephones and other terminal devices when the display content consisted mainly of telephone numbers and other characters. However, with recent technological development, terminal devices have come to display not only text information, but also large amounts of image information. The visibility of images is therefore severely reduced by grayscale inversion. Liquid crystal panels that use a mode having a wide range of angles at which contrast can be correctly distinguished without the occurrence of grayscale inversion are therefore gradually being installed in terminal devices. Liquid crystal panels having this type of mode are referred to generically as wide-viewing-angle liquid crystal panels, and IPS (In-Plane Switching) modes and other horizontal field modes, multi-domain vertical alignment modes, and the like are applied therein. Since gradation can be correctly distinguished in a wide range of angles by using these wide-viewing-angle liquid crystal panels, even though a medium-sized terminal device is basically a personal tool, applications for sharing information with others that can be appreciated by multiple people simultaneously are gradually being developed and installed.

On the other hand, medium-sized terminal devices are characteristically used not only in closed rooms under tight security, but also in public places. It then becomes important to keep displays of private information and confidential information from being viewed by a third party. Particularly in recent years, occasions where private information and confidential information are displayed have increased in conjunction with the development of terminal devices, and demand for techniques for preventing surreptitious viewing is increasing. There is therefore a desire to develop a technique capable of preventing surreptitious viewing, and to enable the display to be viewed only by the user by narrowing the range of angles in which the display is visible; specifically, by narrowing the range of viewing angles.

As described above, a display having a wide range of viewing angles that can be appreciated by multiple people simultaneously, and a display having a narrow range of viewing angles that can be viewed only by the user are both desired. The ability to switch between these two types of displays in a single terminal device is also desired. Therefore, in order to satisfy such requirements, a display device has been proposed in which the light source essential to the liquid crystal display device is designed so that the range of viewing angles can be changed.

FIG. 1 is a schematic sectional view showing the first conventional viewing-angle-controlled liquid crystal display device described in Japanese Patent Application Kokai Publication No. 5-72529. As shown in FIG. 1, the first conventional viewing-angle-controlled liquid crystal display device 1001 is composed of a liquid crystal element 1170 that is capable of controlling scattering; and a liquid crystal element 1180 that is capable of controlling optical rotation and double refraction properties. The liquid crystal element 1170 that is capable of controlling scattering is composed of substrates 1110 and 1111 that are optically transparent in the visible region, transparent electrodes 1120 and 1121, a scattering-mode liquid crystal 1130, a voltage supply source 1100, and a switch 1190. The liquid crystal element 1180 that is capable of controlling optical rotation and double refraction properties is composed of transparent substrates 1111 and 1112 that are optically transparent in the visible region, transparent electrodes 1122 and 1123, polarizing plates 1140 and 1141, orientation films 1150 and 1151, a liquid crystal layer 1160 having optical rotation and double refraction properties, a voltage supply source 1101, and a switch 1191. Polymer-dispersed liquid crystal is used as the scattering liquid crystal 1130, and TN liquid crystal is used as the liquid crystal 1180 that is capable of controlling optical rotation and double refraction properties. The polarizing plates 1140 and 1141 are arranged as a crossed Nicol.

In the first conventional viewing-angle-controlled liquid crystal display device thus configured as described in Japanese Patent Application Kokai Publication No. 5-72529, a voltage is applied between the transparent electrodes 1122 and 1123, whereby the optical rotation and double refraction properties of the liquid crystal layer 1160 are changed, and this change can be used to control the transmittance of light. In this type of display mode that utilizes optical rotation and double refraction properties, the optical rotation and double refraction properties that essentially affect the incident light differ according to the direction of the viewing angle. A phenomenon therefore occurs in which the luminance and chroma are reduced or inverted depending on the viewing angle.

A liquid crystal element 1170 that is capable of controlling scattering is therefore disposed at the top of this type of viewing-angle-dependent liquid crystal element 1180, and the viewing angle dependency is reduced. Specifically, since the liquid crystal molecules are randomly oriented when an electric field is not applied to the liquid crystal 1130 of the liquid crystal element 1170 that is capable of controlling scattering, nearly isotropic scattering occurs throughout the entire range of viewing angles, and a display can be obtained that has little dependency on the viewing angle. When an electric field is applied to the liquid crystal 1130, the liquid crystal molecules orient themselves substantially parallel to the electric field. The light emitted from the liquid crystal element 1180 is therefore emitted without being scattered by the liquid crystal molecules. The visual characteristics do not improve in this case, and the viewing angle characteristics resemble those of a conventional TN liquid crystal, but only a user who is positioned in front of the display can correctly see the image. Accordingly, when the display need only be correctly visible to a single user positioned in front of the display, surreptitious viewing by other people can be prevented by not applying the electric field to the liquid crystal 1130.

FIG. 2 is a schematic sectional view showing the second conventional viewing-angle-controlled liquid crystal display device described in Japanese Patent Application Kokai Publication No. 9-244018; and FIG. 3 is a schematic perspective view showing the illumination device used in this viewing-angle-controlled liquid crystal display device. As shown in FIG. 2, the second conventional viewing-angle-controlled liquid crystal display device 2101 is composed of a liquid crystal display element 2102, a scatter control element (scatter control means) 2103, and an illumination device (backlight) 2104. The scatter control element 2103 is disposed between the liquid crystal display element 2102 and the illumination device 2104. As shown in FIG. 3, the illumination device 2104 is disposed beside the substrate of the scatter control element 2103, and is provided with an opaque slitted sheet (translucent sheet) 2120 and an irradiating unit 2121. A fluorescent tube or other light source 2122 is provided to the irradiating unit 2121, and a light-excident surface 2123 for emitting the light from the light source 2122 and guiding the light to the opaque slitted sheet 2120 is formed. A reflecting sheet 2124 for reflecting the light emitted from the light source 2122 is provided in the irradiating unit 2121 on the surface facing the light-excident surface 2123. In the opaque slitted sheet 2120, a plurality of linear opaque members extending in one direction is arranged parallel to each other on one surface of a translucent sheet. The extension direction of the opaque members coincides with the vertical direction of the display screen.

In the second conventional viewing-angle-controlled liquid crystal display device thus configured as described in Japanese Patent Application Kokai Publication No. 9-244018, the light emitted from the light source 2122 is emitted from the light-excident surface 2123 of the irradiating unit 2121, and is radiated to the scatter control element 2103 via the opaque slitted sheet 2120. When the light emitted from the light-excident surface 2123 passes through the opaque slitted sheet 2120, the opaque slitted sheet 2120 blocks light that is incident from directions that are significantly tilted with respect to the light-incident surface of the opaque slitted sheet 2120. Transmitted light is thereby obtained that is highly parallel to the direction perpendicular to the surface of the opaque slitted sheet 2120. The light emitted from the illumination device 2104 then enters the scatter control element 2103. The scatter control element 2103 controls the scattering properties of the incident light rays according to the presence of an applied voltage. When the scatter control element 2103 is in a scattering state, the light emitted from the illumination device 2104 is scattered by the scatter control element 2103; and when the scatter control element 2103 is in a transparent state, the light from the illumination device 2104 is not scattered.

In the second conventional viewing-angle-controlled liquid crystal display device 2101, the highly collimated light emitted from the illumination device 2104 is scattered by the scatter control element 2103 and caused to enter the liquid crystal display element 2102 when the scatter control element 2103 is in the scattering state. As a result, the light that has passed through the liquid crystal display element 2102 is released in all directions in the viewing angle of the display unit, and it becomes possible to recognize the displayed content also from positions other than the position directly in front of the display unit. In contrast, when the scatter control element 2103 is in the transparent state, the highly collimated light emitted from the illumination device 2104 is caused to enter the liquid crystal display element 2102 while still maintaining a high degree of collimation, without being scattered by the scatter control element 2103. As a result, light is not transmitted to positions where the display unit is viewed at an angle to the left or right in the horizontal direction, the screen is darkened when viewed from such a position, and it becomes impossible to recognize the displayed content. In other words, only an observer who is directly facing the display unit can recognize the displayed content.

As described above, since the scattering properties of the light can be controlled by the scatter control element 2103 in the second conventional viewing-angle-controlled liquid crystal display device 2101, the viewing angle characteristics of the displayed content can be controlled. Furthermore, since highly collimated light can be emitted towards the liquid crystal display element 2102 by the illumination device 2104, it is possible to reliably obtain viewing angle characteristics in which only an observer directly facing the display unit can recognize the displayed content when the scatter control element 2103 is placed in the transparent state. Consequently, it is possible to obtain a liquid crystal display device that is capable of arbitrarily switching between a state in which display characteristics are uniformly maintained in all viewing angle directions with little dependence on viewing angle, and a state in which the displayed content can be recognized only from a position directly facing the display unit.

However, the first and second conventional viewing-angle-controlled liquid crystal display devices described above have such problems as those described below. In the conventional viewing-angle-controlled liquid crystal display devices described above, the color of the image changes when the viewing angle is switched. The displayed image takes on a yellow color that causes discomfort for the user, particularly when the switch is made from narrow-angle display having a narrow range of viewing angles to wide-angle display having a wide range of viewing angles.

SUMMARY OF THE INVENTION

An object of the present invention is to provide a light source device capable of preventing a change in color when the radiation angle is switched, to provide a display device that is equipped with this light source device and is capable of switching the range of viewing angles, to provide a terminal device in which this display device is installed, and to provide a transparent/scattering state switching element built into the light source device.

The light source device according to the present invention comprises a light source for emitting light in a plane; and a transparent/scattering state switching element capable of switching between a transparent state for transmitting light emitted from the light source, and a scattering state for scattering the light; wherein the transparent/scattering state switching element includes a dichroic dye having anisotropic light absorption.

Through the use of a dichroic dye in the present invention, the color of emitted light can be prevented from changing when the transparent/scattering state switching element switches between the transparent state and the scattering state.

The dichroic dye in the transparent/scattering state switching element preferably operates so as to absorb a difference in a wavelength spectrum of transmitted light between a transparent state and a scattering state in a transparent/scattering state switching element that does not include a dichroic dye.

Furthermore, the transparent/scattering state switching element may scatter more light in a specific wavelength region than light outside the specific wavelength region in a scattering state relative to a transmitting state; and the dichroic dye may primarily absorb more light outside the specific wavelength region in a scattering state than in a transmitting state. This configuration makes it possible to suppress a variation in the color of the emitted light between the scattering state and the transparent state, and to cause the emitted light to approach the color of the incident light.

The transparent/scattering state switching element may also scatter more light in a specific wavelength region than light outside the specific wavelength region in a scattering state relative to a transmitting state; and the dichroic dye may primarily absorb more light in the specific wavelength region in a transmitting state than in a scattering state. The color of the light emitted in the transparent state can thereby be caused to approach the color of the light emitted in the scattering state.

Furthermore, the specific wavelength region may be a short-wavelength region of visible light. In a transparent/scattering state switching element in which the scattering state is created by the refractive index distribution of a microstructure, light having a short wavelength tends to be well dispersed, and the present invention can be suitably applied.

The transparent/scattering state switching element may have a polymer-dispersed liquid crystal layer in which regions of liquid crystal molecules are dispersed in a polymer film.

The dichroic dye is preferably present in a region of the liquid crystal molecules. Since the orientation of the dichroic dye can thereby be varied so as to follow the change in liquid crystal orientation when a voltage is applied, the absorption of the dichroic dye can be varied so as to follow the switch between the transparent state and the scattering state, and it is possible to suppress the change in color of the emitted light that accompanies the switching operation.

Furthermore, the dichroic dye may also be present in the polymer film. When a color is imparted to the transparent substrate and/or transparent electrode or other constituent element of the transparent/scattering state switching element, the presence of the dye allows the color to be corrected as well.

A dye having a rod-shaped molecular structure may also be appropriately used as the dichroic dye.

Furthermore, the dichroic dye may have a disk-shaped molecular structure. A color change that occurs in a tilted direction can thereby be effectively corrected.

The dichroic dye may also exhibit a stronger blue color when viewed from a molecular minor axis direction than when viewed from a molecular major axis direction. Since light in a long wavelength band can thereby be absorbed in contrast to scattering of light in a short wavelength band in the scattering state, it is possible to suppress a variation in the color of the emitted light between the scattering state and the transparent state.

Furthermore, the dichroic dye may exhibit a stronger yellow color when viewed from a molecular minor axis direction than when viewed from a molecular major axis direction. The short-wavelength absorption of the dichroic dye in the minor axis direction can thereby utilized to suppress a variation in the color of the emitted light between the transparent state and the scattering state, and the number of usable types of dye can be increased. The cost of the device can therefore be reduced by selecting a highly reliable, low-cost dye material.

Furthermore, the dichroic dye may have an absorption spectrum in wavelength bands that differ between a molecular minor axis direction and a molecular major axis direction. The color correction effects in the scattering state can thereby be reduced, and this effect can be effectively utilized in the case of poor light scattering characteristics.

The polymer-dispersed liquid crystal layer may also be disposed between a pair of planar electrodes, and a vertical electric field may be generated between the pair of planar electrodes in the transparent/scattering state switching element.

Furthermore, the transparent/scattering state switching element may have comb-shaped electrodes, and the transparent/scattering state switching element may be driven by a horizontal electric field generated between the comb-shaped electrodes. This configuration makes it possible to improve the viewing-angle dependency of the color and the scattering characteristics of the transparent state or the scattering state.

A configuration may be adopted in which the liquid crystal molecules in the polymer-dispersed liquid crystal layer have a rod-shaped molecular structure and positive dielectric anisotropy; the refractive index of the polymer film is substantially equal to the refractive index of the liquid crystal molecules in a minor axis direction; the dichroic dye has a rod-shaped molecular structure, and exhibits a stronger blue color when viewed from a molecular minor axis direction than when viewed from a molecular major axis direction; and the polymer-dispersed liquid crystal layer is driven by a vertical electric field. The light emitted from the transparent/scattering state switching element in the scattering state can thereby be prevented from having a yellow color, and the same white color as that of the transparent state can be maintained. A display device can also be obtained that suppresses a change in color between the wide-angle display state and the narrow-angle display state. Yellow coloration of the emitted light can also be prevented in the frontal direction as well as in tilted directions, and significant yellow-reducing effects can be demonstrated in the transparent state in particular.

A configuration may be adopted in which the liquid crystal molecules in the polymer-dispersed liquid crystal layer have a rod-shaped molecular structure and positive dielectric anisotropy; the refractive index of the polymer film is substantially equal to the refractive index of the liquid crystal molecules in a minor axis direction; the dichroic dye has a disk-shaped molecular structure, and exhibits a stronger blue color when viewed from a molecular minor axis direction than when viewed from another direction; and the polymer-dispersed liquid crystal layer is driven by a vertical electric field. The light emitted from the transparent/scattering state switching element in the scattering state can thereby be prevented from having a yellow color, and the same white color as that of the transparent state can be maintained. Furthermore, in the transparent state, a dichroic dye having a disk-shaped structure can demonstrate significant absorption effects on light in tilted directions. Specifically, it is possible to demonstrate more significant yellow-reducing effects in tilted directions.

A configuration may be adopted in which the liquid crystal molecules in the polymer-dispersed liquid crystal layer have a rod-shaped molecular structure and positive dielectric anisotropy; the refractive index of the polymer film is substantially equal to the refractive index of the liquid crystal molecules in a minor axis direction; the dichroic dye has a rod-shaped molecular structure, and exhibits a stronger blue color when viewed from a molecular minor axis direction than when viewed from a molecular major axis direction; the polymer-dispersed liquid crystal layer is driven by a horizontal electric field; and a light-incident surface of the polymer-dispersed liquid crystal layer has a polarizing plate whose transmission axis is disposed in a direction that is perpendicular to an electric field direction in a plane of the transparent/scattering state switching element. The light emitted from the transparent/scattering state switching element in the scattering state can thereby be prevented from having a yellow color, and the same white color as that of the transparent state can be maintained. Furthermore, in the transparent state, scattering and color change can be suppressed even when the display is observed from an angle.

A configuration may be adopted in which the liquid crystal molecules in the polymer-dispersed liquid crystal layer have a rod-shaped molecular structure and positive dielectric anisotropy; the polymer film has refractive index anisotropy; at least the minimum refractive index of the polymer film is substantially equal to the refractive index the liquid crystal molecules in a minor axis direction; the dichroic dye has a rod-shaped molecular structure, and exhibits a stronger blue color when viewed from a molecular minor axis direction than when viewed from a molecular major axis direction; the polymer-dispersed liquid crystal layer is driven by a horizontal electric field; and a light-incident surface of the polymer-dispersed liquid crystal layer has a polarizing plate whose transmission axis is disposed in an electric field direction of the polymer-dispersed liquid crystal layer. The light emitted from the transparent/scattering state switching element in the scattering state can thereby be prevented from having a yellow color, the same white color as that of the transparent state can be maintained, and excellent viewing angle characteristics can be obtained in both the transparent state and the scattering state.

A configuration may be adopted in which the liquid crystal molecules in the polymer-dispersed liquid crystal layer have a rod-shaped molecular structure and positive dielectric anisotropy; the refractive index of the polymer film is substantially equal to the refractive index of the liquid crystal molecules in a major axis direction; the dichroic dye has a rod-shaped molecular structure, and exhibits a stronger yellow color when viewed from a molecular minor axis direction than when viewed from a molecular major axis direction; the polymer-dispersed liquid crystal layer is driven by a horizontal electric field; and a light-incident surface of the polymer-dispersed liquid crystal layer has a polarizing plate whose transmission axis is disposed in an electric field direction of the polymer-dispersed liquid crystal layer. This configuration makes it possible to reduce a difference in the color of emitted light between the scattering state and the transparent state. Since the number of usable types of dye can be increased, the cost of the device can be reduced by selecting a highly reliable, low-cost dye material.

Furthermore, the light source device may comprise a light-direction regulating element for regulating the direction of a light beam emitted from the planar light source unit and emitting the light to the transparent/scattering state switching element. The directivity of light emitted from the planar light source can thereby be increased.

The display device according to the present invention has the light source device, and a transmissive display panel for associating an image with the light by transmitting the light emitted from the light source device.

In the present invention, since the angle range of the light radiated by the light source device can be switched, the viewing angle of the display device can also be switched.

The display panel may also be a liquid crystal panel. In this case, the liquid crystal panel is preferably a horizontal field mode, multi-domain vertical alignment mode, or film-compensated TN mode liquid crystal panel. Grayscale inversion can thereby be minimized in the display, and visibility can be enhanced when the transparent/scattering state switching element is in the scattering state.

The terminal device according to the present invention comprises the display device. The terminal device may be a mobile phone, a personal information terminal, a gaming device, a digital camera, a video camera, a video player, a notebook-type personal computer, a cash dispenser, or a vending machine.

The transparent/scattering state switching element according to the present invention is capable of switching between a transparent state for transmitting incident light without modification, and a scattering state for scattering the light, wherein the transparent/scattering state switching element includes a dichroic dye and operates so as to absorb a difference in a wavelength spectrum of transmitted light that occurs between a transparent state and a scattering state in a transparent/scattering state switching element that does not include a dichroic dye.

A configuration may also be adopted in which the transparent/scattering state switching element scatters more light that is in a specific wavelength region than light that is outside the specific wavelength region during a scattering state relative to a transparent state, and the dichroic dye absorbs light primarily outside the specific wavelength region during a scattering state relative to a transparent state.

Alternatively, a configuration may be adopted in which the transparent/scattering state switching element scatters more light that is in a specific wavelength region than light that is outside the specific wavelength region during a scattering state relative to a transparent state, and the dichroic dye absorbs light primarily in the specific wavelength region during a transparent state relative to a scattering state.

Furthermore, the specific wavelength region may be a short-wavelength region of visible light.

The transparent/scattering state switching element may have a polymer-dispersed liquid crystal layer in which regions of liquid crystal molecules are dispersed in a polymer film.

Furthermore, the dichroic dye may be present in the regions of liquid crystal molecules.

Alternatively, the dichroic dye may be present in the polymer film.

The dichroic dye may have a rod-shaped molecular structure.

Alternatively, the dichroic dye may have a disk-shaped molecular structure.

The dichroic dye may also exhibit a stronger blue color when viewed from a molecular minor axis direction than when viewed from a molecular major axis direction.

Alternatively, the dichroic dye may exhibit a stronger yellow color when viewed from a molecular minor axis direction than when viewed from a molecular major axis direction.

Alternatively, the dichroic dye may have an absorption spectrum in a different wavelength region in a minor axis direction than in a major axis direction.

The light source device according to the present invention has a planar light source for emitting light in a plane, and a transparent/scattering state switching element capable of switching between a transparent state for transmitting light emitted from the planar light source, and a scattering state for scattering the light, wherein the transparent/scattering state switching element includes molecules that exhibit a different light emission state or light absorption state between the transparent state and the scattering state.

In the present invention, the color of emitted light can be prevented from changing between the transparent state and the scattering state of the transparent/scattering state switching element by using molecules that exhibit a different light emission state or light absorption state between a transparent state and an absorbing state.

The molecules that exhibit a different light emission state or light absorption state between the transparent state and the scattering state preferably operate so as to absorb a difference in a wavelength spectrum of transmitted light between a transparent state and a scattering state in a transparent/scattering state switching element that does not include the molecules.

The molecules that exhibit a different light emission state or light absorption state between the transparent state and the scattering state may be dichroic fluorescent-dye molecules or luminescent liquid crystal molecules. This configuration makes it possible to suppress a variation in the color of the emitted light between the scattering state and the transparent state, and to provide a bright display.

The transparent/scattering state switching element may scatter more light in a specific wavelength region than light outside the specific wavelength region in a scattering state relative to a transmitting state; and the dichroic fluorescent molecules or luminescent liquid crystal molecules may primarily emit more light in the specific wavelength region in a scattering state than in a transmitting state. This configuration makes it possible to suppress a variation in the color of the emitted light between the scattering state and the transparent state, to cause the emitted light to approach the color of the incident light, and to provide a bright display.

The transparent/scattering state switching element may scatter more light in a specific wavelength region than light outside the specific wavelength region in a scattering state relative to a transmitting state; and the dichroic fluorescent molecules or luminescent liquid crystal molecules may primarily emit more light outside the specific wavelength region in a scattering state than in a transmitting state. This configuration makes it possible to cause the light emitted during the transparent state to approach the color of the light emitted during the scattering state, and to provide a bright display.

Furthermore, the specific wavelength region may be a short-wavelength region of visible light. The transparent/scattering state switching element may have a polymer-dispersed liquid crystal layer in which regions of liquid crystal molecules are dispersed in a polymer film.

Furthermore, the dichroic fluorescent molecules or luminescent liquid crystal molecules are preferably present in the regions of liquid crystal molecules. Since the movement of the liquid crystal molecules that accompanies a switch between the transparent state and the scattering state can thereby be utilized to change the orientation of the dichroic fluorescent molecules or luminescent liquid crystal molecules, the color can be more effectively corrected. The dichroic fluorescent dye molecules may also exhibit a stronger blue color when viewed from the molecular minor axis direction than when viewed from the molecular major axis direction.

A configuration is preferably adopted in which the liquid crystal molecules in the polymer-dispersed liquid crystal layer have a rod-shaped molecular structure and positive dielectric anisotropy; the refractive index of the polymer film is substantially equal to the refractive index of the liquid crystal molecules in a minor axis direction; the dichroic fluorescent dye molecules have a rod-shaped molecular structure, and exhibit a stronger blue color when viewed from a molecular minor axis direction than when viewed from a molecular major axis direction; and the polymer-dispersed liquid crystal layer is sandwiched between a pair of planar electrodes and driven by a vertical electric field that is generated between the pair of planar electrodes.

The light source device may also comprise a light-direction regulating element for regulating the direction of a light beam emitted from the planar light source and emitting the light to the transparent/scattering state switching element.

The display device according to the present invention has the light source device, and a transmissive display panel for associating an image with the light by transmitting the light emitted from the light source device. The transmissive display panel may also be a liquid crystal panel.

The terminal device according to the present invention comprises the display device. The terminal device may be a mobile phone, a personal information terminal, a gaming device, a digital camera, a video camera, a video player, a notebook-type personal computer, a cash dispenser, or a vending machine.

The transparent/scattering state switching element according to the present invention is capable of switching between a transparent state for transmitting incident light without modification, and a scattering state for scattering the light, wherein the transparent/scattering state switching element includes molecules that exhibit a different light emission state or light absorption state between the transparent state and the scattering state, and the molecules operate so as to absorb a difference in a wavelength spectrum of transmitted light that occurs between a transparent state and a scattering state in a transparent/scattering state switching element that does not include the molecules.

A configuration may be adopted in which the transparent/scattering state switching element has a polymer-dispersed liquid crystal layer in which regions of liquid crystal molecules are dispersed in a polymer film; the refractive index of the polymer film is substantially equal to the refractive index of the liquid crystal molecules in a minor axis direction; molecules that exhibit a different light emission state or light absorption state between a transparent state and an absorbing state are a dichroic fluorescent dye; the dichroic fluorescent dye molecules have a rod-shaped molecular structure, and exhibit a stronger blue color when viewed from a molecular minor axis direction than when viewed from a molecular major axis direction; the dichroic fluorescent dye molecules are present in the liquid crystal regions of the polymer-dispersed liquid crystal layer; and the polymer-dispersed liquid crystal layer is sandwiched between a pair of planar electrodes and driven by a vertical electric field that is generated between the pair of planar electrodes.

In accordance with the present invention, a change in color can be prevented from occurring during switching of the radiation angle in a light source device that is capable of switching the range of irradiation angles, by introducing dichroic dye molecules into the transparent/scattering state switching element.

DESCRIPTION OF EXEMPLARY EMBODIMENTS

Figure 1:
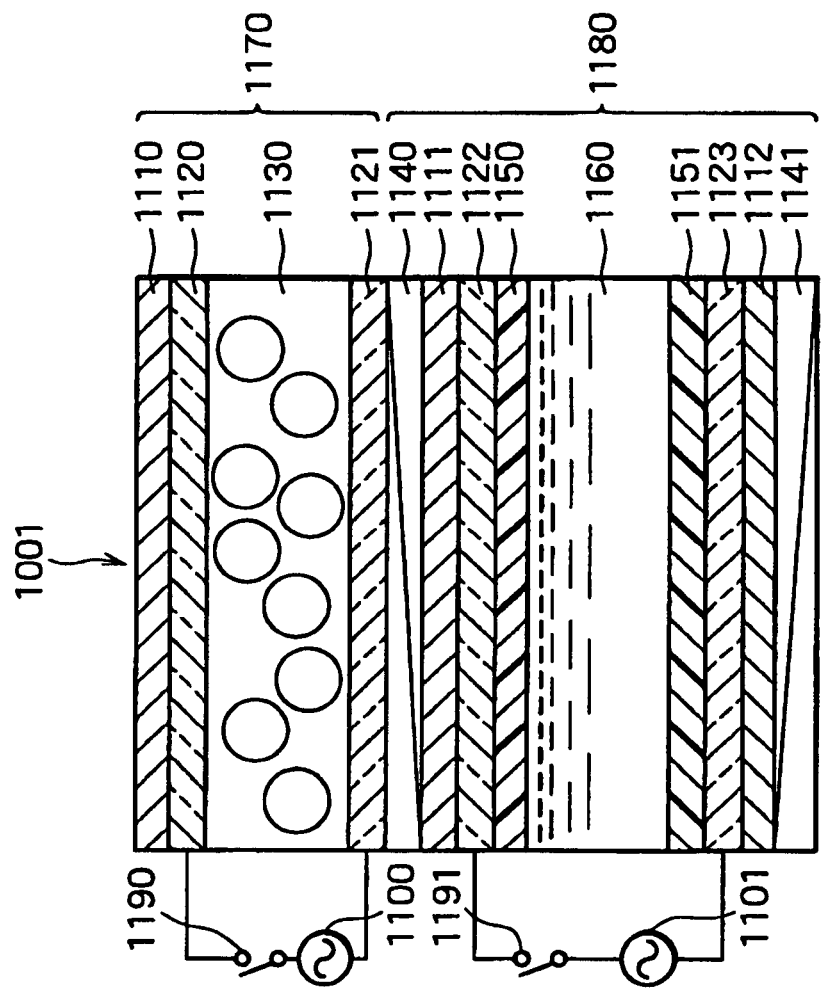
FIG. 1 is a schematic sectional view showing the first conventional viewing-angle-controlled liquid crystal display device described in Japanese Patent Application Kokai Publication No. 5-72529.
Figure 2:
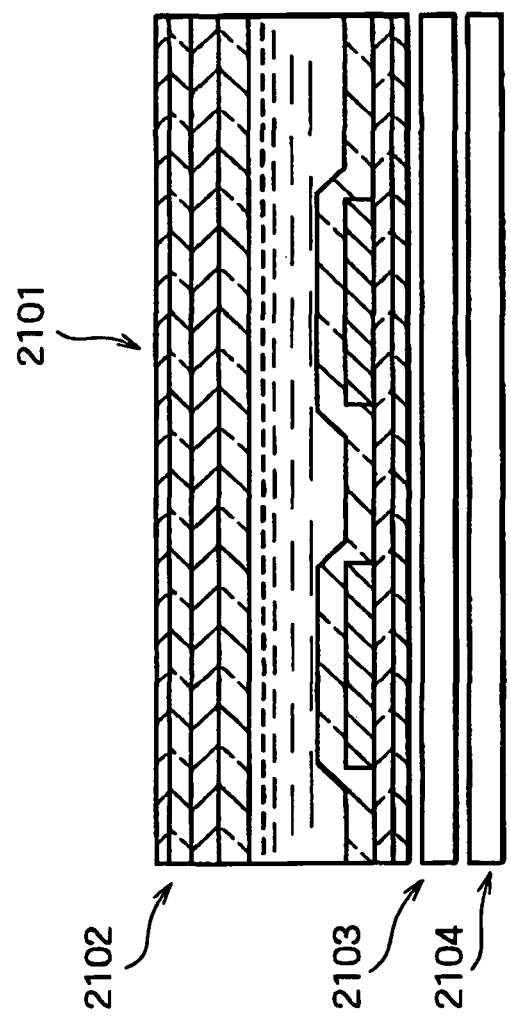
FIG. 2 is a schematic sectional view showing the second conventional viewing-angle-controlled liquid crystal display device described in Japanese Patent Application Kokai Publication No. 9-244018.
Figure 3:
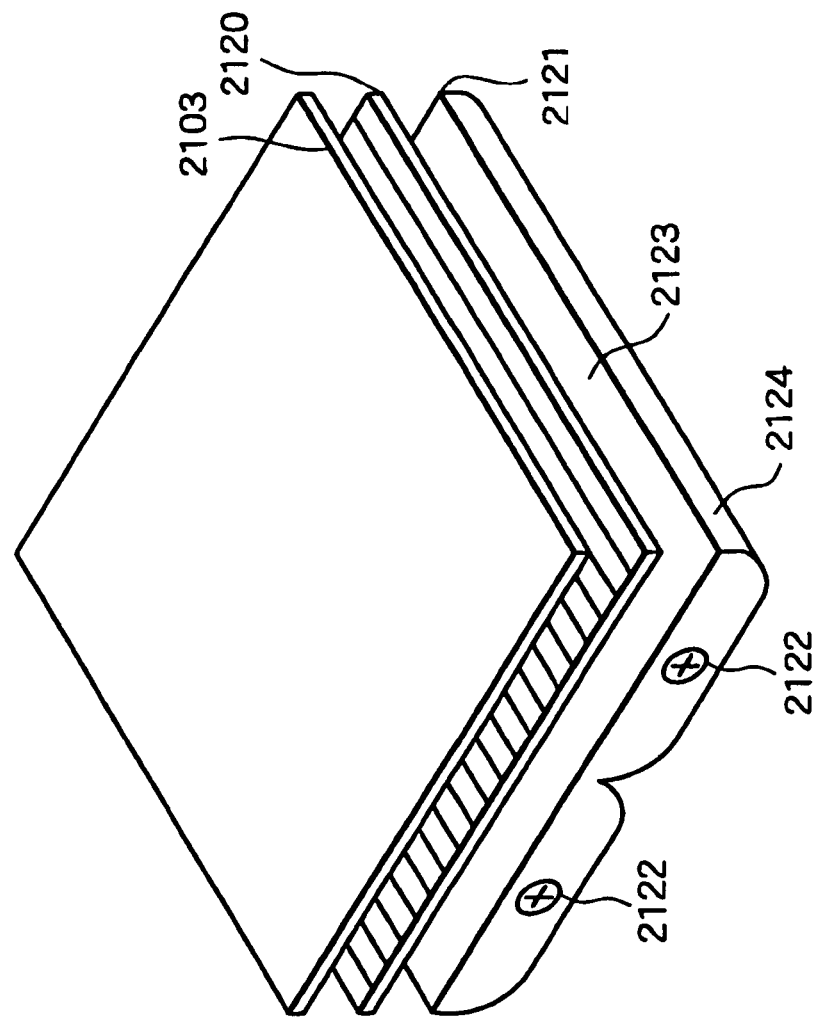
FIG. 3 is a schematic perspective view showing the illumination device used in the conventional viewing-angle-controlled liquid crystal display device described in Japanese Patent Application Kokai Publication No. 9-244018.
Figure 4:
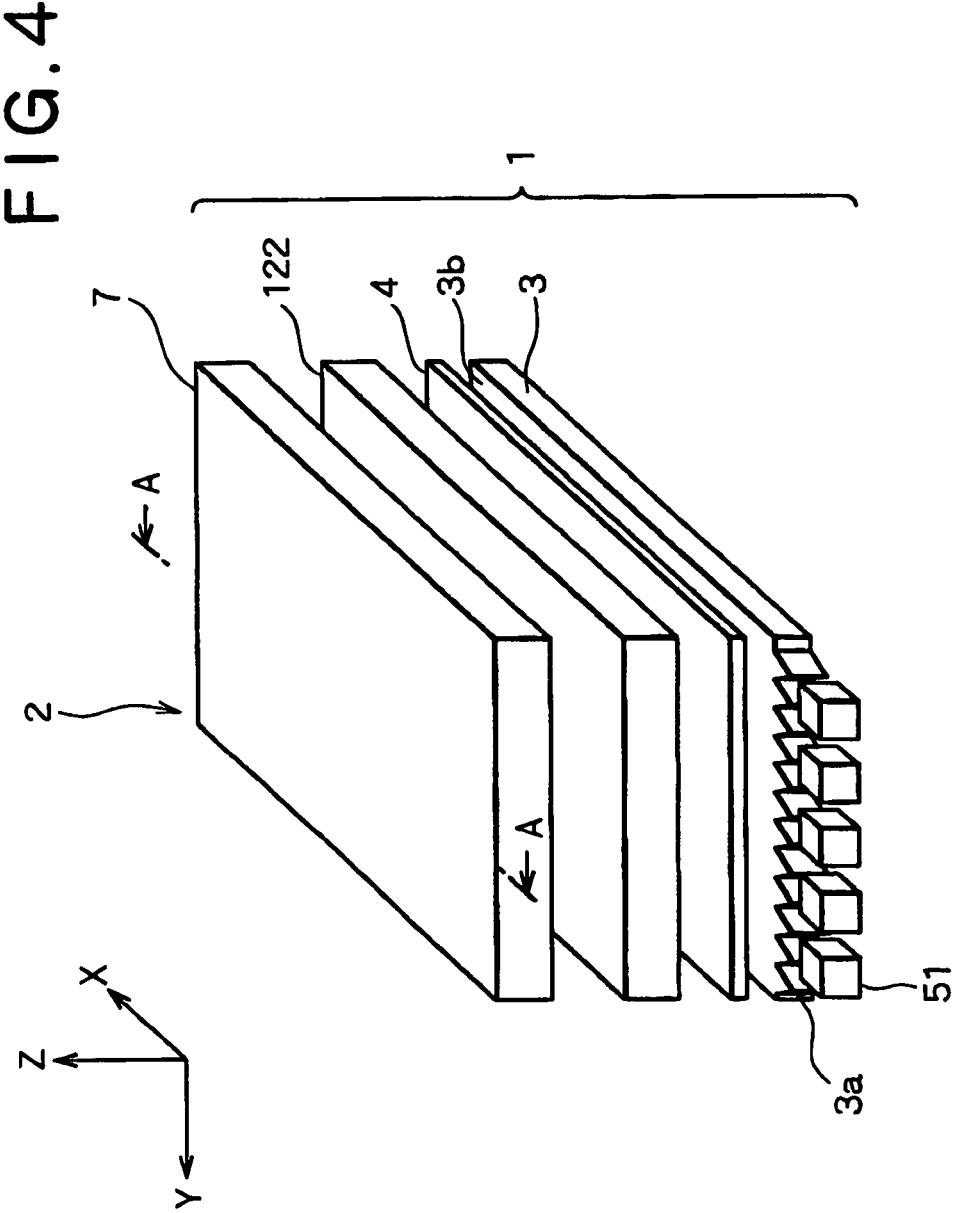
FIG. 4 is a perspective view showing the display device according to a first embodiment of the present invention.
Figure 5:
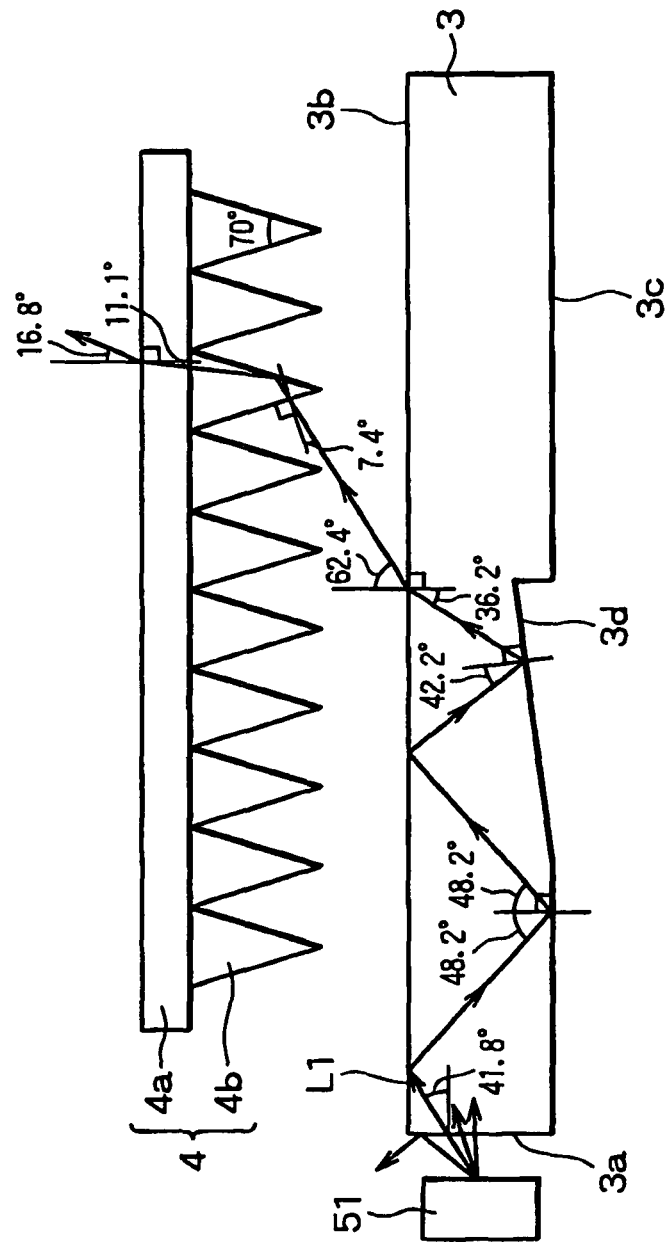
FIG. 5 is a sectional view showing the light source, the light-guide plate, and the optical film that are constituent elements of the first embodiment.
Figure 6:
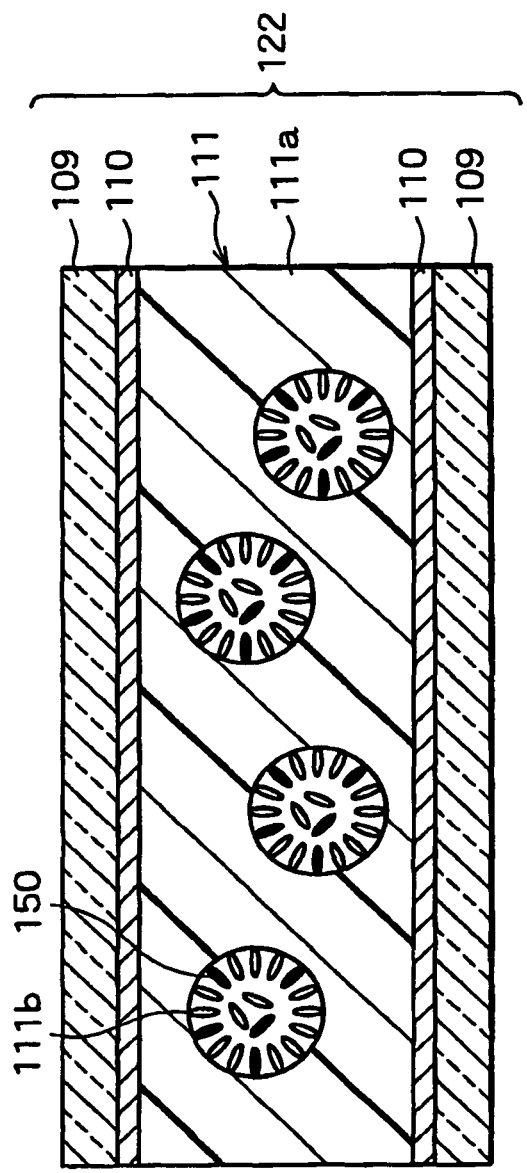
FIG. 6 is a sectional view showing the transparent/scattering state switching element that is a constituent element of the first embodiment.
Figure 7:
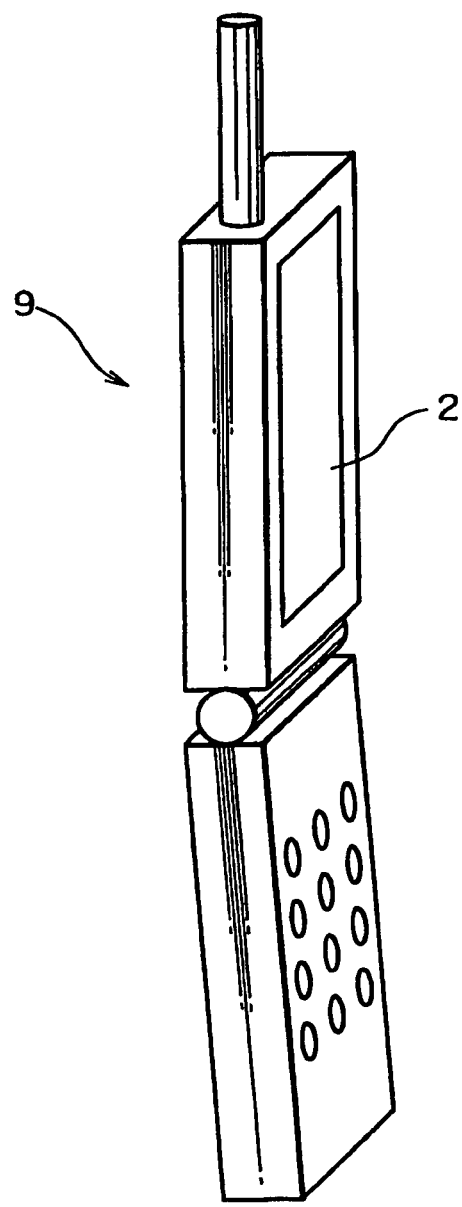
FIG. 7 is a perspective view showing the terminal device according to the first embodiment.

The light source device, the display device, the terminal device, and the transparent/scattering state switching element according to exemplary embodiments of the present invention are described in detail below with reference to the attached diagrams. The light source device, the display device, the terminal device, and the transparent/scattering state switching element according to a first embodiment of the present invention will first be described. FIG. 4 is a perspective view showing the display device according to the present embodiment; FIG. 5 is a sectional view showing the light source, the light-guide plate, and the optical film that are constituent elements of the present embodiment; FIG. 6 is a sectional view showing the transparent/scattering state switching element that is a constituent element of the display device; and FIG. 7 is a perspective view showing the terminal device in which the display device according to the first embodiment is mounted.

As shown in FIG. 4, the display device 2 according to the first embodiment is composed of a light source device 1 and a transmissive liquid crystal display panel 7. A light-guide plate 3 composed of a transparent material is provided in the light source device 1. The light-guide plate 3 is in the shape of a rectangular sheet. A light source is disposed in a position opposite one of the side surfaces (light-incident surface 3a) of the light-guide plate 3. The light source is a white LED (Light-Emitting Diode) 51, for example. A plurality of white LEDs 51 is arranged along the light-incident surface 3a of the light-guide plate 3, and the number of LEDs is five, for example. Light that enters the light-guide plate 3 from the light-incident surface 3a is evenly emitted from the principal surface (light-excident surface 3b) of the light-guide plate 3.

An optical film 4 is provided on the light-excident surface 3b side of the light-guide plate 3. The optical film 4 deflects the light emitted from the light-guide plate 3 in the direction of a line normal to the light-excident surface of the light-guide plate 3. A transparent/scattering state switching element 122 is also provided on the side of the light-excident surface of the optical film 4. The transparent/scattering state switching element 122 switches between a state for scattering the light and a state for transmitting the light without modification when the light incident from the optical film 4 is emitted to the opposite side of the transparent/scattering state switching element 122. As shown in FIG. 4, the light source device 1 is composed of at least the white LEDs 51, the light-guide plate 3, the optical film 4, and the transparent/scattering state switching element 122. The aforementioned transmissive liquid crystal display panel 7 is provided to the light-excident surface of the transparent/scattering state switching element 122 to associate an image with the light by transmitting the light.

An XYZ orthogonal coordinate system is set up as described below for convenience in the present specification. The direction from the white LEDs 51 to the light-guide plate 3 is the +X direction, and the opposite direction is the −X direction. The +X direction and the −X direction are collectively referred to as the X-axis direction. Within directions parallel to the light-excident surface 3b of the light-guide plate 3, the direction orthogonal to the X-axis direction is the Y-axis direction. Furthermore, the direction that is orthogonal to both the X-axis direction and the Y-axis direction is the Z-axis direction; and within the Z-axis direction, the direction from the light-guide plate 3 to the light-excident surface 3b is the +Z direction, and the opposite direction is the −Z direction. The +Z direction is the frontal direction, i.e., the direction towards the viewer. The +Y direction is the direction in which a right-handed coordinate system is established. Specifically, when the person's right thumb is in the +X direction, and the index finger is in the +Y direction, the middle finger is in the +Z direction.

As described above, when the XYZ orthogonal coordinate system is set up, the light-excident surface 3b of the light-guide plate 3 becomes the XY plane, the white LEDs 51 are disposed in the −X direction as viewed from the light-guide plate 3, and the optical film 4 is disposed in the +Z direction. The transparent/scattering state switching element 122 is thus disposed in the +Z direction as viewed from the optical film 4.

FIG. 5 is a sectional view of the light-guide plate 3 and the optical film 4 along line A-A in FIG. 4. FIG. 5 shows an example of the trajectory of the light rays, and this example will be described hereinafter. As shown in FIG. 4, a diffusion pattern is formed in the light-incident surface 3a in order to reduce uneven in-plane luminance in the light-excident surface 3b caused by the placement of the LEDs. As shown in FIG. 5, a tilted surface 3d is formed in a light-diffusing surface 3c of the light-guide plate 3. The tilted surface 3d is tilted in the radiation direction of light that is emitted from the white LEDs 51 (light source) and transmitted in the +X direction within the light-guide plate 3. The angle at which the tilted surface 3d is tilted in relation to the X-axis direction is 6 degrees, for example. A plurality of tilted surfaces 3d is arranged in the X-axis direction, and each tilted surface extends in the Y-axis direction along the entire length of the light-guide plate 3. A hologram pattern (not shown) that is anisotropic in the XY plane is formed on the light-excident surface 3b. The hologram pattern increases the directivity in the Y-axis direction of light that is propagated through the light-guide plate 3 and emitted from the light-excident surface 3b.

The optical film 4 is composed of a flat plate 4a, and a plurality of one-dimensional prisms 4b formed on the surface of the flat plate 4a that faces the light-guide plate 3. The one-dimensional prisms 4b are prisms protruding in the −Z direction whose vertex lines extend in the Y-axis direction, and a plurality (ten in the drawing) of one-dimensional prisms 4b is arranged in the X-axis direction. The vertex angle of the one-dimensional prisms 4b is set to 70 degrees, for example. The protrusion direction of the one-dimensional prisms 4b, i.e., the direction orthogonal to the Y-axis direction and parallel to the plane that bisects the side surfaces of the one-dimensional prisms 4b, coincides with the Z-axis direction. The optical film 4 in which the one-dimensional prisms 4b are formed deflects the light emitted from the light-guide plate 3 in the +Z direction within the XZ plane, and emits the light with high directivity in the +Z direction.

As previously mentioned, the hologram pattern formed in the light-excident surface 3b of the light-guide plate acts to increase directivity in the Y-axis direction, and the directivity of the light emitted from the optical film 4 is therefore increased in the +Z direction in relation to both the X-axis direction and the Y-axis direction. A transparent resin is appropriate for use as the material of the light-guide plate 3 and the optical film 4 due to its easy workability, and polymethyl methacrylate (PMMA) having a refractive index of 1.5 is used in the present embodiment.

FIG. 6 is a sectional view showing the transparent/scattering state switching element 122 provided on the light-excident surface of the optical film 4. In the transparent/scattering state switching element 122, a pair of transparent substrates 109 is provided parallel to each other, and electrodes 110 are provided so as to cover the surfaces of the transparent substrates 109 on the surface of each of the transparent substrate 109 that faces the other transparent substrate 109. A PDLC (Polymer-Dispersed Liquid Crystal) layer 111 into which dichroic dye molecules are introduced is provided between the pair of transparent substrates 109, i.e., between the electrodes 110. Liquid crystal molecules 111b and blue dichroic dye molecules 150 are dispersed in a polymer matrix 111a, which is a polymer film in the PDLC layer 111. The PDLC layer 111 is formed, for example, by curing a mixture of a photocuring resin, a liquid crystal material, and a dichroic dye by exposure to light.

Materials are selected in the present embodiment so that the refractive index of the polymer matrix 111a is substantially equal to the refractive index of the liquid crystal molecules 111b in the minor axis direction, i.e., the minimum value of the refractive index anisotropy. The liquid crystal molecules 111b have positive dielectric anisotropy, and a material is used that has a high degree of dielectric anisotropy in the major axis direction of the molecules.

The blue dichroic dye molecules 150 will next be described. Molecules whose shapes are anisotropic generally have optical anisotropy as well. Particularly when the wavelength band in which this anisotropy occurs is the visible light region, polarization dependency occurs when there is anisotropy in the real part of the refractive index, but anisotropy occurs in light absorption when there is anisotropy in the imaginary part. This phenomenon is referred to as dichroism. Specifically, a dichroic dye is a dye that absorbs light anisotropically. Commonly known examples of such dichroic molecules include azo-based dye molecules, anthraquinone-based dye molecules, dioxazine-based dye molecules, and the like. Liquid crystal molecules are a typical example of a case in which there is anisotropy in the real part of the refractive index, and polarization dependency occurs. However, it is often the case in liquid crystal molecules having a narrow rod shape that the refractive index in the major axis direction of the molecules is greater than the refractive index in the minor axis direction of the molecules. In the same manner, it is often the case in dichroic dye molecules that the polarizability ellipsoid of the molecules is elongated parallel to the molecular major axis direction, and the transition moment of absorption also coincides with the molecular major axis. The blue dichroic dye molecules 150 used in the present embodiment have such an elongated rod-shaped molecular structure, and have more significant light absorption characteristics in the molecular major axis direction than in the molecular minor axis direction. The light absorption characteristics in the visible light region are also such that light absorption is weaker in the wavelength region of 420 nm to 480 nm, which is the blue wavelength band, than in other wavelength bands. Therefore, light in wavelength bands other than blue is absorbed, and a blue color is exhibited. Specifically, the blue dichroic dye molecules 150 exhibit a stronger blue color when viewed from the molecular minor axis direction than from the molecular major axis direction. In the present embodiment, since a dichroic dye is selected that is more soluble in the liquid crystal material than in the photocuring resin, the blue dichroic dye molecules 150 are almost entirely absent from the polymer matrix 111a, and are present only in droplets formed by the liquid crystal molecules 111b.

In the transparent/scattering state switching element 122, applying a voltage to the PDLC layer 111 using the pair of electrodes 110 brings about a change in the orientation state of the liquid crystal molecules 111b in the PDLC layer 111, which is also accompanied by a change in the orientation state of the blue dichroic dye molecules 150. For example, when no voltage is applied to the PDLC layer 111, the liquid crystal molecules are aligned in various directions, and the polymer matrix 111a and the liquid crystal molecules have different apparent indices of refraction. A scattering state therefore occurs in which the incident light is scattered and emitted. At this time, since the blue dichroic dye molecules 150 are also oriented in various directions in conformity with the alignment of the liquid crystal molecules 111b, an isotropically blued state occurs; i.e., a state of absorption of yellow light occurs.

Generally, in an element having a microstructure such as that of the PDLC layer in which light is scattered according to the refractive index distribution of the microstructure, the degree to which light is scattered depends on the wavelength of the light, so that shorter wavelengths of light are scattered more significantly, and longer wavelengths of light are scattered less easily. Specifically, when the transparent/scattering state switching element is in the scattering state, blue light is easily scattered, while red light is not easily scattered. Therefore, the ratio of blue in the light emitted from the transparent/scattering state switching element is reduced, and the light takes on a yellowish color. Therefore, a quantity of blue dichroic dye molecules is included in the present embodiment that is adequate to correct the yellowish color to white in the scattering state. Specifically, although blue dichroic dye molecules are included, the quantity thereof is extremely small, and is adequate only to produce a substantially white color during the scattering state.

When an electric field is applied to the PDLC layer, the liquid crystal molecules 111b change orientation so that the major axis direction thereof coincides with the Z-axis direction. When the display is viewed from the frontal direction at this time, the apparent refractive indices of the polymer matrix 111a and the liquid crystal molecules 111b are substantially the same, and the transparent state occurs in which the incident light is emitted without being scattered. In the transparent state, since the size of the apparent refractive index distribution decreases, there is almost no color change such as that which occurs in the scattering state. The blue dichroic dye molecules 150 also conform to the orientation change of the liquid crystal molecules 111b so that the major axis direction aligns with the Z-axis direction, and a substantially transparent state occurs in which there is almost no absorption of blue light when the display is viewed from the frontal direction. The transparent/scattering state switching element 122 thus scatters or transmits the incident light, corrects the color of the light, and emits the light to the transmissive liquid crystal display panel 7. Rectangular pulses at a frequency of 60 Hz are applied to the transparent/scattering state switching element in order to prevent burn-in.

As shown in FIG. 7, the display device 2 is mounted in the display part of a mobile telephone 9, for example. Specifically, the mobile telephone 9 as the mobile terminal of the present embodiment is provided with the abovementioned display device 2.

Figure 8:
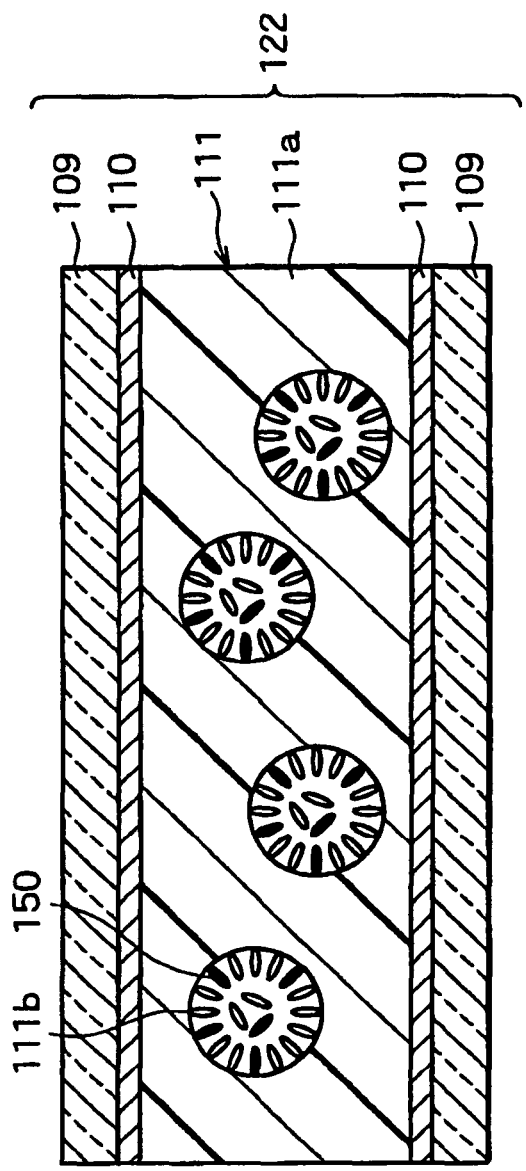
FIG. 8 is a sectional view showing the orientation state of the liquid crystal molecules and the blue dichroic dye molecules when the transparent/scattering state switching element of the first embodiment is in the scattering state.
Figure 9:
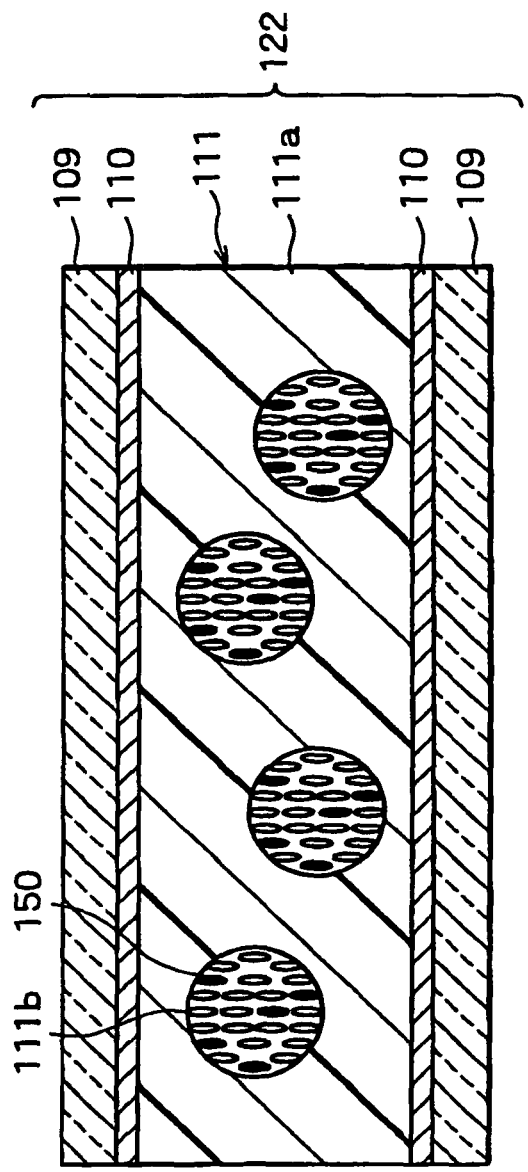
FIG. 9 is a sectional view showing the orientation state of the liquid crystal molecules and the blue dichroic dye molecules when the transparent/scattering state switching element of the first embodiment is in the transparent state.

The following description is of the operation of the display device according to the present embodiment thus configured, i.e., the operation of the light source device according to the present embodiment. FIG. 8 is a sectional view showing the orientation state of the liquid crystal molecules and the blue dichroic dye molecules when the transparent/scattering state switching element of the present embodiment is in the scattering state. FIG. 9 is a sectional view showing the orientation state of the liquid crystal molecules and the blue dichroic dye molecules when the transparent/scattering state switching element of the present embodiment is in the transparent state.

Described first is the operation during wide-angle display. During wide-angle display, a current is applied to cause the white LEDs 51 to emit light, and the transparent/scattering state switching element 122 is driven so as to produce a scattering state. As a result, the white LEDs 51 are lighted, and the light emitted from the white LEDs 51 enters the light-guide plate from the light-incident surface 3a of the light-guide plate 3. As described above, the light that has entered the light-guide plate is also diffused in the Y-axis direction inside the light-guide plate because a diffusion pattern is provided to the light-incident surface 3a.

The optical path of the light that has entered the light-guide plate 3 is described next with focus on the light that propagates through X-Z plane among the mixed light. The angle formed in the Z-axis direction by the +X direction and the direction in which the light travels after having entered the light-guide plate 3 is less than 41.8 degrees on the basis of Snell's law due to the difference in the indices of refraction of air and the resin material that forms the light-guide plate 3, as shown in FIG. 5. In view of this fact, following is a discussion of the light beam L1 sloped 41.8 degrees in the +Z direction with respect to the +X direction.

The light beam arrives at the light-excident surface 3b of the light-guide plate 3, and the angle with respect to the Z-axis direction is 48.2 degrees. Since this angle is greater than the critical angle 41.8, the light beam undergoes total reflection and does not escape the light-guide plate 3. In a similar manner, when light has entered an area other than the sloped surface 3d, the light is totally reflected at the same angle in the light-diffusion surface 3c as well. Therefore, the light undergoes repeated total reflection between the light-excident surface 3b and light-diffusion surface 3c while being propagated in the direction away from the white LEDs 51. During this propagation, when the light beam L1 enters the sloped surface 3d, which is sloped 6 degrees with respect to the X-axis direction, the angle is 42.2 degrees from the line normal to the sloped surface 3d, and since the value is greater than the critical angle of 41.8 degrees, the light undergoes total reflection and does not escape the sloped surface 3d to the exterior of the light-guide plate 3. However, the angle of the light beam L1 with respect to the Z-axis direction after total reflection is 36.2 degrees, and since the angle is less that the critical angle, the light that has arrived at the light-excident surface 3b is emitted from the light-guide plate 3 to the exterior, and the angle of the escaped light is 62.4 degrees with respect to the Z-axis direction.

As described above, light that has entered the light-guide plate 3 always has an angle of 41.8 degrees or less with respect to the X-axis direction after entry. For this reason, when the incident light has arrived at the light-excident surface 3b or light-diffusion surface 3c of the light-guide plate 3, the arriving light has an angle of 48.2 degrees or more with respect to Z-axis direction and undergoes total reflection. In the process in which this light is totally reflected in the light-excident surface 3b and light-diffusion surface 3c and propagated inside the light-guide plate 3, the angle of the direction of travel of light with respect to the Z-axis direction approaches the critical angle each time the light is totally reflected by the sloped surface 3d, which has a slope of 6 degrees. At the point where this angle becomes less than the critical angle, the light escapes the flat surface of the light-excident surface 3b or the light-diffusion surface 3c. As a result, the light emitted from the light-guide plate 3 has strong directivity in the direction sloped approximately 60 degrees from the Z-axis direction in the XZ plane.

The light L1 emitted from the light-guide plate 3 at a slope of 62.4 degrees with respect to the Z-axis direction enters the optical film 4. Since the vertices of the one-dimensional prism bodies 4b are 70 degrees, the angle at which the light enters the one-dimensional prism bodies 4b is 7.4 degrees, and the angle between the normal to the incident surface of a conical body and the direction of travel of the light beam that has entered the interior of the one-dimensional prism bodies 4b is 4.9 degrees. Thereafter, the light L1 arrives at the opposite surface of the one-dimensional prism bodies 4b. The angle with respect to this surface is 65.1 degrees from the normal line of the surface. Therefore, the light undergoes total reflection and travels in a direction 11.1 degrees from the Z axis. The angle of the light L1 that subsequently escapes the optical film 4 is 16.8 degrees from the Z axis due to Snell's law. In other words, the light emitted from the optical film 4 has strong directivity in substantially the Z-axis direction in the XZ plane.

The directivity in the Y-axis direction is described next. As described above, the light emitted from the white LEDs 51 enters the light-guide plate 3 and is thereafter diffused at least in the XY plane. The component of light diffused in the Y-axis direction is collected by the hologram pattern formed on the light-excident surface as described above, and the directivity is increased. In other words, the irradiation range of light emitted from the optical film 4 is limited to a narrow angle range.

The light emitted from the optical film 4 then enters the transparent/scattering state switching element 122. Since voltage is not applied to the transparent/scattering state switching element 122 and the switching element is set to a scattering state, highly directive light is uniformly scattered by the transparent/scattering state switching element 122 in a wide angle range. Specifically, the light is scattered by the transparent/scattering state switching element 122, the directivity of the light is reduced, and the light becomes wide-angle light. The light distributed in a wide range of angles enters the transmissive liquid crystal panel 7, an image is added, and the wide-angle light is emitted without modification. An image is thus displayed at a wide viewing angle.

The operations performed during narrow-angle display will next be described. During narrow-angle display, a current is applied so as to cause the white LEDs 51 to emit light, and the transparent/scattering state switching element 122 is driven so as to produce a transparent state. As a result, the white LEDs 51 are lighted, and the light emitted from the white LEDs 51 propagates through the light-guide plate 3 and exits from the optical film 4 in a narrow range of angles, the same as during wide-angle display. This light enters the transparent/scattering state switching element 122. Since voltage is applied to the transparent/scattering state switching element 122 and the switching element is set to a transparent state, highly directive light passes through the transparent/scattering state switching element 122 without being scattered. Specifically, the light is emitted from the transparent/scattering state switching element 122 while retaining high directivity. This light having a highly directive distribution enters the transmissive liquid crystal panel 7, an image is added, and the light is emitted while retaining its high directivity. An image is thus displayed at a narrow viewing angle.

The color of the light during wide-angle display and narrow-angle display will next be described. As described above, in the display device according to the present embodiment, the transparent/scattering state switching element 122 is provided between the optical film 4 and the transmissive liquid crystal panel 7, and the PDLC layer 111 is provided to the transparent/scattering state switching element 122. The radiation angle of light is switched through the transmission or scattering of light by the PDLC layer 111. As previously mentioned, in an element having a microstructure such as that of the PDLC layer in which light is scattered according to the refractive index distribution of the microstructure, the degree to which light is scattered depends on the wavelength of the light, so that shorter wavelengths of light are scattered more significantly, and longer wavelengths of light are scattered less easily. Specifically, when the transparent/scattering state switching element is in the scattering state, blue light is easily scattered, while red light is not easily scattered. Therefore, the ratio of blue in the light emitted from the transparent/scattering state switching element is reduced, and the light takes on a yellowish color. In the transparent state, since the size of the apparent refractive index distribution decreases, there is almost no color change such as that which occurs in the scattering state.

For this reason, in the present embodiment, blue dichroic dye molecules 150 having high light absorbance in the molecular major axis direction are introduced into droplets formed by the liquid crystal molecules 111b of the PDLC layer 111. As shown in FIG. 8, when a voltage is not applied to the transparent/scattering state switching element, and the scattering state is in effect, the liquid crystal molecules are oriented in various directions, and the blue dichroic dye molecules 150 are also oriented in various directions in conformity with the orientation state of the liquid crystal molecules. As a result, when the display is viewed from the Z-axis direction, which is the frontal direction, the light entering the PDLC layer 111 is scattered, and blue light in particular is significantly scattered as previously mentioned, due to the fact that the polymer matrix 111a and the liquid crystal molecules 111b have different apparent indices of refraction. However, since yellow light is absorbed by the blue dichroic dye molecules 150, the whiteness of the light exiting the PDLC layer can be maintained. Specifically, the light emitted in the scattering state can be prevented from taking on a yellowish color.

When the transparent/scattering state switching element in the scattering state is observed from an angle, the length of light rays passing through the PDLC layer, i.e., the length of the optical path, is also increased in the frontal direction. However, in the present embodiment, since the emitted light is adjusted to maintain whiteness when the optical path length in the frontal direction is at the minimum, and the transparent/scattering state switching element is configured so that a color change can be suppressed without dependence on the length of the optical path, whiteness is maintained in the same manner even when the length of the optical path is increased in the tilted direction. In general, the scattering is increased when the optical path length is increased, more light in short wavelengths is scattered, and the change in color is more significant in a transparent/scattering state switching element that does not include dye molecules. However, since the color change can be suppressed in the present embodiment even when the optical path length is increased, a color change during wide-angle display can be suppressed.

The color when the transparent/scattering state switching element is in the transparent state will next be described. As shown in FIG. 9, when a voltage is applied to the PDLC layer 111, the liquid crystal molecules 111b change orientation so that the major axis direction thereof coincides with the Z-axis direction, and the blue dichroic dye molecules 150 also change orientation in conformity with the orientation change of the liquid crystal molecules 111b so that the major axis direction coincides with the Z-axis direction.

When the transparent/scattering state switching element in the voltage-applied state is observed from the frontal direction, the apparent refractive indices of both the polymer matrix 111a and the liquid crystal molecules 111b are substantially the same, and the transparent state occurs in which the incident light is emitted without being scattered. This is because the refractive index of the polymer matrix 111a is set so as to substantially match the refractive index of the liquid crystal molecules 111b in the minor axis direction, i.e., the minimum value of the refractive index anisotropy. In this transparent state, since the size of the apparent refractive index distribution decreases, there is almost no color change such as that which occurs in the scattering state. The blue dichroic dye molecules 150 also conform to the orientation change of the liquid crystal molecules 111b so that the major axis direction aligns with the Z-axis direction, and a state therefore occurs in which the display is substantially transparent when is viewed from the frontal direction.

A case will next be described in which the transparent/scattering state switching element in the voltage-applied state is observed from an angle. As previously mentioned, the refractive index of the polymer matrix 111a is set so as to substantially match the refractive index of the liquid crystal molecules 111b in the minor axis direction, and the liquid crystal molecules 111b and the blue dichroic dye molecules 150 change orientation so that the major axis directions thereof coincide with the Z-axis direction when a voltage is applied. Therefore, when the display is viewed from an angle, the apparent refractive index of the liquid crystal molecules 111b differs from the refractive index of the polymer matrix 111a, and the difference in refractive indices increases particularly as the angle becomes more tilted from the frontal direction. The optical path length also increases as the tilt from the frontal direction increases, and increased scattering occurs as a result. Specifically, when a voltage is applied to the transparent/scattering state switching element, the scattering increases as the tilt from the frontal direction increases, and a yellowish color occurs when dye has not been introduced. In contrast, when the blue dichroic dye molecules 150 of the present embodiment are introduced, since the blue dichroic dye molecules 150 change orientation in conformity with the liquid crystal molecules 111b so that the major axis direction coincides with the Z-axis direction, the dye has almost no light-absorbing effects in the frontal direction, but the light-absorbing effects increase as the angle increases. In the present embodiment in particular, an adjustment is made so that a substantially white color is exhibited when the blue dichroic dye molecules 150 are oriented in various directions. Therefore, when the orientation thereof is changed so that the major axis direction coincides with the Z-axis direction, more significant yellow-reducing effects can be demonstrated. In the narrow-angle display state, there is basically no light in directions that are significantly angled from the frontal direction, but since there is some light in a certain range of angles from the frontal direction, color change suppressing effects can be demonstrated particularly in this range.

The effects of the present embodiment will next be described. In the display device according to the present embodiment, introducing dichroic dye molecules into the transparent/scattering state switching element makes it possible to prevent the light emitted from the transparent/scattering state switching element in the scattering state from taking on a yellowish color, and to maintain the same whiteness as in the transparent state. A display device can thereby be obtained that prevents a difference in color between the wide-angle display state and the narrow-angle display state. Yellowing of the emitted light can also be suppressed not only in the frontal direction, but also in tilted directions, and significant yellow-reducing effects can be demonstrated particularly in the transparent state.

A significant feature of the present invention is that self-correction effects can be demonstrated. Specifically, these effects are achieved by providing the capability of color change suppression to the transparent/scattering state switching element itself, which is the primary cause of the color change that accompanies the switching of the viewing angle. As a contrasting example, in another configuration for suppressing a color change by switching the color of the light source during the viewing angle switch, the color of the light source must be separately controlled, and control becomes more complex. Since the transparent/scattering state switching element as such in the present invention is configured so as to suppress its own color change, it is sufficient merely to switch between the transparent state and the scattering state, and control can be simplified.

Such self-correction effects make it possible to reduce unevenness in color even when, for example, thickness irregularity or other effects occur in the transparent/scattering state switching element. Types of thickness irregularity include in-plane thickness irregularity within the element, fluctuations due to differences between individual elements, and other irregularities. Particularly when in-plane thickness irregularity occurs within an element, a significant change in color is observed in portions having a large thickness when the self-correction effects of the present invention are not present, and the discomfort experienced by the user is therefore even greater than the discomfort produced by irregular scattering characteristics. In the present invention, a change in color can be suppressed by the self-correction effects irrespective of thickness, and high image quality is therefore possible. These effects are just as significant against fluctuations due to differences between individual units.

Suppression of color change during temperature changes can also be cited as another effect. In general, the scattering performance of the transparent/scattering state switching element changes when the temperature changes. For example, in an element that is in the scattering state when a voltage is not applied, operation is slowed when the temperature decreases, and a transparent state is difficult to produce. In the present invention, since the color can be corrected according to the state of the transparent/scattering state switching element, color correction and the amount of color correction that corresponds to the scattering state can be maintained when the transparent state does not occur at low temperature. In contrast, when the color is corrected by changing the color of the light source as previously described, correction is executed without regard for temperature changes in the transparent/scattering state switching element. As a result, adequate correction cannot be produced when the temperature changes. Temperature changes can be adapted to by adding a temperature detection capability, but control becomes complex. Therefore, since self correction can also be provided for temperature change in the configuration of the present invention, high image quality can be provided through simple control.

In the display device of the present invention, the intensity of the white LEDs that are the light source may be varied between the narrow-angle display state and the wide-angle display state. When the intensity of the light source is the same for the narrow-angle display state and the wide-angle display state, the frontal luminance in the wide-angle display state is lower than in the narrow-angle display state. The reason for this is that even though the light emitted from the transmissive liquid crystal panel retains high directivity in the narrow viewing angle state, the emitted light is scattered by the transparent/scattering state switching element in the wide viewing angle state, the amount of luminous fluxes in the frontal direction is reduced, and there is a relative decrease in the frontal luminance. It is more preferable for the main user positioned in the frontal direction that there be no difference in luminance between the narrow-angle display and the wide-angle display. The intensity of the light source is therefore increased in the wide-angle display state beyond the intensity of the narrow-angle display state. The luminance in the frontal direction can thereby be equal in the narrow-angle display and the wide-angle display.

Furthermore, by varying the intensity of the light source between the wide-angle display and the narrow-angle display, the amount of fluctuation that occurs when the color coordinates of the light emitted by the light source change may be taken into account to determine the concentration of the dye. When the light source is a white LED, particularly a type of white LED that is composed of a blue LED and a yellow fluorescent tube that emits yellow light according to the blue light emitted by the blue LED, and emits white light using the blue light and yellow light, differences in the characteristics of the blue LED and the yellow fluorescent tube create a tendency for the light source to become slightly blue when the light intensity is increased. Specifically, in a wide-angle display, which requires more light intensity, the light emitted by the light source becomes slightly blue, thereby causing the display to take on a blue color when the transparent/scattering state switching element maintains a white state. In this case, the whiteness of the display can be maintained by slightly reducing the amount of blue dichroic dye molecules.

Furthermore, the light source used in the present invention was described as a white LED, but the present invention is not limited to this configuration, and a cold cathode tube or other means may also be used.

The PDLC layer 111 was also described as being formed, for example, by curing a mixture of a photocuring resin, a liquid crystal material, and a dichroic dye by exposure to light. However, the present invention is not limited by this configuration, and the PDLC layer 111 may be formed by another method. For example, a PDLC layer that includes a dichroic dye may be manufactured by a process in which a PDLC layer that does not include a dichroic dye is formed in advance by curing a mixture of only a photocuring resin and a liquid crystal material by exposure to light, and one of the substrates is then peeled off and impregnated with a liquid crystal material mixed with a dichroic dye.

The transparent/scattering state switching element used in the present invention is also not limited to having a PDLC layer, and any element may be suitably used that is capable of switching between a transparent state and a scattering state. Examples thereof may include an element that uses a polymer network liquid crystal (PNLC), or an element that uses dynamic scattering (DS). It is possible to use a PDLC layer that is in the scattering state when a voltage is not applied, and in the transparent state when a voltage is applied. By this configuration, since the transparent/scattering state switching element no longer consumes power when in the state for scattering incident light, the power that would have been consumed can be allocated to the backlight light source, and the brightness of the light source device during the scattering state is therefore easily enhanced. It is also possible to use a PDLC layer that is in the transparent state when a voltage is not being applied, and that is in the scattering state when a voltage is applied. This type of PDLC layer can be fabricated by exposing to light and curing while applying a voltage. By this configuration, there is no need for applying a voltage to the PDLC layer, and power consumption can be reduced in a mobile information terminal in which narrow-angle display is frequently used. Cholesteric liquid crystal, ferroelectric liquid crystal, or the like may also be used as the liquid crystal molecules used in the PDLC layer. Even when voltage is no longer applied, these liquid crystals retain the orientation they had when the voltage was applied, and have memory properties. Using this type of PDLC layer makes it possible to reduce power consumption.

The display panel used in combination with the planar light source device in the present invention is not limited to a liquid crystal panel, and any display panel that uses a light source device may be used. The liquid crystal panel is also not limited to the transmissive type, and any panel that has a transmissive area in each pixel may be used. A transflective liquid crystal panel having a reflective area in a portion of each pixel, a visible-everywhere transflective liquid crystal panel, or a micro-reflective liquid crystal panel may also be used. It is preferable to use a liquid crystal panel that has minimal dependence on the viewing angle. Contrast inversion during display at a wide viewing angle can thereby be suppressed. Examples of the mode of such a liquid crystal panel include IPS (In-Plane Switching), FFS (Fringe Field Switching), AFFS (Advanced Fringe Field Switching), and the like among horizontal field modes. Vertical alignment modes include MVA (Multi-domain Vertical Alignment), which is multi-domain and possesses reduced viewing-angle dependency, as well as PVA (Patterned Vertical Alignment), ASV (Advanced Super V), and the like. Furthermore, a film-compensated TN liquid crystal display panel may also be appropriately used.

A mobile telephone was described as the terminal device in the present embodiment, but the present invention is not limited to this configuration, and the display device of the present embodiment is compatible not only in mobile telephones, but also PDAs (Personal Digital Assistant: personal information terminal), gaming devices, digital cameras, digital video cameras, video players, and various other types of mobile terminal devices. The display device according to the present embodiment may be installed not only in mobile terminal devices, but also in notebook-type personal computers, cash dispensers, vending machines, and other various types of terminal devices.

Figure 10:
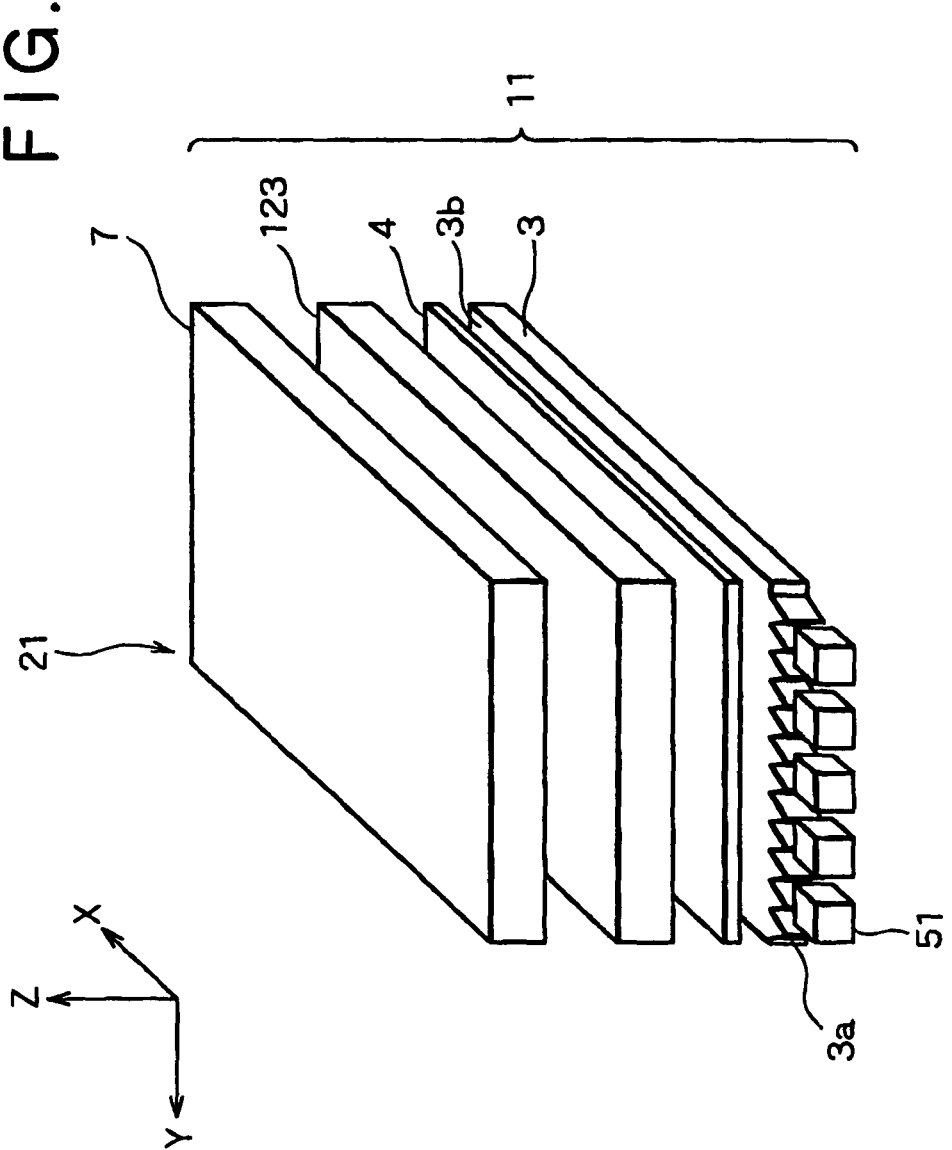
FIG. 10 is a perspective view showing the display device according to a second embodiment of the present invention.

A second embodiment of the present invention will next be described. FIG. 10 is a perspective view showing the display device according to the present embodiment; and FIG. 11 is a sectional view showing the transparent/scattering state switching element that is a constituent element of the present embodiment.

Figure 11:
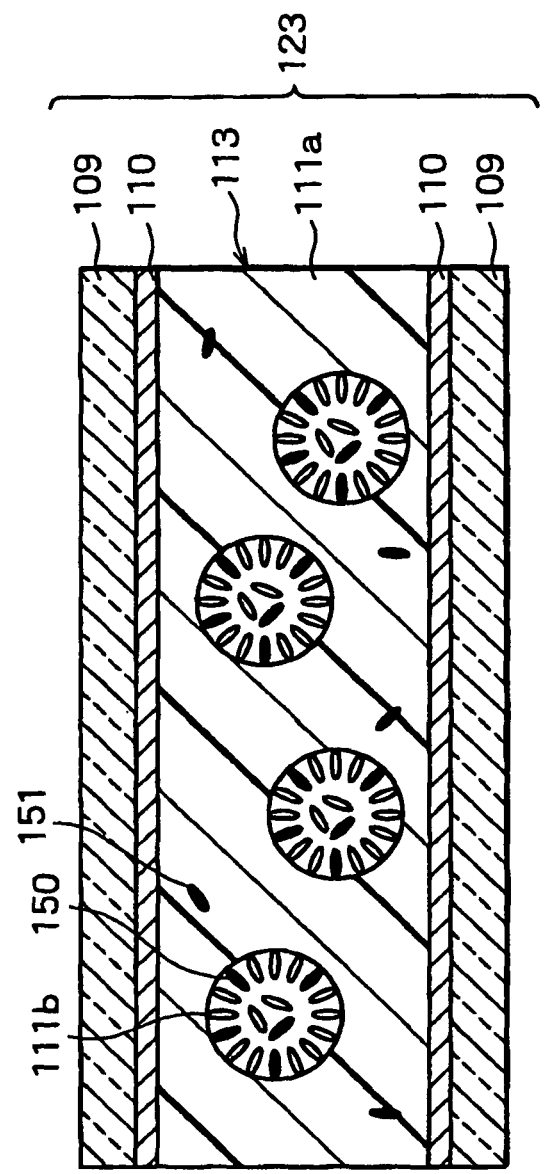
FIG. 11 is a sectional view showing the transparent/scattering state switching element that is a constituent element of the second embodiment.

As shown in FIGS. 10 and 11, the display device 21 and the light source device 11 according to the second embodiment differ from the display device 2 and the light source device 1 of the previously described first embodiment in that a transparent/scattering state switching element 123 is used instead of the transparent/scattering state switching element 122, and blue dichroic dye molecules 151 are used instead of the blue dichroic dye molecules 150. The transparent/scattering state switching element 123 has a PDLC layer 113. Since the aforementioned blue dichroic dye molecules 150 were a dichroic dye that is more soluble in the liquid crystal material than in the photocuring resin, the blue dichroic dye molecules 150 were almost entirely absent from the polymer matrix 111*a*, and were present only in droplets formed by the liquid crystal molecules 111*b*. In contrast, since the blue dichroic dye molecules 151 of the present embodiment are a dichroic dye that is slightly soluble in the photocuring resin as well as in the liquid crystal material, the blue dichroic dye molecules 151 are present not only in droplets formed by the liquid crystal molecules 111*b*, but also in small amounts in the polymer matrix 111*a*. The polymer matrix 111*a* is an isotropic medium that does not align the blue dichroic dye molecules 151, and the blue dichroic dye molecules 151 are therefore oriented in various directions in the polymer matrix 111*a*. Aspects of the present embodiment other than those described above are the same as in the first embodiment.

In the present embodiment, the blue dichroic dye molecules 151 oriented in various directions are included in a small amount in the polymer matrix 111*a* of the PDLC layer 113, and a bluish color that is slightly stronger than that of the PDLC layer 111 in the first embodiment is therefore exhibited. As a result, when the transparent substrates or the electrodes have a yellowish color, the color can be corrected by the effects of the blue. The substrate as such tends to have a yellowish color particularly when plastic substrates are used as the transparent substrates. Since a plastic substrate has low heat resistance, electrode film formation must be performed at a low temperature, which results in a tendency for the electrodes also to take on a yellowish color. In the present embodiment, the effects of the coloration of other members can be reduced without adding special members. Operations and effects in the second embodiment other than those described above are the same as in the first embodiment.

Figure 12:
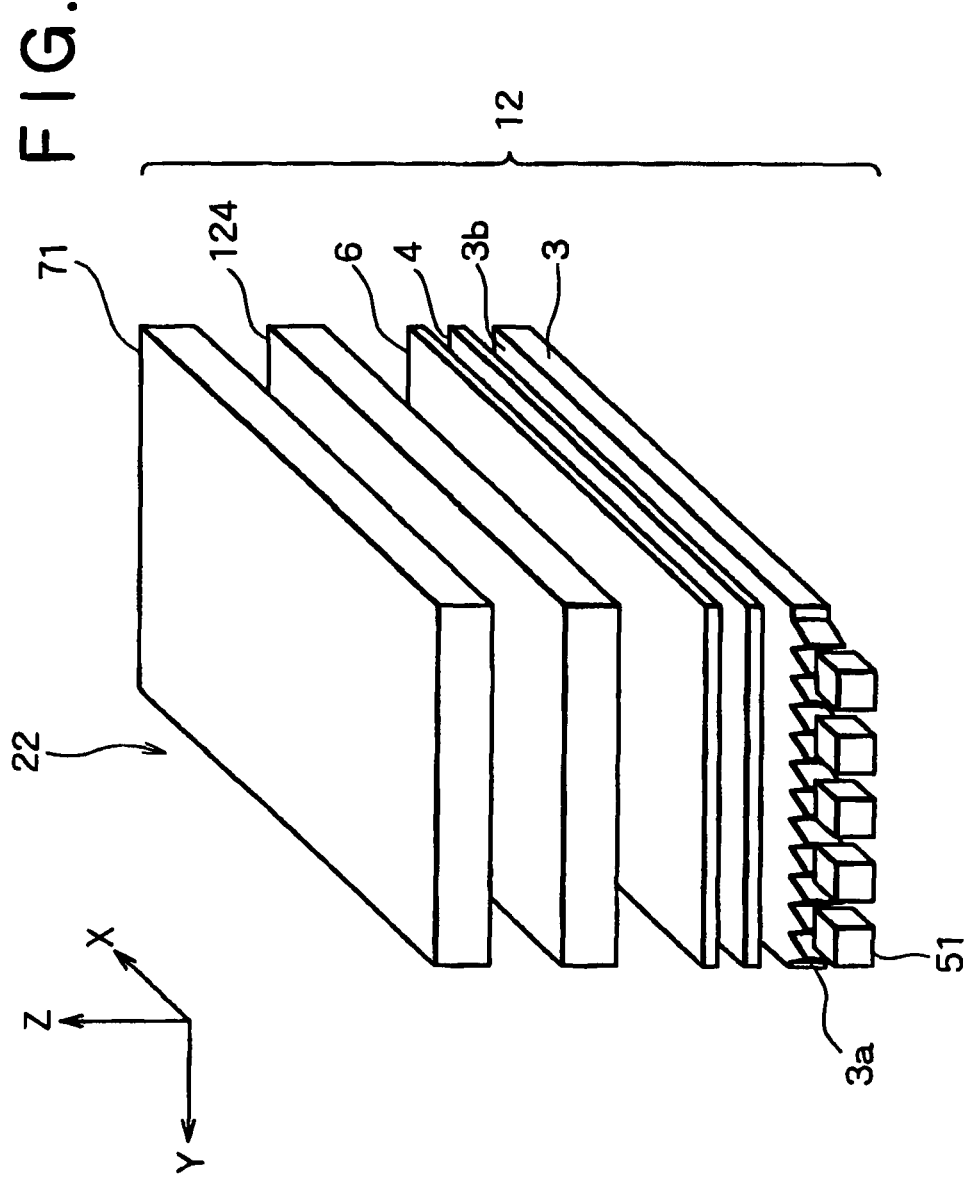
FIG. 12 is a perspective view showing the display device according to a third embodiment of the present invention.
Figure 13:
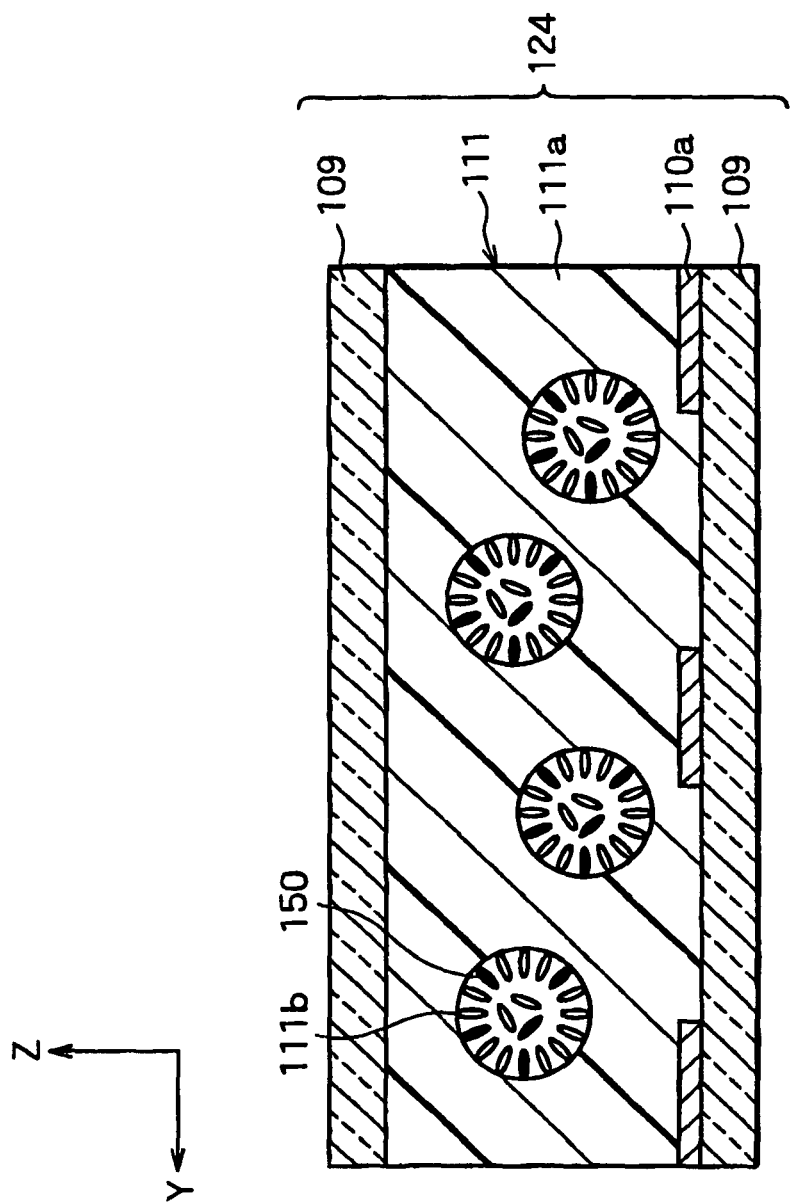
FIG. 13 is a sectional view showing the transparent/scattering state switching element that is a constituent element of the third embodiment.
Figure 14:
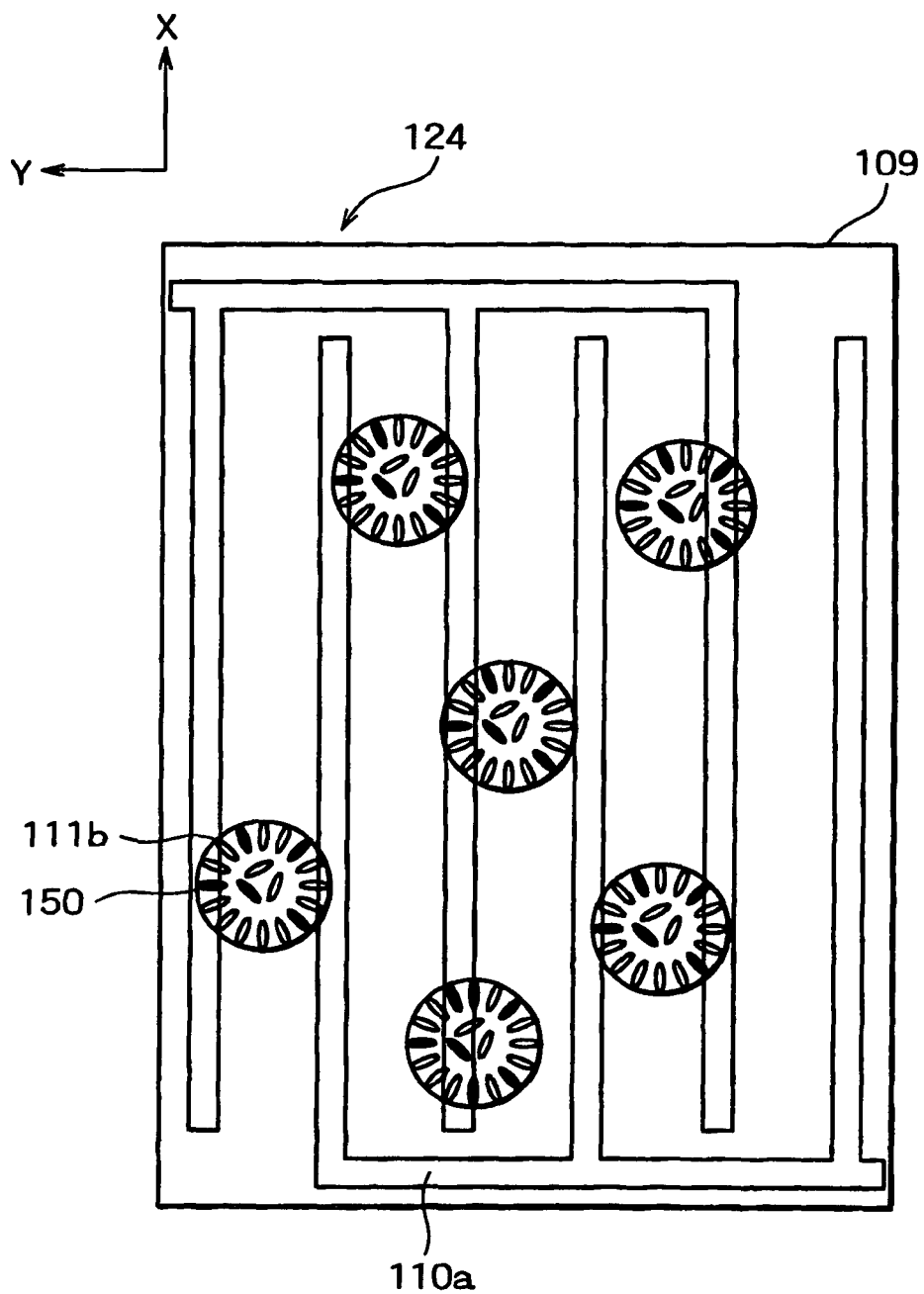
FIG. 14 is a plan view showing the transparent/scattering state switching element that is a constituent element of the third embodiment.
Figure 15:
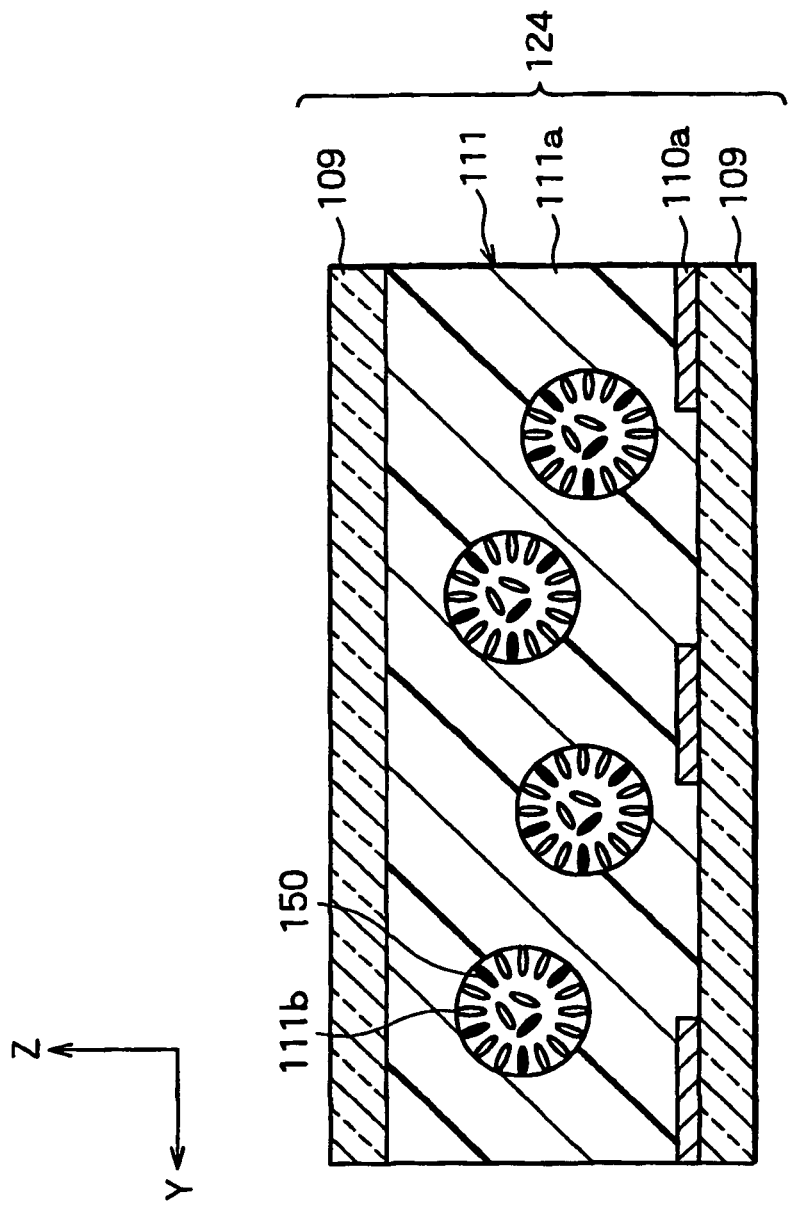
FIG. 15 is a sectional view showing the orientation state of the liquid crystal molecules and the blue dichroic dye molecules when the transparent/scattering state switching element of the third embodiment is in the scattering state.
Figure 16:
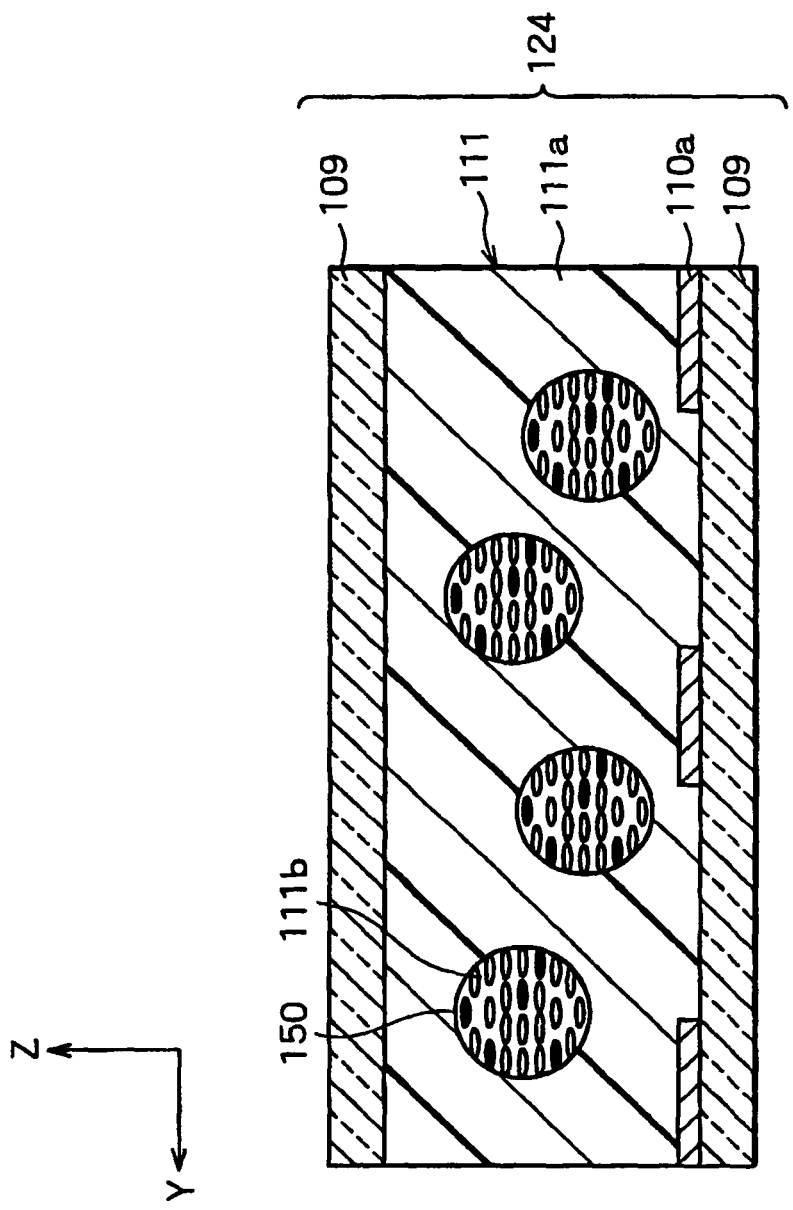
FIG. 16 is a sectional view showing the orientation state of the liquid crystal molecules and the blue dichroic dye molecules when the transparent/scattering state switching element of the third embodiment is in the transparent state.

A third embodiment of the present invention will next be described. FIG. 12 is a perspective view showing the display device according to the present embodiment; FIG. 13 is a sectional view showing the transparent/scattering state switching element that is a constituent element of the present embodiment; FIG. 14 is a plan view showing the transparent/scattering state switching element; FIG. 15 is a sectional view showing the orientation state of the liquid crystal molecules and the blue dichroic dye molecules when the transparent/scattering state switching element of the present embodiment is in the scattering state; and FIG. 16 is a sectional view showing the orientation state of the liquid crystal molecules and the blue dichroic dye molecules when the transparent/scattering state switching element is in the transparent state.

As shown in FIG. 12, the display device 22 and the light source device 12 of the third embodiment differ from the display device 2 and the light source device 1 of the first embodiment in that a transparent/scattering state switching element 124 is used instead of the transparent/scattering state switching element 122, a light-guide plate 6 is provided on the side of the optical film 4 on which the transparent/scattering state switching element 124 is provided, and a transmissive liquid crystal panel 71 is provided instead of the transmissive liquid crystal panel 7.

In the transparent/scattering state switching element 124 as shown in FIGS. 13 and 14, the pair of transparent substrates 109 and the PDLC layer 111 in which dichroic dye molecules are introduced are the same as in the transparent/scattering state switching element 122 of the aforementioned first embodiment, but the electrodes 110 have a different structure in the present embodiment. Specifically, in the transparent/scattering state switching element 122, electrodes 110 are provided so as to cover the surfaces of the transparent substrates 109 on the surface of each transparent substrate 109 that faces another transparent substrate 109. However, in the transparent/scattering state switching element 124 of the present embodiment, a comb-shaped electrode 110*a* for generating a horizontal electric field is formed on the +Z surface of the transparent substrate 109 positioned on the minus side in the Z-axis direction, i.e., the surface facing the transparent substrate 109 that is disposed on the plus side in the Z-axis direction. In the comb-shaped electrode 110*a*, numerous rod-shaped electrodes extending in the X-axis direction are arranged in the Y-axis direction so as to generate a horizontal electric field in the Y-axis direction when a voltage is applied.

Furthermore, the absorption axis of the light-guide plate 6 is set to the Y-axis direction so as to establish a parallel Nicol relationship with the light-guide plate provided to the transparent/scattering state switching element 124 of the transmissive liquid crystal panel 71, i.e., a relationship in which the absorption axis is parallel. Aspects of the present embodiment other than those described above are the same as in the first embodiment.

The following description is of the operation of the display device according to the present embodiment thus configured, i.e., the operation of the light source device according to the present embodiment. The operations performed during a wide-angle display will first be described, but these operations are the same as in the aforementioned first embodiment. Specifically, as shown in FIG. 15, since voltage is not applied to the transparent/scattering state switching element 124 and the switching element is set to a scattering state, highly directive light emitted from the optical film 4 is uniformly scattered by the transparent/scattering state switching element 124 in a wide angle range, and a wide-angle display is created. Short-wavelength light is significantly scattered by the refractive index distribution of the microstructure in the transparent/scattering state switching element 124, but the blue dichroic dye molecules 150 therein are oriented in various directions in the same manner as the liquid crystal molecules 111*b*, and long-wavelength light is absorbed. The whiteness of the light emitted from the transparent/scattering state switching element 124 is thereby maintained, and yellowing does not occur. The light-guide plate 6 serves to align the polarization state of the light entering the transparent/scattering state switching element 124 with the linear polarization of the X-axis direction, but since the transparent/scattering state switching element 124 in the scattering state does not have refractive index anisotropy in the XY plane, there is no effect on the fundamental scattering operation.

The operations performed during the narrow-angle display will next be described. As shown in FIG. 16, when a voltage is applied to the comb-shaped electrode 110*a* of the transparent/scattering state switching element 124, a horizontal electric field in the Y-axis direction is applied to the PDLC layer 111. This horizontal electric field in the Y-axis direction causes the liquid crystal molecules 111*b* in the PDLC layer 111 to change orientation so that the major axis direction coincides with the Y-axis direction. The blue dichroic dye molecules 150 also change orientation in conformity with the orientation change of the liquid crystal molecules 111*b* so that the major axis direction coincides with the Y-axis direction. As previously mentioned, since the refractive index of the polymer matrix 111*a* is set so as to substantially match the refractive index of the liquid crystal molecules 111*b* in the minor axis direction, no difference in refractive index occurs between the polymer matrix 111*a* and the liquid crystal molecules 111*b* in the X-axis direction, but a difference in refractive index does occur in the Y-axis direction. Since the blue dichroic dye molecules 150 also change orientation so that the major axis direction coincides with the Y-axis direction, the dye absorbs almost no light in the X-axis direction, but significant absorption of light occurs in the Y-axis direction. Specifically, scattering and absorption do not occur when light that is linearly polarized in the X-axis direction enters the transparent/scattering state switching element 124, and scattering and absorption occur when light that is linearly polarized in the Y-axis direction enters the transparent/scattering state switching element 124. The light entering the transparent/scattering state switching element 124 in this arrangement is linearly polarized in the X-axis direction by the light-guide plate 6, and there is therefore no scattering or absorption of the light emitted from the transparent/scattering state switching element 124. A narrow-angle display that is free of color change is thereby created.

Next will be described a case in which the transparent/scattering state switching element 124 in the voltage-applied state is observed from an angle. As previously mentioned, the refractive index of the polymer matrix 111*a* is set so as to substantially match the refractive index of the liquid crystal molecules 111*b* in the minor axis direction, and the liquid crystal molecules 111*b* and the blue dichroic dye molecules 150 change orientation so that the major axis directions thereof coincide with the Y-axis direction when a voltage is applied. The light entering the transparent/scattering state switching element 124 is linearly polarized in the X-axis direction by the light-guide plate 6, and optical effects in the X-axis direction are therefore demonstrated. Specifically, the direction in which refraction and absorption have minimum anisotropy is used, and this state is not altered by tilting from the frontal direction. Therefore, even when the display is viewed from an angle, although the increase in the length of the optical path has an effect, refraction and absorption do not fluctuate, and there is therefore no significant increase in scattering and absorption. Scattering and color change can thereby be suppressed even when the display is viewed from an angle.

The comb-shaped electrode 110*a* in the present embodiment was described as being formed on the +Z surface of the transparent substrate 109 positioned on the minus side in the Z-axis direction, but the present invention is not limited by this configuration, and the comb-shaped electrode 110*a* may also be formed on the −Z surface of the transparent substrate 109 positioned on the plus side in the Z-axis direction. The comb-shaped electrode 110*a* may also be formed at a distance from the opposing surfaces of both substrates. Operations and effects of the third embodiment other than those described above are the same as in the first embodiment.

Figure 17:
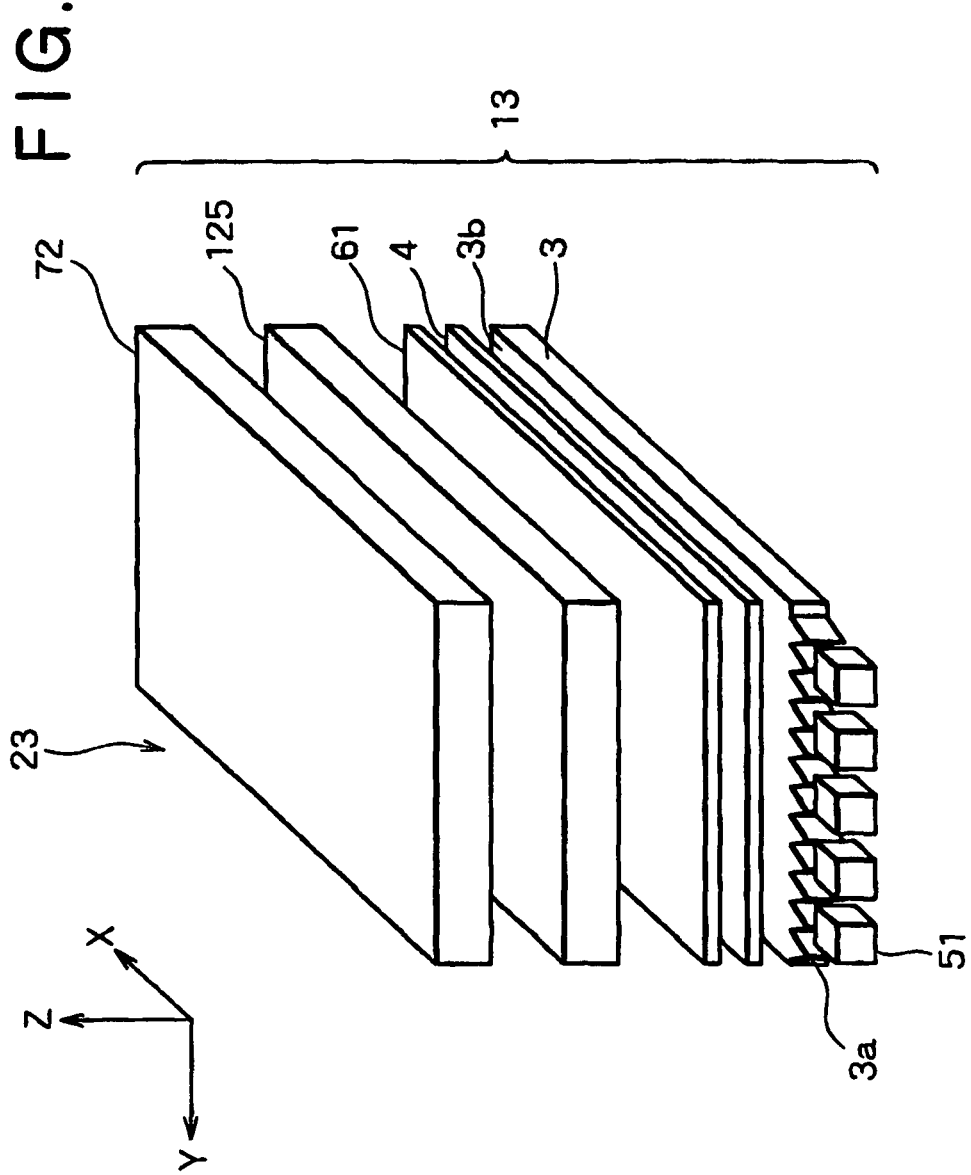
FIG. 17 is a perspective view showing the display device according to a fourth embodiment of the present invention.
Figure 18:
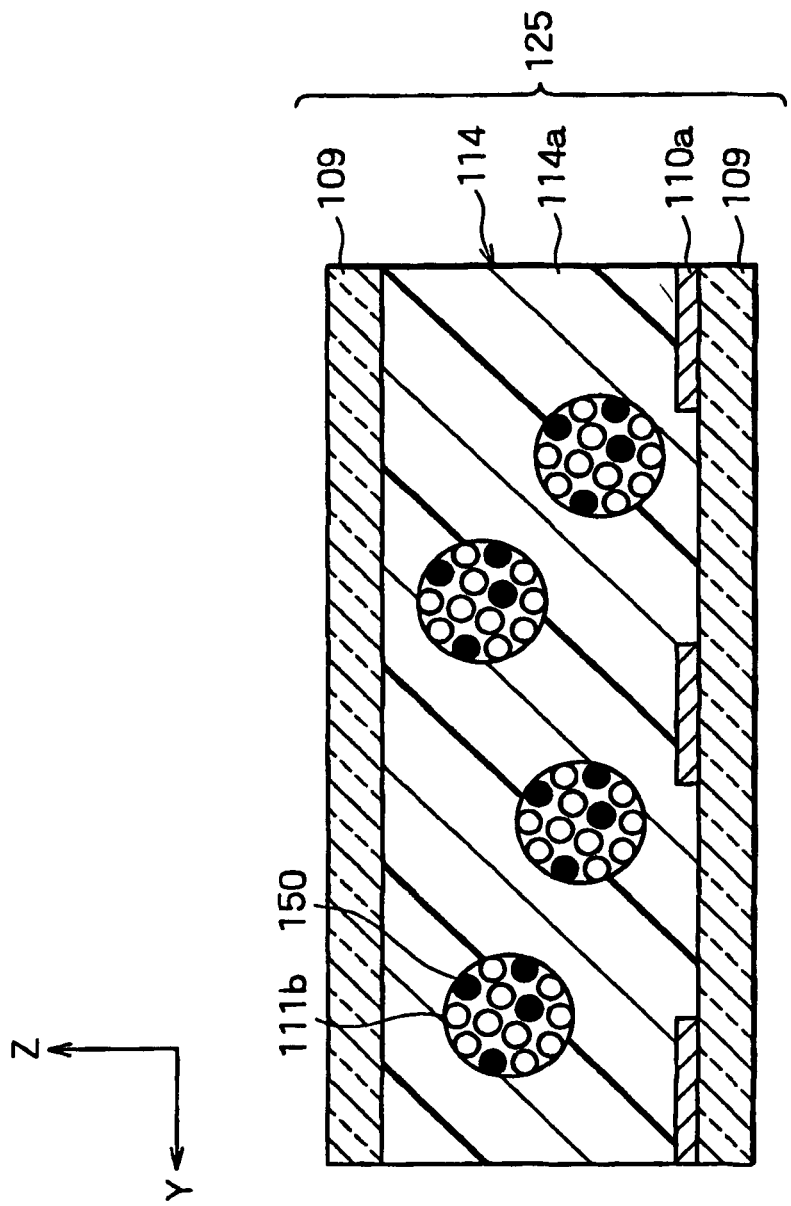
FIG. 18 is a sectional view showing the transparent/scattering state switching element that is a constituent element of the fourth embodiment.
Figure 19:
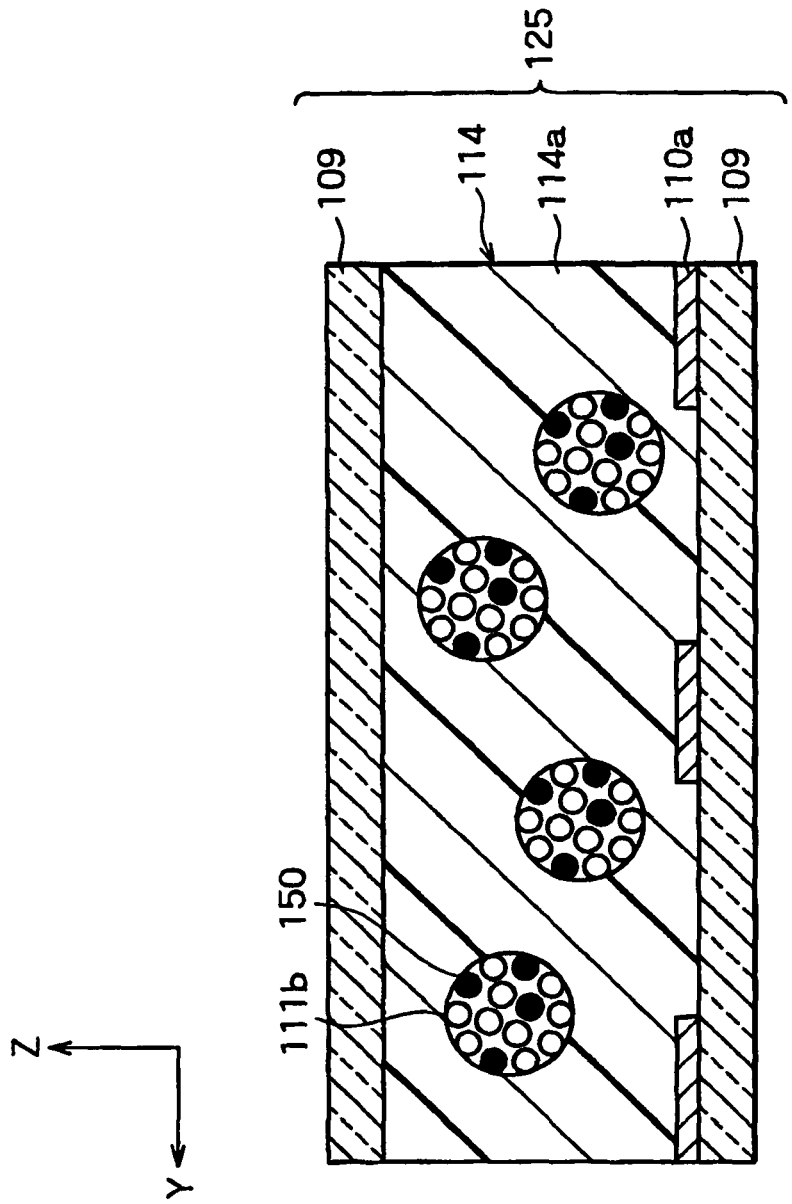
FIG. 19 is a sectional view showing the orientation state of the liquid crystal molecules and the blue dichroic dye molecules when the transparent/scattering state switching element of the fourth embodiment is in the transparent state.
Figure 20:
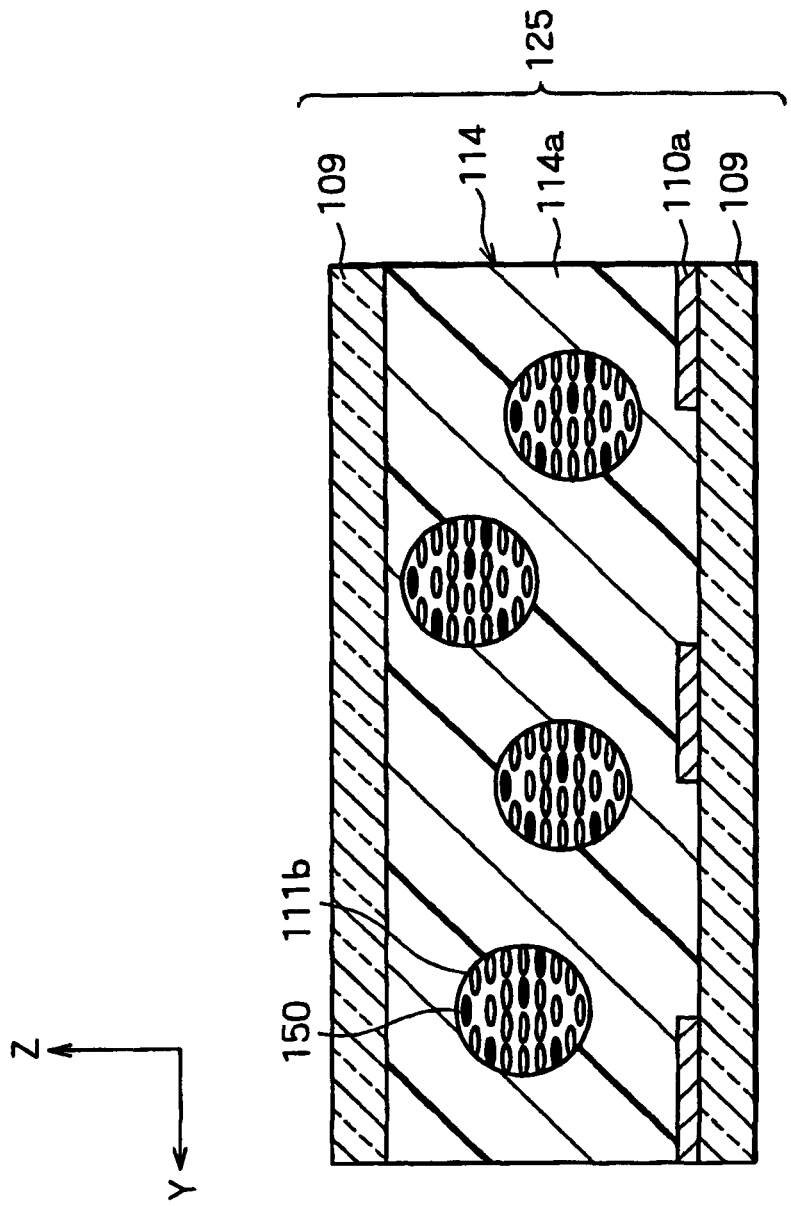
FIG. 20 is a sectional view showing the orientation state of the liquid crystal molecules and the blue dichroic dye molecules when the transparent/scattering state switching element of the fourth embodiment is in the scattering state.

A fourth embodiment of the present invention will next be described. FIG. 17 is a perspective view showing the display device according to the present embodiment; FIG. 18 is a sectional view showing the transparent/scattering state switching element that is a constituent element of the present embodiment; FIG. 19 is a sectional view showing the orientation state of the liquid crystal molecules and the blue dichroic dye molecules when the transparent/scattering state switching element of the present embodiment is in the transparent state; and FIG. 20 is a sectional view showing the orientation state of the liquid crystal molecules and the blue dichroic dye molecules when the transparent/scattering state switching element of the present embodiment is in the scattering state.

As shown in FIG. 17, the display device 23 and the light source device 13 of the fourth embodiment differ from the display device 22 and the light source device 12 of the third embodiment in that a transparent/scattering state switching element 125 is used instead of the transparent/scattering state switching element 124, a transmissive liquid crystal display panel 72 is used instead of the transmissive liquid crystal display panel 7, and a light-guide plate 61 is used instead of the light-guide plate 6.

In the transparent/scattering state switching element 125 as shown in FIG. 18, the structures of the transparent substrates 109 and the comb-shaped electrode 110a are the same as in the transparent/scattering state switching element 124 of the third embodiment, but a PDLC layer 114 in which dichroic dye molecules are introduced is used instead of the PDLC layer 111 in which dichroic dye molecules are introduced. In the PDLC layer 114 in which dichroic dye molecules are introduced, the liquid crystal molecules 111b and the blue dichroic dye molecules 150 are the same as in the PDLC layer 111, but a polymer matrix 114a is used in the PDLC layer 114. The polymer matrix 114a is formed by polymerizing a liquid crystal polymer, and is oriented using a rubbing method or another publicly known technique so that the maximum refractive index occurs in the X-axis direction, and the minimum refractive index occurs in the Y-axis direction. The refractive index of the polymer matrix 114a is adjusted so that at least the minimum value thereof is substantially the same as the minimum refractive index of the liquid crystal molecules 111b. Furthermore, the initial orientation of the liquid crystal molecules 111b is affected by the orientation of the polymer matrix 114a so that the major axis direction coincides with the X-axis direction. The blue dichroic dye molecules 150 are also aligned in the same manner as the liquid crystal molecules 111b so that the major axis direction thereof is in the X-axis direction. The absorption axis of the light-guide plate 61 is also set to the X-axis direction so as to establish a parallel Nicol relationship with the light-guide plate provided to the transparent/scattering state switching element 125 of the transmissive liquid crystal display panel 72, i.e., a relationship in which the absorption axis is parallel. Aspects of the present embodiment other than those described above are the same as in the third embodiment.

The following description is of the operation of the display device according to the present embodiment thus configured, i.e., the operation of the light source device according to the present embodiment. The operations performed during narrow-angle display will first be described. As shown in FIG. 19, when a voltage is not applied to the transparent/scattering state switching element 125, the initial orientation of the PDLC layer 114 is retained. Specifically, the minimum refractive index of the polymer matrix 114a occurs in the Y-axis direction, the minor axis direction of the liquid crystal molecules 111b is the Y-axis direction, and both refractive indices in the Y-axis direction are substantially the same. As previously mentioned, since the blue dichroic dye molecules 150 are also aligned in the same manner as the liquid crystal molecules 111b so that the major axis direction thereof is in the X-axis direction, light absorption by the dye molecules in the Y-axis direction is at a minimum. Specifically, scattering due to a difference in the index of refraction, and absorption due to the dichroic dye molecules do not occur in the Y-axis direction, and a transparent state is maintained. Since light that is linearly polarized in the Y-axis direction by the light-guide plate 61 enters the transparent/scattering state switching element 125, the incident light is emitted without being modulated by the transparent/scattering state switching element 125. A narrow-angle display is thereby created.

The operations performed during wide-angle display will next be described. As shown in FIG. 20, when a voltage is applied to the transparent/scattering state switching element 125, a horizontal electric field in the Y-axis direction is applied to the PDLC layer 114. This horizontal electric field in the Y-axis direction causes the liquid crystal molecules 111b in the PDLC layer 114 to change orientation so that the major axis direction coincides with the Y-axis direction. The blue dichroic dye molecules 150 also change orientation in conformity with the orientation change of the liquid crystal molecules 111b so that the major axis direction coincides with the Y-axis direction. As previously mentioned, since an orientation treatment is performed so that the refractive index of the polymer matrix 111a is minimized in the Y-axis direction, the difference in refractive index is maximized with respect to the liquid crystal molecules 111b that have changed orientation so that the major axis direction coincides with the Y-axis direction, and scattering in the Y-axis direction is maximized. The blue dichroic dye molecules 150 also change orientation so that the major axis thereof is in the Y-axis direction, the absorption of dye in the Y-axis direction is also maximized. Specifically, scattering and absorption are maximized when light that is linearly polarized in the Y-axis direction enters the transparent/scattering state switching element 125. In this arrangement, the light entering the transparent/scattering state switching element 125 is linearly polarized in the Y-axis direction by the light-guide plate 6, and the light emitted from the transparent/scattering state switching element 125 is therefore uniformly scattered, and a wide-angle display is created. Short-wavelength light is significantly scattered by the refractive index distribution of the microstructure in the transparent/scattering state switching element 125, but the orientation of the blue dichroic dye molecules 150 therein is changed to the Y-axis direction in the same manner as the liquid crystal molecules 111b, and long-wavelength light is therefore absorbed. The whiteness of the light emitted from the transparent/scattering state switching element 125 is thereby maintained, and yellowing does not occur. A wide-angle display state that is free of color change is thereby created.

A case will next be described in which the transparent/scattering state switching element 125 to which a voltage is not applied is viewed from an angle. As previously mentioned, when a voltage is not applied, the minimum refractive index of the polymer matrix 114a occurs in the Y-axis direction, the minor axis direction of the liquid crystal molecules 111b and the blue dichroic dye molecules 150 is the Y-axis direction, and both refractive indices in the Y-axis direction are substantially the same. The light entering the transparent/scattering state switching element 125 is linearly polarized in the Y-axis direction by the light-guide plate 61, and optical effects in the Y-axis direction are therefore demonstrated. Specifically, the direction in which refraction and absorption have minimum anisotropy is used, and this state is not altered by tilting from the frontal direction. Therefore, even when the display is viewed from an angle, although the increase in the length of the optical path has an effect, refraction and absorption do not fluctuate, and there is therefore no significant increase in scattering and absorption. Scattering and color change can thereby be suppressed even when the display is viewed from an angle.

In a case in which the transparent/scattering state switching element 125 in the voltage-applied state is viewed from an angle, the liquid crystal molecules 111b and the blue dichroic dye molecules 150 change orientation so that the major axes thereof coincide with the Y-axis direction, and the direction in which the minimum refractive index of the polymer matrix 114a occurs remains as the Y-axis direction. The light entering the transparent/scattering state switching element 125 is linearly polarized in the Y-axis direction by the light-guide plate 61, and optical effects in the Y-axis direction are therefore demonstrated. Specifically, the direction in which refraction and absorption have maximum anisotropy is used, and this state diminishes as the angle from the frontal direction increases. As a result, when the display is observed from an angle, although the length of the optical path increases, the difference in refractive index, and light absorption by the dichroic dye decrease, and a satisfactory state can be maintained in terms of viewing angle dependency. Specifically, in the fourth embodiment, excellent viewing angle characteristics can be obtained in both the wide-angle display state and the narrow-angle display state. Operations and effects of the fourth embodiment other than those described above are the same as in the first embodiment.

Figure 21:
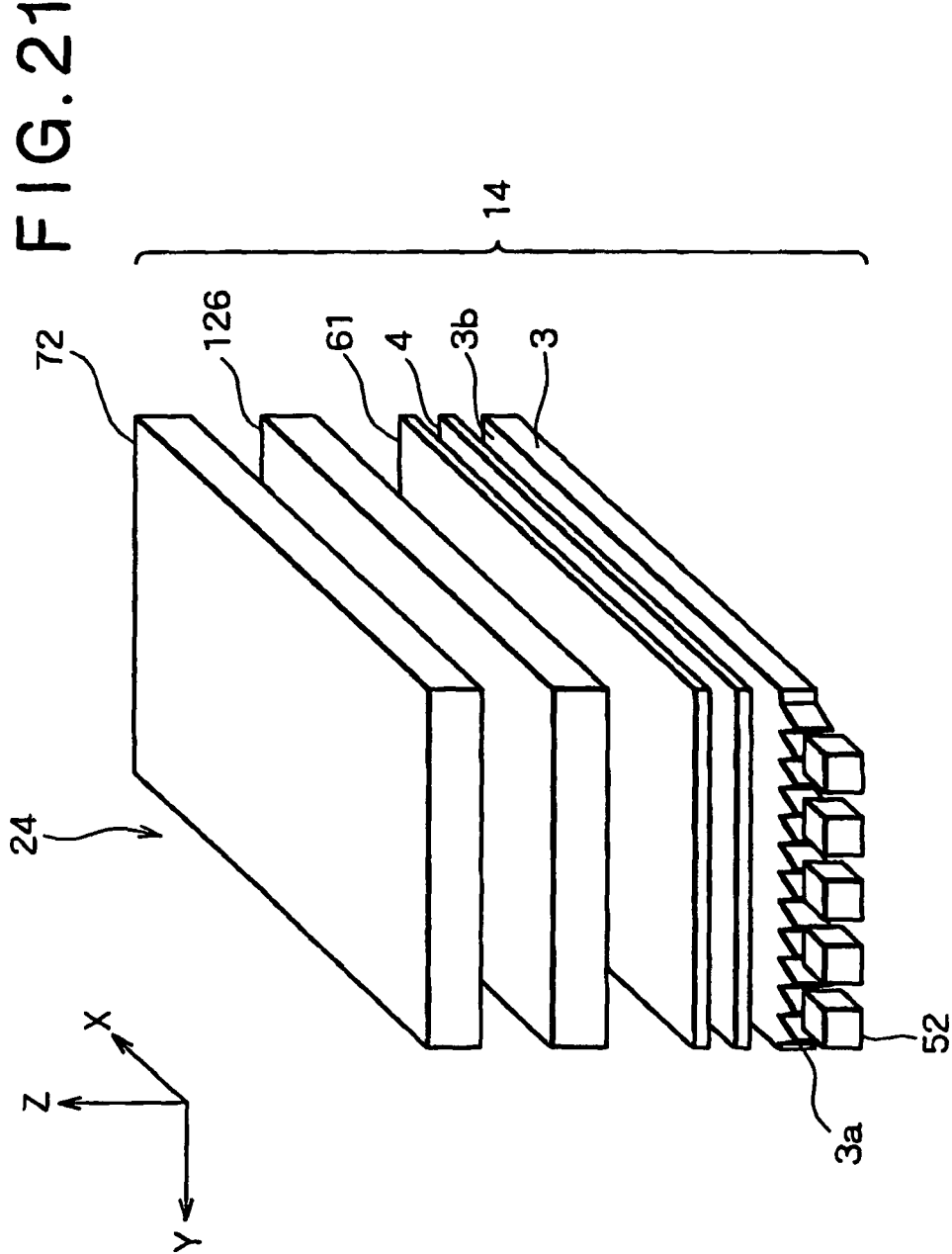
FIG. 21 is a perspective view showing the display device according to a fifth embodiment of the present invention.
Figure 22:
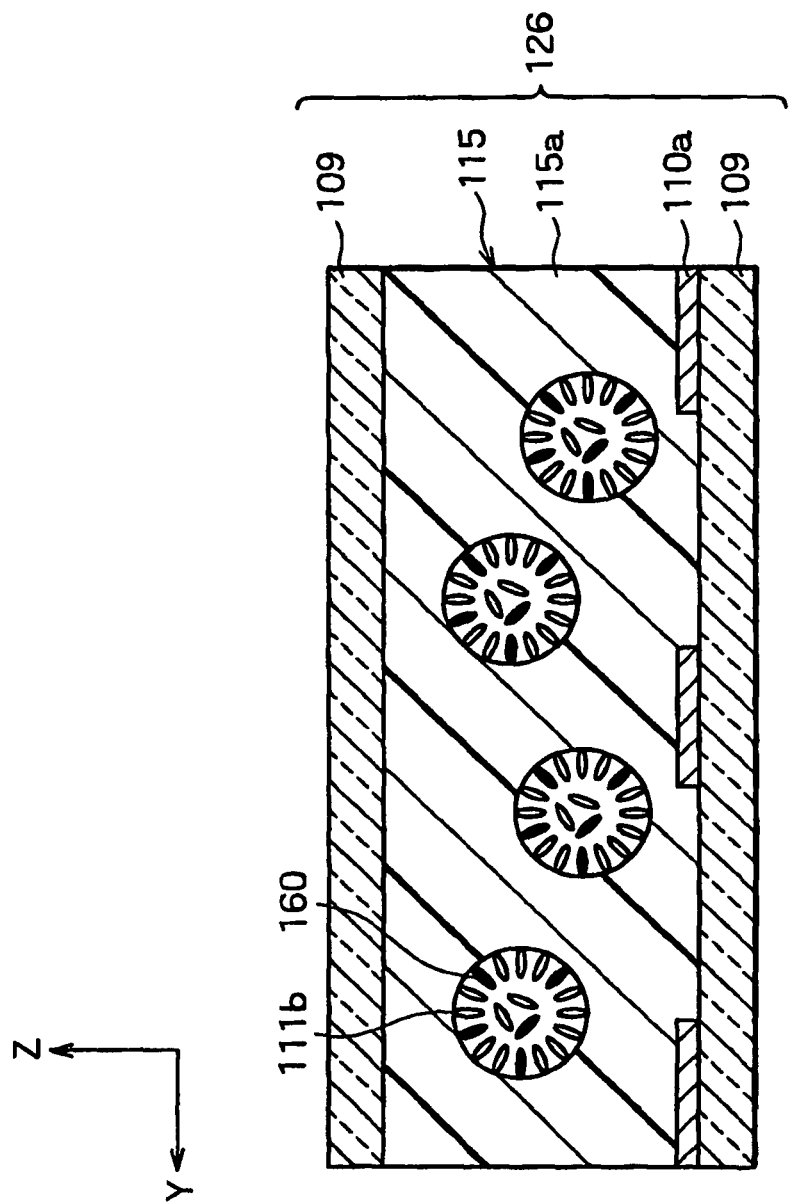
FIG. 22 is a sectional view showing the transparent/scattering state switching element that is a constituent element of the fifth embodiment.
Figure 23:
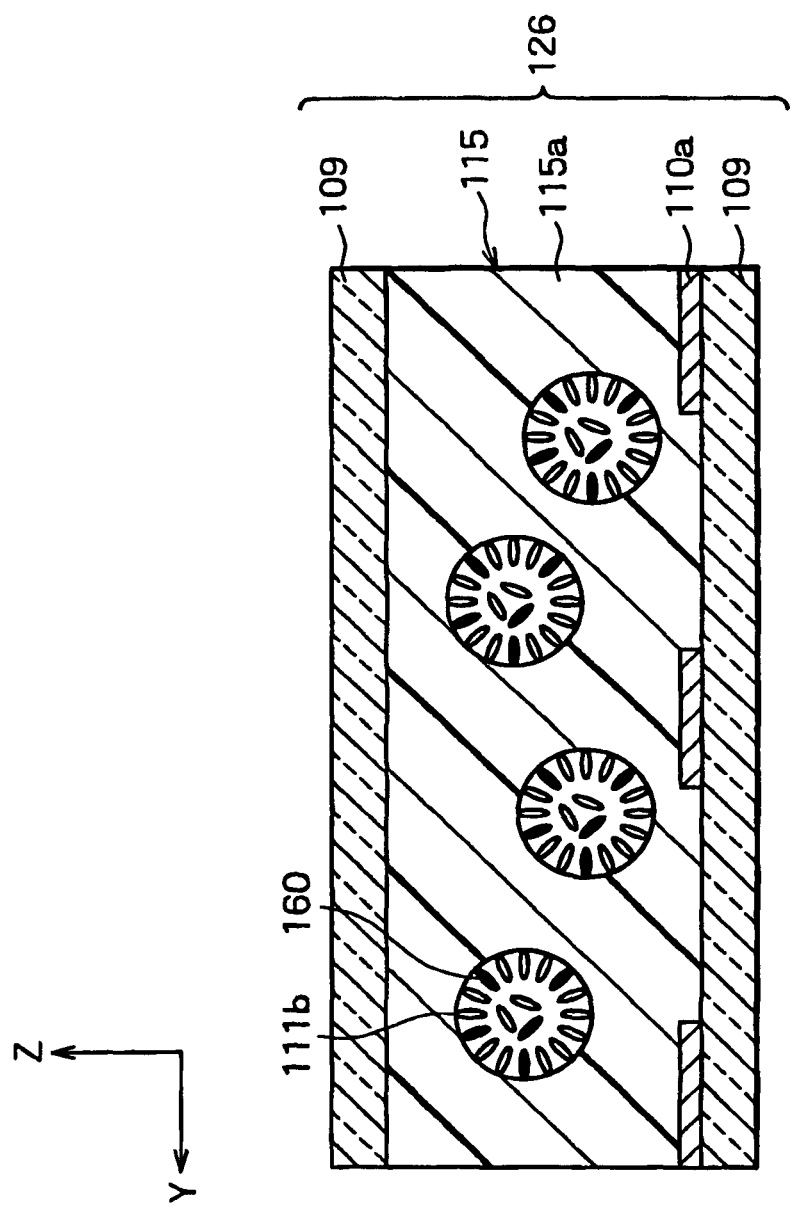
FIG. 23 is a sectional view showing the orientation state of the liquid crystal molecules and the yellow dichroic dye molecules when the transparent/scattering state switching element of the fifth embodiment is in the scattering state.
Figure 24:
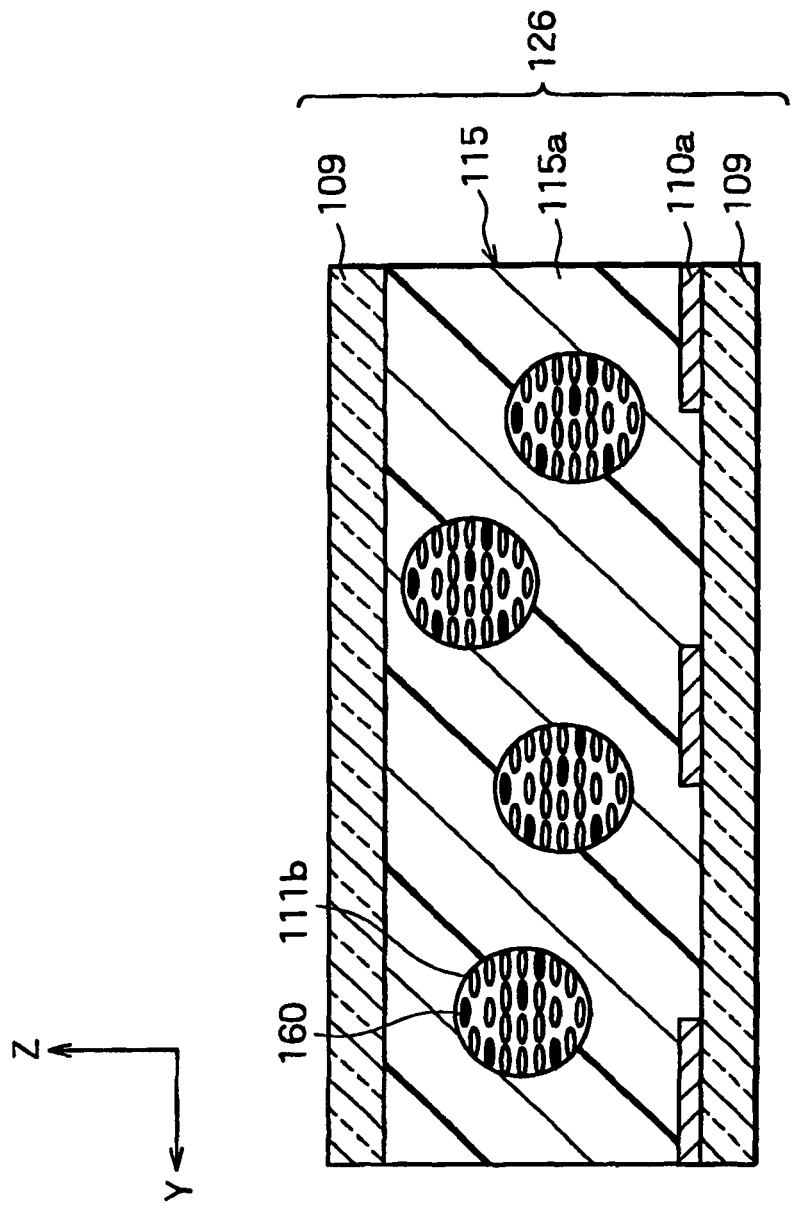
FIG. 24 is a sectional view showing the orientation state of the liquid crystal molecules and the yellow dichroic dye molecules when the transparent/scattering state switching element of the fifth embodiment is in the transparent state.

A fifth embodiment of the present invention will next be described. FIG. 21 is a perspective view showing the display device according to the present embodiment; FIG. 22 is a sectional view showing the transparent/scattering state switching element that is a constituent element of the present embodiment; FIG. 23 is a sectional view showing the orientation state of the liquid crystal molecules and the yellow dichroic dye molecules when the transparent/scattering state switching element of the present embodiment is in the scattering state; and FIG. 24 is a sectional view showing the orientation state of the liquid crystal molecules and the yellow dichroic dye molecules when the transparent/scattering state switching element of the present embodiment is in the transparent state.

As shown in FIG. 21, the display device 24 and the light source device 14 of the fifth embodiment differ from the display device 22 and the light source device 12 of the third embodiment in that a transparent/scattering state switching element 126 is used instead of the transparent/scattering state switching element 124, a transmissive liquid crystal display panel 72 is used instead of the transmissive liquid crystal display panel 7, a light-guide plate 61 is used instead of the light-guide plate 6, and bluish white LEDs 52 are used instead of the white LEDs 51 as the light source.

The bluish white LEDs 52 are composed, for example, of a blue LED and a yellow fluorescent tube that emits yellow light according to the blue light emitted by the blue LED, and white light is emitted using blue and yellow light. The blue light emitted by the blue LED is stronger than the yellow light emitted by the yellow fluorescent tube, so that bluish white light is emitted.

As shown in FIG. 22, the transparent substrates 109 and the comb-shaped electrode 110a of the transparent/scattering state switching element 126 have the same structure as in the transparent/scattering state switching element 124 in the third embodiment, but the transparent/scattering state switching element 126 differs in that a PDLC layer 115 in which dichroic dye molecules are introduced is used instead of the PDLC layer 111 in which dichroic dye molecules are introduced. The liquid crystal molecules 111b in the PDLC layer 115 in which dichroic dye molecules are introduced are the same as in the PDLC layer 111, but the PDLC layer 115 differs from the PDLC layer 111 in that yellow dichroic dye molecules 160 are used and a polymer matrix 115a is used. The yellow dichroic dye molecules 160 have more significant light absorption characteristics in the molecular major axis direction than in the molecular minor axis direction, and since the light absorption characteristics in the visible light region are such that light absorption in the wavelength band of 420 nm to 480 nm, which is the blue wavelength band, is greater than in other wavelength bands, light in the blue wavelength band is absorbed, and a yellow color is exhibited. Specifically, when the yellow dichroic dye molecules 160 are viewed from the molecular minor axis direction, yellow is exhibited more significantly than when the yellow dichroic dye molecules 160 are viewed from the molecular major axis direction. Materials are selected so that the refractive index of the polymer matrix 115a is substantially equal to the refractive index of the liquid crystal molecules 111b in the major axis direction, i.e., the maximum value of the refractive index anisotropy.

Furthermore, the absorption axis of the light-guide plate 61 is set to the X-axis direction so as to establish a parallel Nicol relationship with the light-guide plate provided to the transparent/scattering state switching element 126 of the transmissive liquid crystal display panel 72, i.e., a relationship in which the absorption axis is parallel. Aspects of the present embodiment other than those described above are the same as in the third embodiment.

The following description is of the operation of the display device according to the present embodiment thus configured, i.e., the operation of the light source device according to the present embodiment. The operations performed during a wide-angle display will first be described. As shown in FIG. 23, since voltage is not applied to the transparent/scattering state switching element 126 and the switching element is set to a scattering state, highly directive light emitted from the optical film 4 is uniformly scattered by the transparent/scattering state switching element 126 in a wide angle range, and a wide-angle display is created. Short-wavelength light is significantly scattered by the refractive index distribution of the microstructure in the transparent/scattering state switching element 126, but the yellow dichroic dye molecules 160 therein are oriented in the same direction in the same manner as the liquid crystal molecules 111b, and short-wavelength light is absorbed. The light emitted from the transparent/scattering state switching element 126 is thereby colored yellow with respect to the incident light. However, since bluish light is emitted from the bluish white LEDs 52 as the light source, the resultant light emitted from the transparent/scattering state switching element 126 is white.

The operations performed during the narrow-angle display will next be described. As shown in FIG. 24, when a voltage is applied to the comb-shaped electrode 110a of the transparent/scattering state switching element 126, a horizontal electric field in the Y-axis direction is applied to the PDLC layer 115. This horizontal electric field in the Y-axis direction causes the liquid crystal molecules 111b in the PDLC layer 115 to change orientation so that the major axis direction coincides with the Y-axis direction. The yellow dichroic dye molecules 160 also change orientation in conformity with the orientation change of the liquid crystal molecules 111b so that the major axis direction coincides with the Y-axis direction. As previously mentioned, since the refractive index of the polymer matrix 115a is set so as to substantially match the refractive index of the liquid crystal molecules 111b in the major axis direction, no difference in refractive index occurs between the polymer matrix 115a and the liquid crystal molecules 111b in the Y-axis direction Since the yellow dichroic dye molecules 160 also change orientation so that the major axis direction coincides with the Y-axis direction, significant absorption of light occurs in the Y-axis direction. Specifically, scattering and absorption do not occur when light that is linearly polarized in the Y-axis direction enters the transparent/scattering state switching element 126, and only absorption occurs. The light entering the transparent/scattering state switching element 126 in this arrangement is linearly polarized in the Y-axis direction by the light-guide plate 61, and there is therefore no scattering of the light emitted from the transparent/scattering state switching element 126 in relation to the incident light, and a yellowed state occurs. As previously mentioned, since bluish light is emitted from the bluish white LEDs 52 as the light source, the resultant light emitted from the transparent/scattering state switching element 126 is white.

Blue dichroic dye molecules were used in the first through fourth embodiments described above, but yellow dichroic dye molecules are used in the present embodiment. The selection of dyes used can be increased, and a low-cost device can be produced by selecting a highly reliable, inexpensive dye material. The present embodiment was described as using yellow dichroic dye molecules, but the present invention is not limited by this configuration, and any material may be suitable for use insofar as it is possible to suppress a color change in the display screen when the viewing angle is switched. Operations and effects of the fifth embodiment other than those described above are the same as in the first embodiment.

Figure 25:
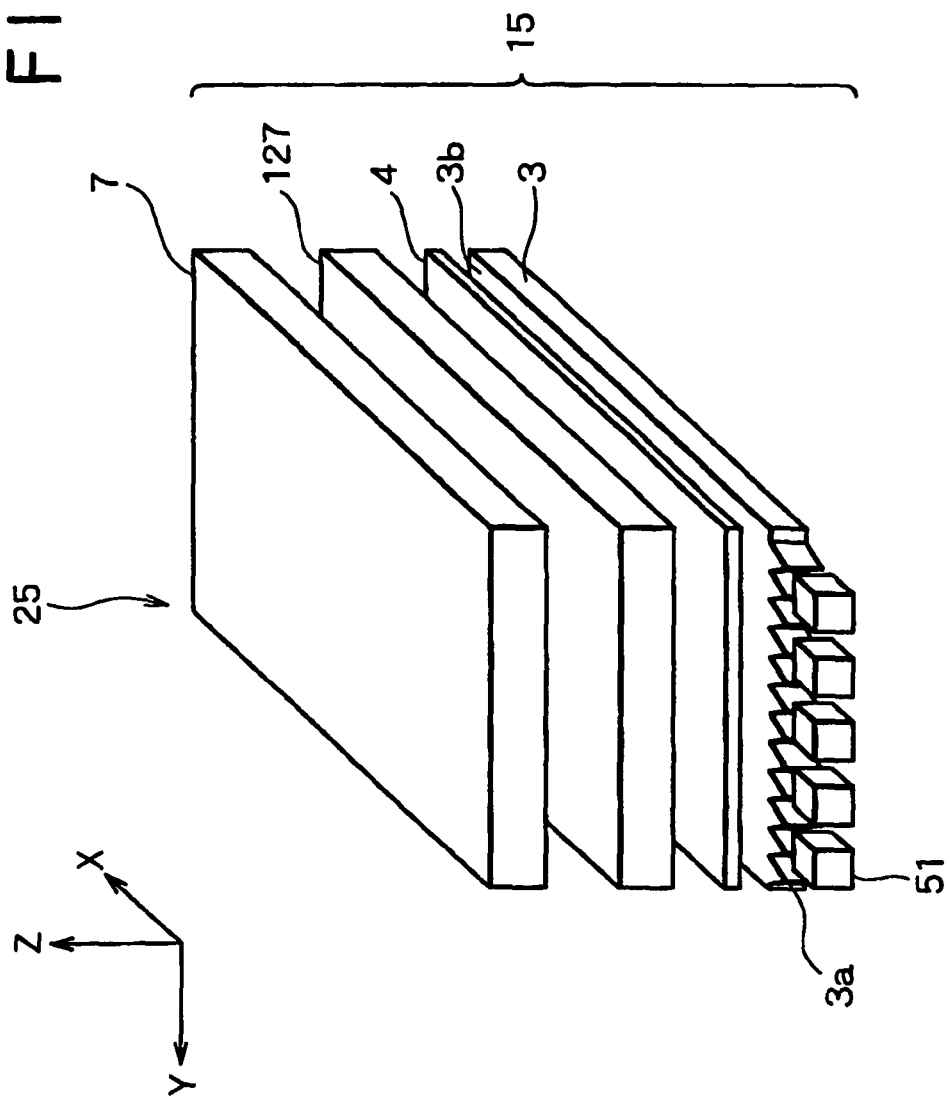
FIG. 25 is a perspective view showing the display device according to a sixth embodiment of the present invention.
Figure 26:
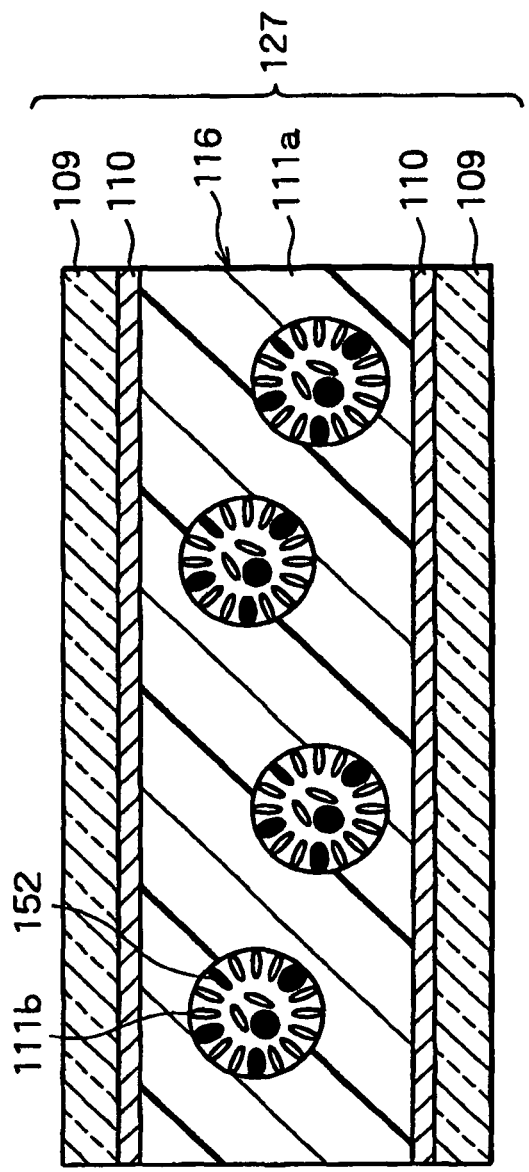
FIG. 26 is a sectional view showing the transparent/scattering state switching element that is a constituent element of the sixth embodiment.
Figure 27:
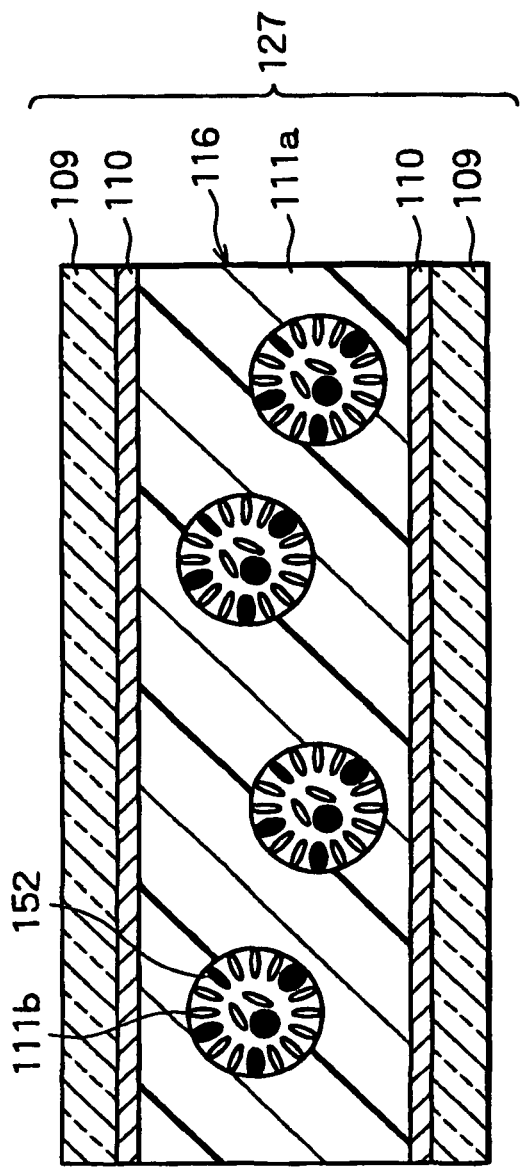
FIG. 27 is a sectional view showing the orientation state of the liquid crystal molecules and the blue dichroic dye molecules when the transparent/scattering state switching element of the sixth embodiment is in the scattering state.
Figure 28:
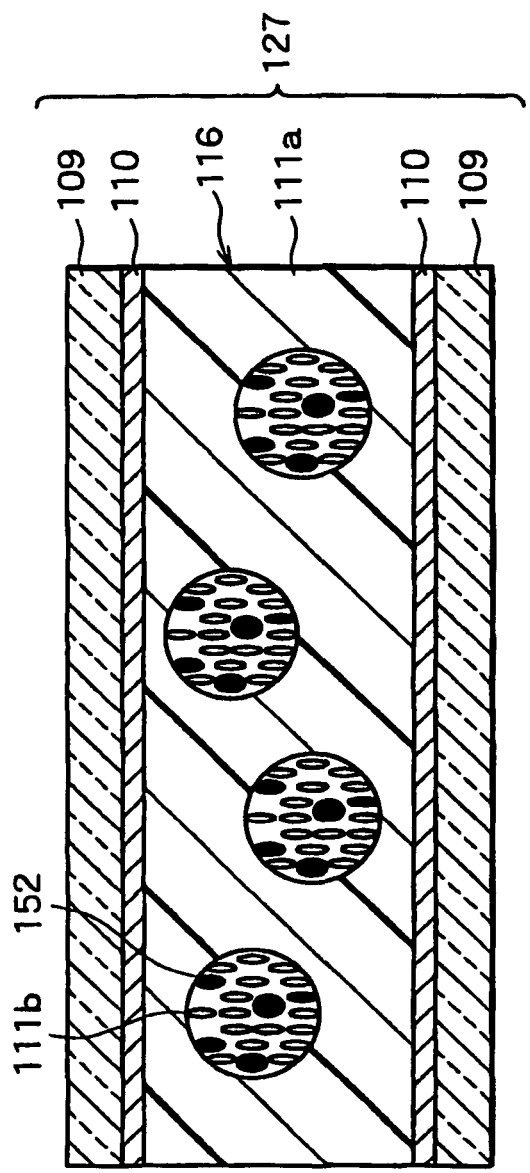
FIG. 28 is a sectional view showing the orientation state of the liquid crystal molecules and the blue dichroic dye molecules when the transparent/scattering state switching element of the sixth embodiment is in the transparent state.

A sixth embodiment of the present invention will next be described. FIG. 25 is a perspective view showing the display device according to the present embodiment; FIG. 26 is a sectional view showing the transparent/scattering state switching element that is a constituent element of the present embodiment; FIG. 27 is a sectional view showing the orientation state of the liquid crystal molecules and the blue dichroic dye molecules when the transparent/scattering state switching element of the present embodiment is in the scattering state; and FIG. 28 is a sectional view showing the orientation state of the liquid crystal molecules and the blue dichroic dye molecules when the transparent/scattering state switching element of the present embodiment is in the transparent state.

As shown in FIG. 25, the display device 25 and the light source device 15 of the sixth embodiment differ from the display device 2 and the light source device 1 of the first embodiment in that a transparent/scattering state switching element 127 is used instead of the transparent/scattering state switching element 122.

As shown in FIG. 26, the transparent substrates 109 and the electrode 110 of the transparent/scattering state switching element 127 have the same structure as in the transparent/scattering state switching element 122 in the first embodiment, but the transparent/scattering state switching element 127 differs in that a PDLC layer 116 in which dichroic dye molecules are introduced is used instead of the PDLC layer 111 in which dichroic dye molecules are introduced. The polymer matrix 111a and the liquid crystal molecules 111b in the PDLC layer 116 are the same as in the PDLC layer 111, but the PDLC layer 116 differs from the PDLC layer 111 in that blue dichroic dye molecules 152 are used. The blue dichroic dye molecules 150 in the aforementioned first embodiment had a narrow rod-shaped molecular structure, and had more significant light-absorption characteristics in the molecular major axis direction than in the minor axis direction. However, the blue dichroic dye molecules 152 in the sixth embodiment have a disk-shaped discotic structure, and have light-absorption characteristics whereby light absorption is weaker in the molecular minor axis direction than in other directions. Since the light absorption characteristics are such that light absorption in the wavelength band of 420 nm to 480 nm, which is the blue wavelength band, is weaker than in other wavelength bands, light in wavelengths other than the blue wavelength band is absorbed, and a blue color is exhibited. Specifically, when the blue dichroic dye molecules 152 are viewed from the molecular minor axis direction, blue is exhibited more significantly than when the blue dichroic dye molecules 152 are viewed from another direction. Aspects of the present embodiment other than those described above are the same as in the first embodiment.

The following description is of the operation of the display device according to the present embodiment thus configured, i.e., the operation of the light source device according to the present embodiment. The operations performed during a wide-angle display will first be described. As shown in FIG. 27, since voltage is not applied to the transparent/scattering state switching element 127 during wide-angle display, and the liquid crystal molecules 111b are oriented in various directions, an extremely small refractive index distribution occurs, and a scattering state is created. Highly directive light emitted from the optical film 4 is thereby uniformly scattered by the transparent/scattering state switching element 127 in a wide angle range, and a wide-angle display is created. At this time, the blue dichroic dye molecules 152 having a discotic shape are oriented in various directions in the same manner as the liquid crystal molecules 111b. Specifically, short-wavelength light is significantly scattered by the refractive index distribution of the microstructure, but the discotic blue dichroic dye molecules 152 therein are oriented in various directions in the same manner as the liquid crystal molecules 111b, and long-wavelength light is absorbed. The same whiteness as that of the incident light can therefore be maintained in the light emitted from the transparent/scattering state switching element 127, and a wide-angle display state can be created that is free of color change.

The operations performed during a narrow-angle display will next be described. As shown in FIG. 28, when a voltage is applied to the electrode 110 of the transparent/scattering state switching element 127, an electric field in the Z-axis direction is applied to the PDLC layer 116. This electric field in the Z-axis direction causes the liquid crystal molecules 111b in the PDLC layer 116 to change orientation so that the major axis direction coincides with the Z-axis direction. In contrast, the blue dichroic dye molecules 152 change orientation in a manner similar to a coin upended in the XY plane between the liquid crystal molecules 111b that are oriented upright in the Z-axis direction. The minor axes of the blue dichroic dye molecules 152 at this time are oriented in various directions within the XY plane. As previously mentioned, since the refractive index of the polymer matrix 111a is set so as to substantially match the refractive index of the liquid crystal molecules 111b in the minor axis direction, no difference in refractive index occurs between the polymer matrix 111a and the liquid crystal molecules 111b in the Z-axis direction. Since the blue dichroic dye molecules 152 also change orientation in a manner similar to a coin upended in the XY plane, significant absorption of light does not occur in the Z-axis direction. There is therefore no scattering or absorption of the light emitted from the transparent/scattering state switching element 127, and the same whiteness as that of the incident light can be maintained. A narrow-angle display that is free of color change is therefore created.

Next will be described a case in which the transparent/scattering state switching element 127 in the voltage-applied state is observed from an angle. As previously mentioned, the refractive index of the polymer matrix 111a is set so as to substantially match the refractive index of the liquid crystal molecules 111b in the minor axis direction, the liquid crystal molecules 111b change orientation so that the major axis directions thereof coincide with the Z-axis direction when a voltage is applied, and blue dichroic dye molecules 152 change orientation in a manner similar to a coin upended in the XY plane. When this orientation state is observed from a direction angled from the Z-axis direction, the apparent refractive index of the liquid crystal molecules 111b differs from the refractive index of the polymer matrix 111a, and this difference in refractive index increased particularly as the angle from the frontal direction increases. Since the length of the optical path also increases as the angle from the frontal direction increases, scattering increases as a result. Specifically, when a voltage is applied to the transparent/scattering state switching element, the scattering increases as the tilt from the frontal direction increases, and a yellowish color occurs when dye has not been introduced. In contrast, when the blue dichroic dye molecules 152 of the present embodiment are introduced, the blue dichroic dye molecules 152 create almost no light-absorption effects of a dye in the frontal direction, but significant light-absorption effects occur as the angle increases. Since the dye molecules in the present embodiment have a discotic shape, and are oriented in the manner of a coin upended in the XY plane, significant light-absorption effects can be demonstrated in an angled direction in relation to the first embodiment of the present invention. Specifically, yellow-reducing effects can be demonstrated more significantly in an angled direction. Operations and effects of the sixth embodiment other than those described above are the same as in the first embodiment.

Figure 29:
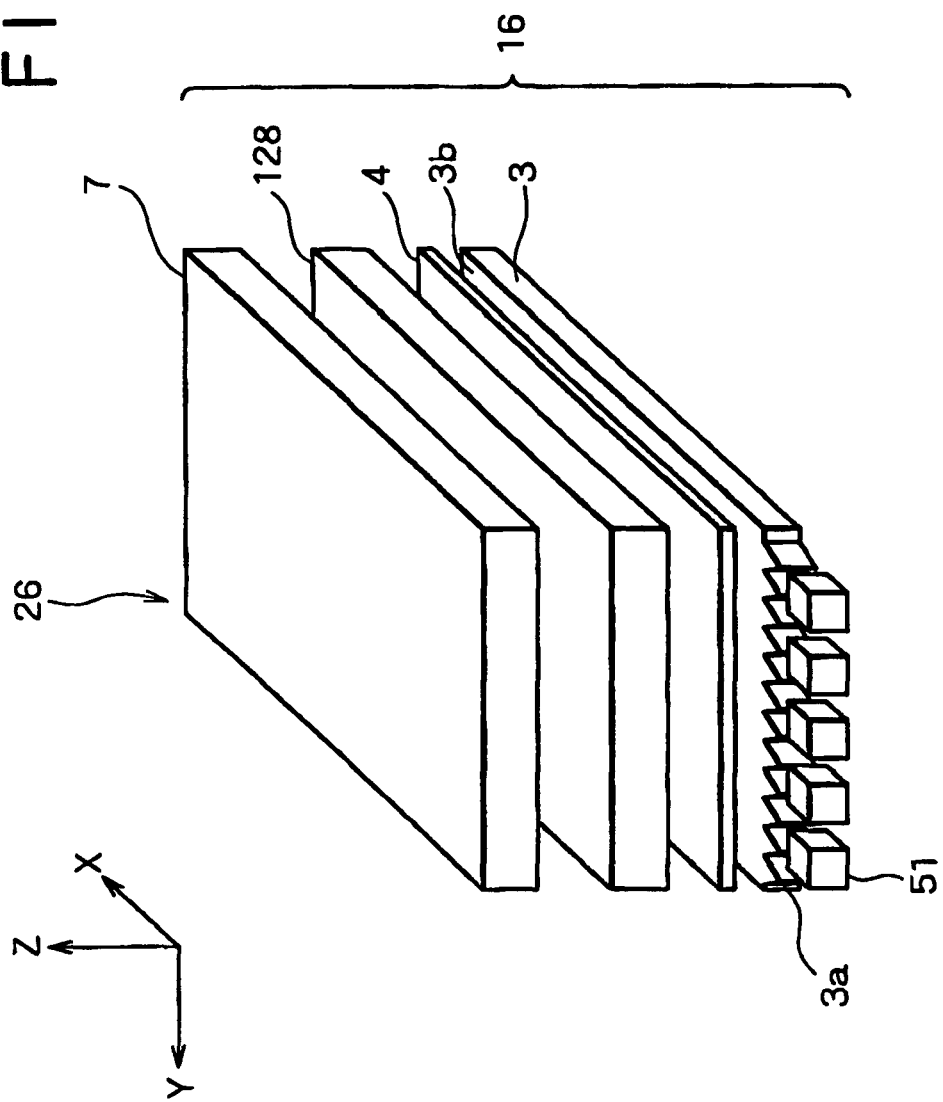
FIG. 29 is a perspective view showing the display device according to a seventh embodiment of the present invention.
Figure 30:
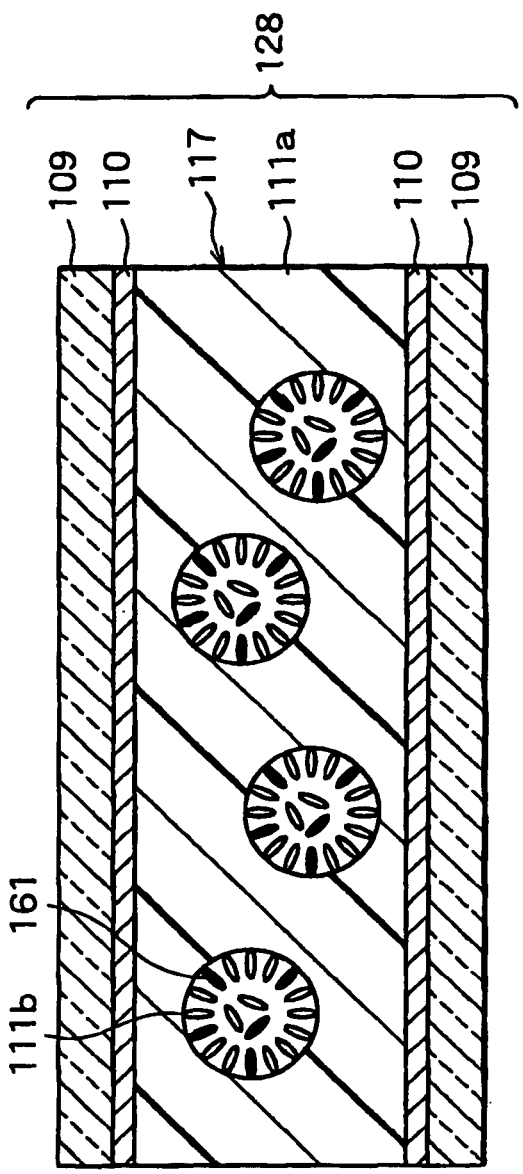
FIG. 30 is a sectional view showing the transparent/scattering state switching element that is a constituent element of the seventh embodiment.
Figure 31:
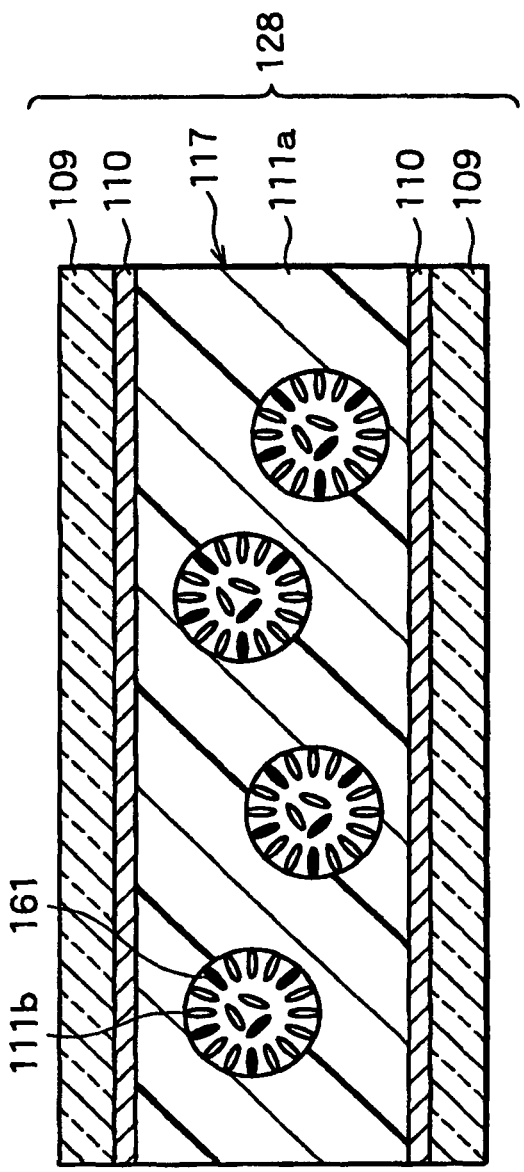
FIG. 31 is a sectional view showing the orientation state of the liquid crystal molecules and the yellow dichroic dye molecules when the transparent/scattering state switching element of the seventh embodiment is in the scattering state.
Figure 32:
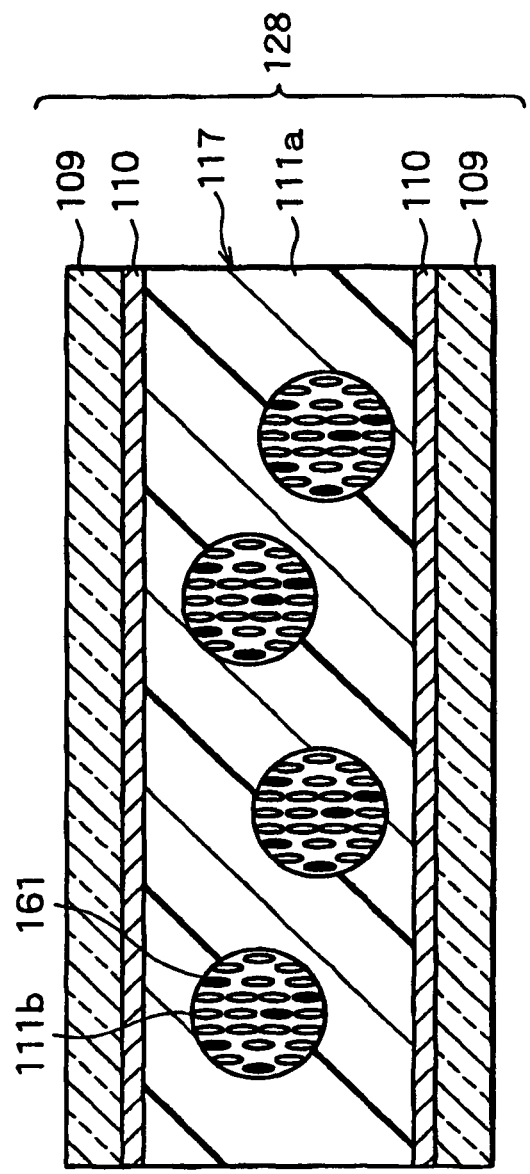
FIG. 32 is a sectional view showing the orientation state of the liquid crystal molecules and the yellow dichroic dye molecules when the transparent/scattering state switching element of the seventh embodiment is in the transparent state.

A seventh embodiment of the present invention will next be described. FIG. 29 is a perspective view showing the display device according to the present embodiment; FIG. 30 is a sectional view showing the transparent/scattering state switching element that is a constituent element of the present embodiment; FIG. 31 is a sectional view showing the orientation state of the liquid crystal molecules and the yellow dichroic dye molecules when the transparent/scattering state switching element of the present embodiment is in the scattering state; and FIG. 32 is a sectional view showing the orientation state of the liquid crystal molecules and the yellow dichroic dye molecules when the transparent/scattering state switching element of the present embodiment is in the transparent state.

As shown in FIG. 29, the display device 26 and the light source device 16 of the seventh embodiment differ from the display device 2 and the light source device 1 of the first embodiment in that a transparent/scattering state switching element 128 is used instead of the transparent/scattering state switching element 122.

As shown in FIG. 30, the transparent substrates 109 and the electrode 110 of the transparent/scattering state switching element 128 have the same structure as in the transparent/scattering state switching element 122 in the first embodiment, but the transparent/scattering state switching element 127 differs in that a PDLC layer 117 in which dichroic dye molecules are introduced is used instead of the PDLC layer 111 in which dichroic dye molecules are introduced. The polymer matrix 111a and the liquid crystal molecules 111b in the PDLC layer 117 in which dichroic dye molecules are introduced are the same as in the PDLC layer 111, but the PDLC layer 117 differs from the PDLC layer 111 in that dichroic dye molecules 161 are used. The blue dichroic dye molecules 150 in the aforementioned first embodiment had a narrow rod-shaped molecular structure, and had more significant light-absorption characteristics in the molecular major axis direction than in the minor axis direction. However, the dichroic dye molecules 161 in the seventh embodiment have light-absorption characteristics for different wavelength bands in the molecular major axis direction and the molecular minor axis direction. For example, light in wavelength bands other than the blue wavelength band is absorbed in the molecular major axis direction, and light in the blue wavelength band is absorbed in the molecular minor axis direction. As a result, yellow is exhibited when the dichroic dye molecules 161 are observed from the molecular major axis direction, and blue is exhibited when the dichroic dye molecules 161 are observed from the molecular minor axis direction. When numerous dichroic dye molecules 161 are oriented in various random directions, although blue and yellow basically counteract each other, blue is stronger, and a pale blue color is therefore exhibited. Aspects of the present embodiment other than those described above are the same as in the first embodiment.

The following description is of the operation of the display device according to the present embodiment thus configured, i.e., the operation of the light source device according to the present embodiment. The operations performed during a wide-angle display will first be described. As shown in FIG. 31, since voltage is not applied to the transparent/scattering state switching element 128 during wide-angle display, and the liquid crystal molecules 111b are oriented in various directions, an extremely small refractive index distribution occurs, and a scattering state is created. Highly directive light emitted from the optical film 4 is thereby uniformly scattered by the transparent/scattering state switching element 128 in a wide angle range, and a wide-angle display is created. At this time, the dichroic dye molecules 161 are oriented in various directions in the same manner as the liquid crystal molecules 111b. Specifically, short-wavelength light is significantly scattered by the refractive index distribution of the microstructure, but the dichroic dye molecules 161 therein are oriented in various directions in the same manner as the liquid crystal molecules 111b, and long-wavelength light is absorbed. This absorption is weaker than in the first embodiment of the present invention, and the light emitted from the transparent/scattering state switching element 128 is therefore slightly more yellow than the white incident light.

The operations performed during a narrow-angle display will next be described. As shown in FIG. 32, when a voltage is applied to the electrode 110 of the transparent/scattering state switching element 128, an electric field in the Z-axis direction is applied to the PDLC layer 117. This electric field in the Z-axis direction causes the liquid crystal molecules 111b in the PDLC layer 117 to change orientation so that the major axis direction coincides with the Z-axis direction, and the dichroic dye molecules 161 also change orientation in the same manner so that the major axis direction thereof coincides with the Z-axis direction. As previously mentioned, since the refractive index of the polymer matrix 111a is set so as to substantially match the refractive index of the liquid crystal molecules 111b in the minor axis direction, no difference in refractive index occurs between the polymer matrix 111a and the liquid crystal molecules 111b in the Z-axis direction. Furthermore, since the dichroic dye molecules 161 also change orientation so that the major axis direction thereof coincides with the Z-axis direction, a slight yellow color is exhibited when the display is observed from the frontal direction. This color is the same as that of the light emitted from the transparent/scattering state switching element 128 when the transparent/scattering state switching element 128 is in the scattering state, and is slightly yellower white than the color of the incident light. According to the configuration described above, the display can be switched without a color change occurring between the wide-angle display and the narrow-angle display.

Since the dye molecules have different light-absorption characteristics according to the axis direction in the present embodiment, the color correction effects during wide-angle display can be reduced and applied more effectively to a PDLC that scatters light of smaller wavelengths relative to the first embodiment of the present invention. Operations and effects of the seventh embodiment other than those described above are the same as in the first embodiment.

Figure 33:
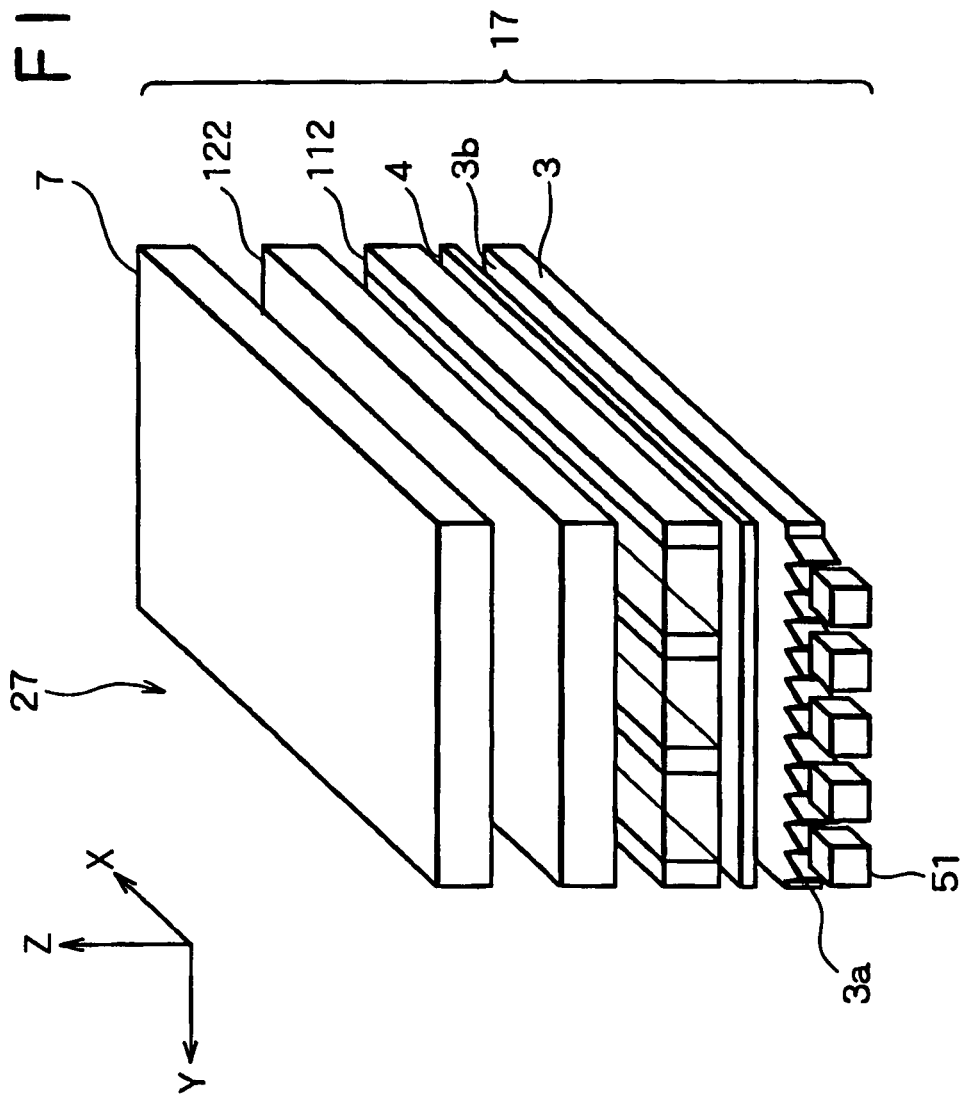
FIG. 33 is a perspective view showing the display device according to an eighth embodiment of the present invention.

An eighth embodiment of the present invention will next be described. FIG. 33 is a perspective view showing the display device according to the present embodiment; and FIG. 34 is a perspective view showing the louver that is a light-direction restriction element as a constituent element of the present embodiment.

Figure 34:
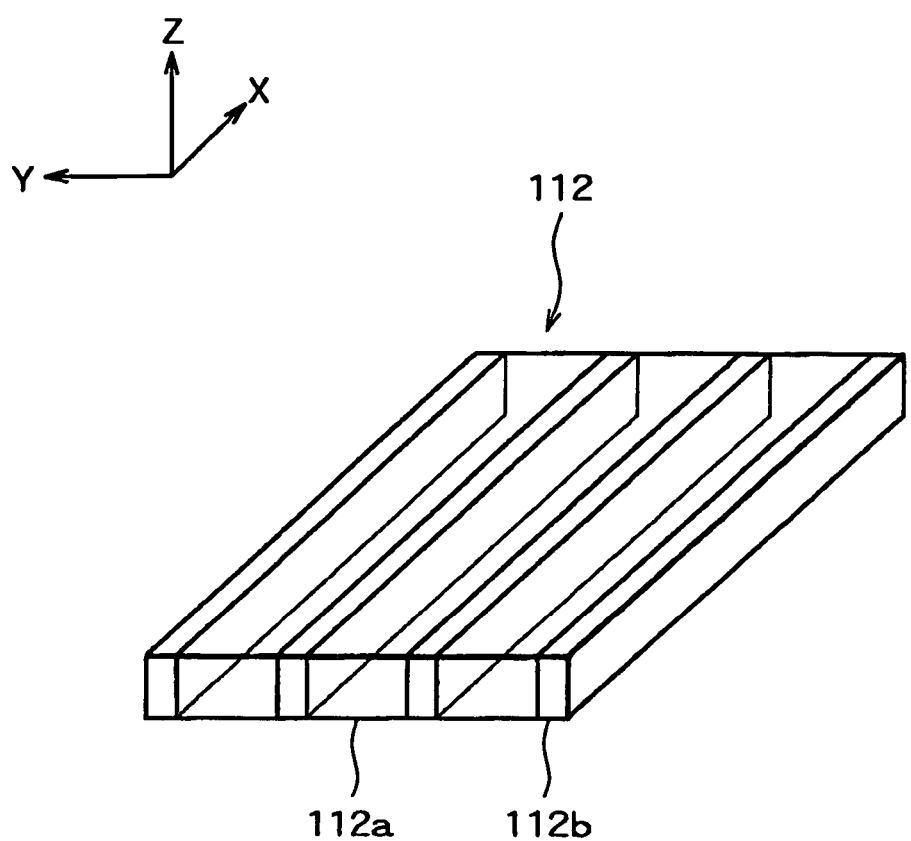
FIG. 34 is a perspective view showing the louver that is a constituent element of the eighth embodiment.

As shown in FIGS. 33 and 34, the display device 27 and the light source device 17 according to the present eighth embodiment feature the use of a louver 112, which is a constituent element in the form of a light-direction restricting element, in comparison with the display device 2 and the light source device 1 according to the first embodiment described above. The louver 112 is disposed between the optical film 4 and the transparent/scattering state switching element 122.

As shown in FIG. 34, the louver 112 has light-transmitting transparent areas 112a and light-absorbing absorption areas 112b, and these areas are disposed in an alternating fashion in the direction parallel to the louver surface. The direction in which the transparent and absorbing areas are alternately disposed is the Y-axis direction shown in FIG. 33. Aspects of the present embodiment other than those described above are the same as in the first embodiment.

In the present embodiment, among the light beams emitted from the optical film 4, light beams inclined to the Y-axis direction with respect to the +Z direction at an angle that is equal to or greater than a fixed value arrive at the absorption area 112b and are absorbed and removed. The louver 112 can thereby increase the directivity of light emitted from the optical film 4 in the Y-axis direction. As a result, light can be prevented from leaking in the diagonal direction in a narrow viewing angle display, and the effect of preventing surreptitious viewing can be increased. Operations and effects of the eighth embodiment other than those described above are the same as in the first embodiment.

In the present embodiment, an example was described in which the Y-axis direction was used as the orientation direction of the transparent and absorption areas of the louver, but the present invention is not limited to this configuration, and the orientation may be rotated and arranged in the XY plane. The moiré effect produced between the louver and display panel can be made to be less noticeable, and the display quality can be improved.

A plurality of louvers 112 may also be used instead of a single louver 112 as the light-direction regulating element. The directivity of emitted light can be increased particularly when two louvers are arranged so that the directions in which transparent regions and absorbing regions are arranged in alternating fashion in each louver are not parallel. Effects for preventing surreptitious viewing can therefore be enhanced.

Furthermore, instead of using a plurality of louvers, a configuration may be used in which a single louver has a plurality of directions in which the transparent regions and the absorbing regions are arranged in alternating fashion. This configuration makes it possible to provide a thinner profile in relation to the use of a plurality of louvers. Operations and effects in Embodiment 8 other than those described above are the same as in Embodiment 1.

Figure 35:
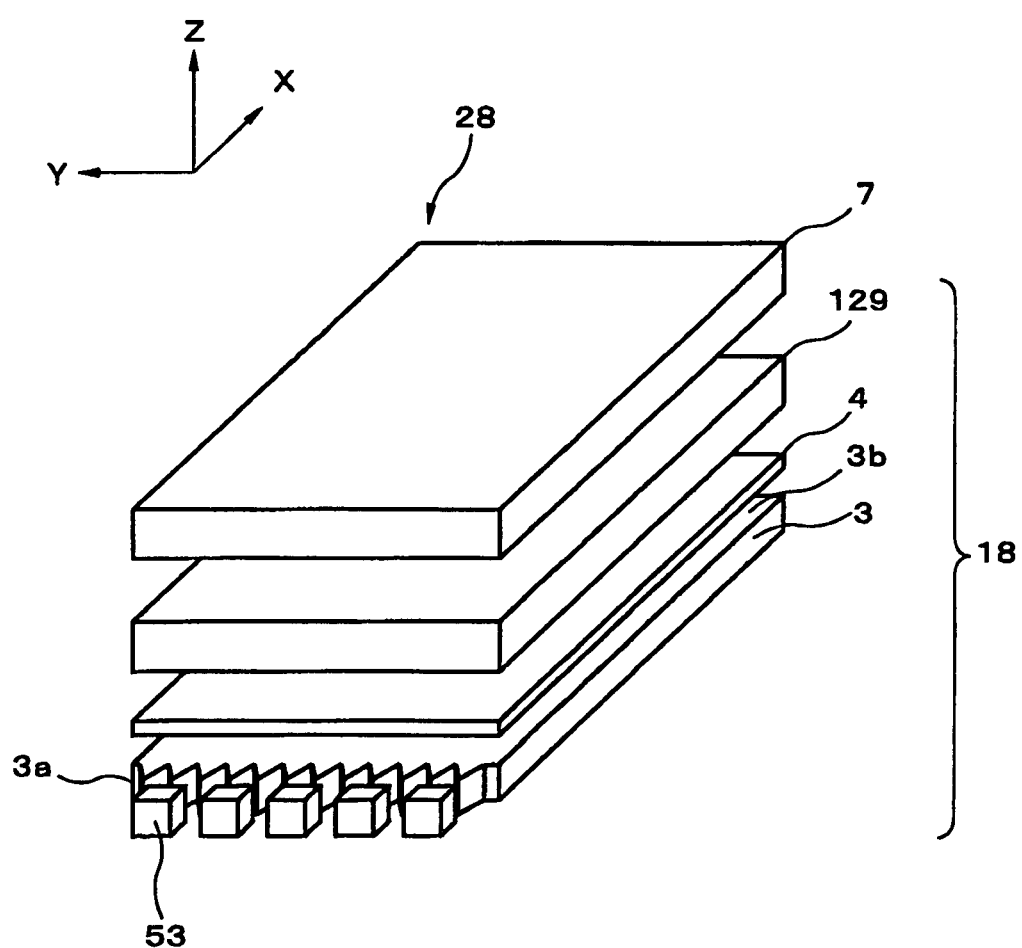
FIG. 35 is a perspective view showing the display device according to Embodiment 9 of the present invention.
Figure 36:
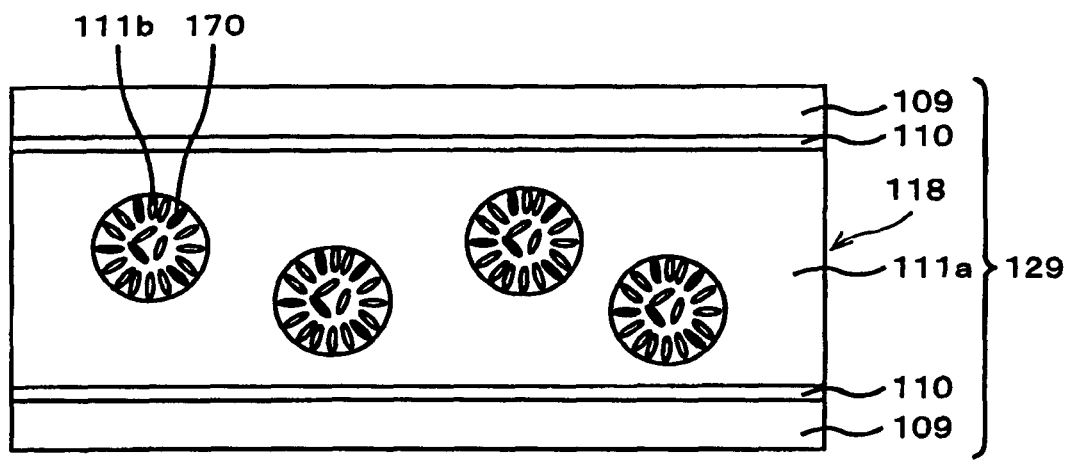
FIG. 36 is a sectional view showing the orientation state of the liquid crystal molecules and the dichroic fluorescent dye molecules when the transparent/scattering state switching element of Embodiment 9 is in the scattering state.
Figure 37:
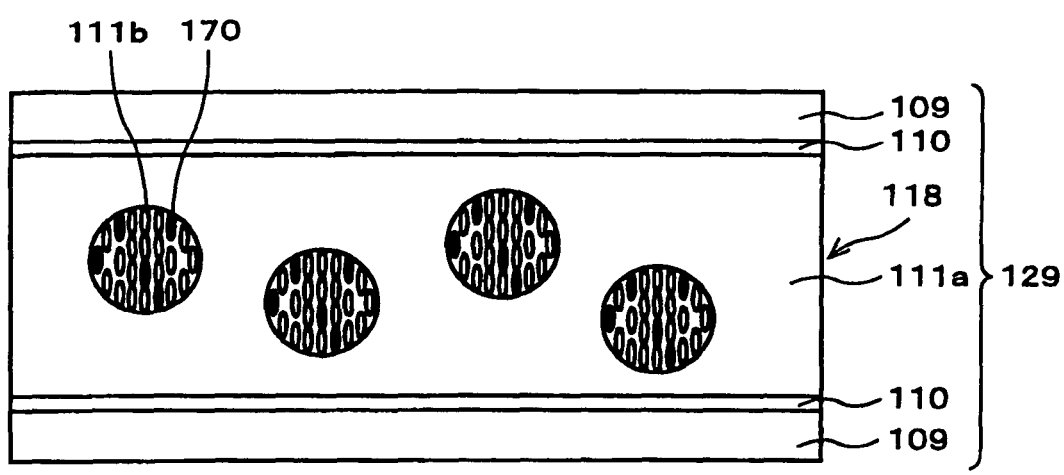
FIG. 37 is a sectional view showing the orientation state of the liquid crystal molecules and the dichroic fluorescent dye molecules when the transparent/scattering state switching element of Embodiment 9 is in the transparent state.

Embodiment 9 of the present invention will next be described. FIG. 35 is a perspective view showing the display device according to Embodiment 9 of the present invention; FIG. 36 is a sectional view showing the orientation state of the liquid crystal molecules and the dichroic fluorescent dye molecules when the transparent/scattering state switching element of the present embodiment is in the scattering state; and FIG. 37 is a sectional view showing the orientation state of the liquid crystal molecules and the dichroic fluorescent dye molecules when the transparent/scattering state switching element of the present embodiment is in the transparent state.

As shown in FIG. 35, the display device 28 and the light source device 18 of Embodiment 9 differ from the display device 2 and the light source device 1 of Embodiment 1 in that a transparent/scattering state switching element 129 is used, and a white LED 53 is used. The transparent substrates 109 and the electrode 110 of the transparent/scattering state switching element 129 have the same structure as in the transparent/scattering state switching element 122 in Embodiment 1, but the transparent/scattering state switching element 129 differs in that a PDLC layer 118 in which dichroic fluorescent dye molecules 170 are introduced is used instead of the PDLC layer 111 in which dichroic dye molecules are introduced. The polymer matrix 111a and the liquid crystal molecules 111b in the PDLC layer 118 in which dichroic fluorescent dye molecules 170 are introduced are the same as in the PDLC layer 111, but the PDLC layer 118 differs from the PDLC layer 111 in that dichroic fluorescent dye molecules 170 are used. The dichroic fluorescent dye molecules 170 are dye molecules that emit light due to fluorescence when irradiated with ultraviolet rays, wherein the light emission is anisotropic. Such dichroic fluorescent dye molecules can be created by introducing a liquid crystal group into a side chain of a fluorescent dye molecule, and the principal chain can be oriented. It is therefore possible to provide strong light emission in a specific direction. The dichroic fluorescent dye molecules 170 in the present embodiment have a narrow rod-shaped molecular structure that is parallel to the molecular major axis direction, and the dichroic fluorescent dye molecules 170 have more pronounced fluorescent light emission characteristics in the molecular minor axis direction than in the molecular major axis direction. The color of the fluorescence is blue. Specifically, blue light is emitted through fluorescence in response to irradiation with ultraviolet rays.

The white LED 53 is an LED whose optical emission spectrum includes ultraviolet rays. An example of such an LED is one that emits ultraviolet light and creates white light by causing three types of phosphors, including red, blue, and green, to emit light. Aspects of the present embodiment other than those described above are the same as in Embodiment 1.

The following description concerns operation of the display device according to the present embodiment thus configured, i.e., the operation of the light source device according to the present embodiment. The operation performed during a wide-angle display will first be described. As shown in FIG. 36, since voltage is not applied to the transparent/scattering state switching element 129 during wide-angle display, and the liquid crystal molecules 111b are oriented in various directions, an extremely small refractive index distribution occurs, and a scattering state is created. Highly directive light emitted from the optical film 4 is thereby uniformly scattered by the transparent/scattering state switching element 129 in a wide angle range, and a wide-angle display is created. At this time, the dichroic fluorescent dye molecules 170 are oriented in various directions in the same manner as the liquid crystal molecules 111b. Specifically, short-wavelength light is strongly scattered by the refractive index distribution of the microstructure, but the dichroic fluorescent dye molecules 170 therein are oriented in various directions in the same manner as the liquid crystal molecules 111b, and short-wavelength fluorescent light is emitted due to the ultraviolet rays of the light source. The light emitted from the transparent/scattering state switching element 129 is thereby provided with the same whiteness as the incident light.

The operations performed during a narrow-angle display will next be described. As shown in FIG. 37, when a voltage is applied to the electrode 110 of the transparent/scattering state switching element 129, an electric field in the Z-axis direction is applied to the PDLC layer 118. This electric field in the Z-axis direction causes the liquid crystal molecules 111b in the PDLC layer 118 to change orientation so that the major axis direction coincides with the Z-axis direction, and the dichroic fluorescent dye molecules 170 also change orientation in the same manner so that the major axis direction thereof coincides with the Z-axis direction. As previously mentioned, since the refractive index of the polymer matrix 111a is set so as to substantially match the refractive index of the liquid crystal molecules 111b in the minor axis direction, no difference in refractive index occurs between the polymer matrix 111a and the liquid crystal molecules 111b in the Z-axis direction. Furthermore, since the dichroic fluorescent dye molecules 170 also change orientation so that the major axis direction thereof coincides with the Z-axis direction, almost no light emitted from fluorescence is observed when the display is viewed from the frontal direction. Furthermore, since a narrower range may be irradiated during narrow-angle display than during wide-angle display, the intensity of the light source is preferably reduced during narrow-angle display in relation to wide-angle display. Since the intensity of the ultraviolet rays is thereby also reduced, fluorescent light emission as such can be suppressed. According to the configuration described above, there is almost no blue light from fluorescent light emission observed in the frontal direction, and it is possible to produce the same color as when the transparent/scattering state switching element 129 is in the scattering state. Specifically, the display can be switched without a color change occurring between the wide-angle display and the narrow-angle display.

Dichroic fluorescent dye molecules can be used in the present embodiment to prevent the color from changing between the wide-angle display and the narrow-angle display. Particularly in comparison to Embodiment 1 of the present invention, since there is no absorption of visible light by the dichroic dye molecules, there is no reduction in luminance, and a bright display can be provided. The present embodiment can therefore be suitably applied in mobile terminal devices in particular.

Correction of color in the present embodiment is dependent on the intensity of the ultraviolet rays emitted by the light source. Therefore, since the intensity of emitted ultraviolet light also decreases when the intensity of the light source is reduced during wide-angle display, the color correction effects are reduced. However, because color becomes less distinguishable as the luminance of the display decreases, no significant problems occur. Dichroic dye molecules may also be jointly used in the same manner as in the aforementioned embodiment.

A case was described in the present embodiment in which dichroic fluorescent dye molecules were used to emit blue fluorescent light, but the present invention is not limited by this configuration. A dichroic fluorescent dye that emits fluorescent light of a color other than blue may also be used in the same configuration as that of the aforementioned embodiment. Not only may rod-shaped molecules be used, but disk-shaped molecules may also be used. Operations and effects of Embodiment 9 other than those described above are the same as in Embodiment 1.

Figure 38:
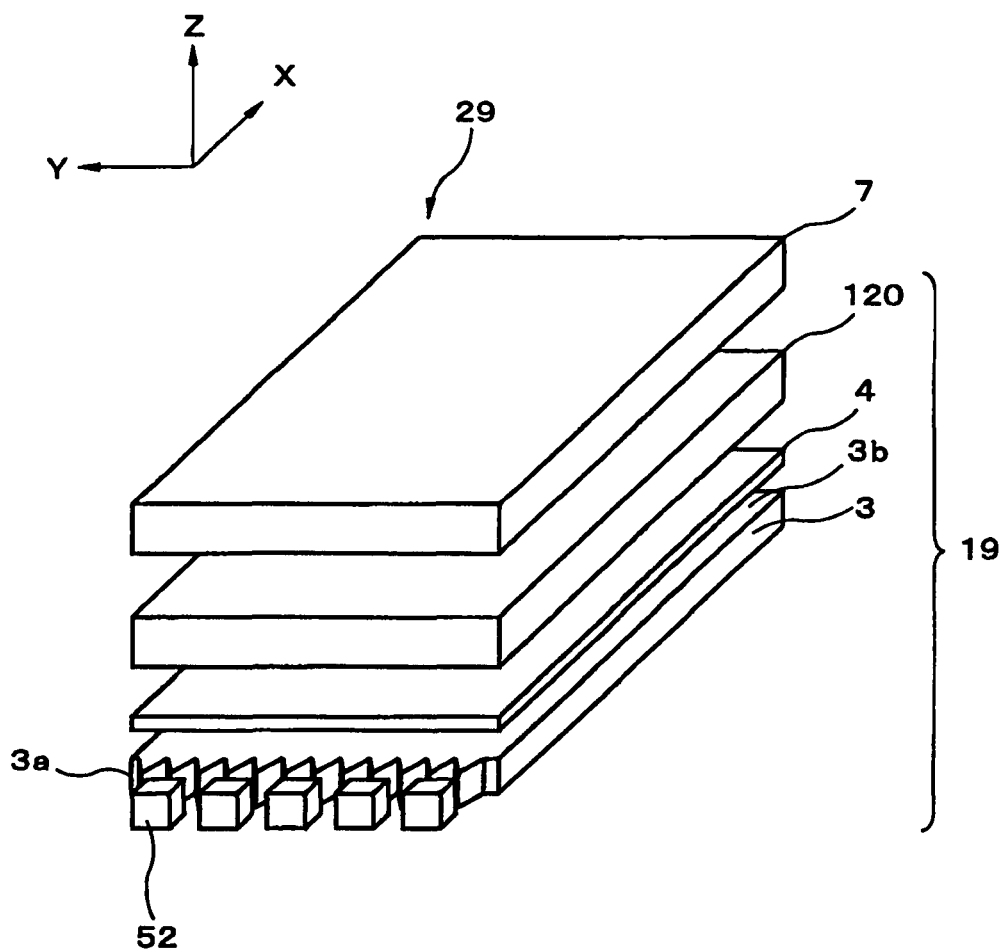
FIG. 38 is a perspective view showing the display device according to Embodiment 10 of the present invention.
Figure 39:
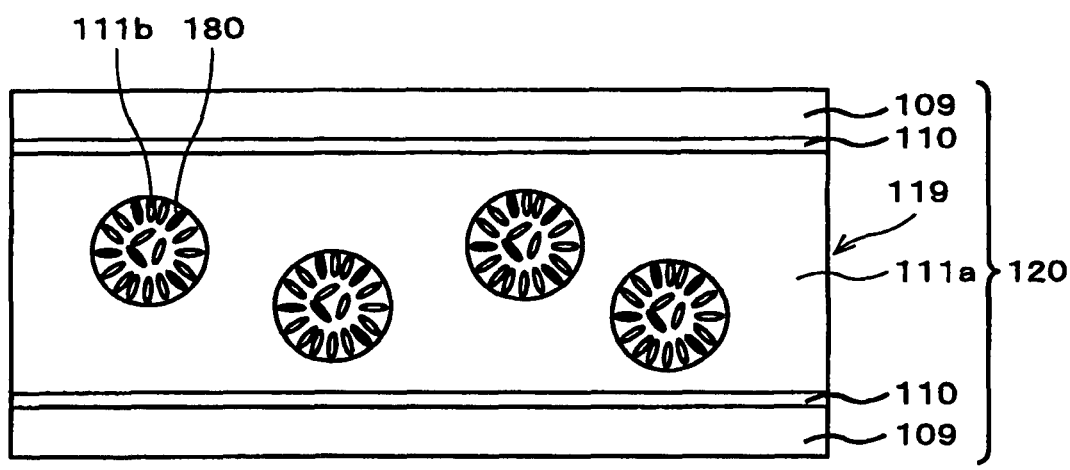
FIG. 39 is a sectional view showing the orientation state of the liquid crystal molecules and the dichroic fluorescent dye molecules when the transparent/scattering state switching element of Embodiment 10 is in the scattering state.
Figure 40:
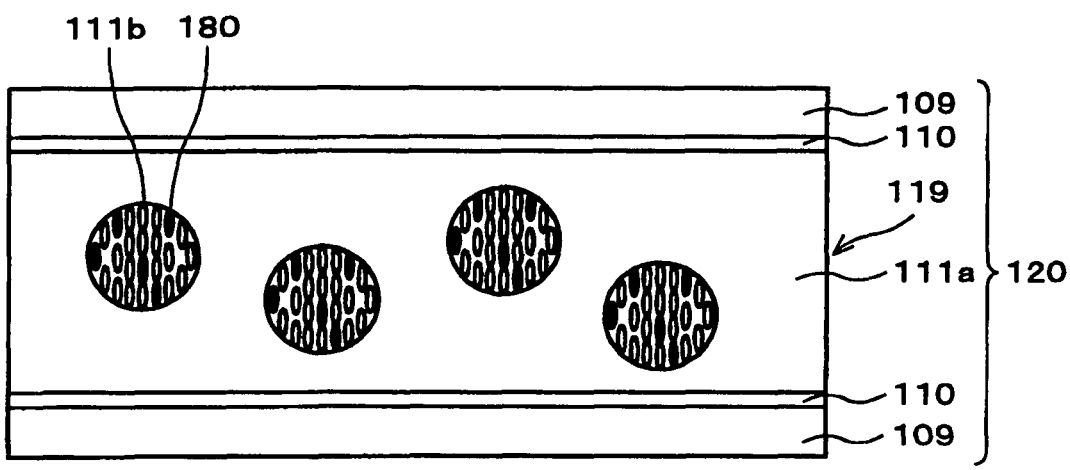
FIG. 40 is a sectional view showing the orientation state of the liquid crystal molecules and the dichroic fluorescent dye molecules when the transparent/scattering state switching element of Embodiment 10 is in the transparent state.

Embodiment 10 of the present invention will next be described. FIG. 38 is a perspective view showing the display device according to Embodiment 10 of the present invention; FIG. 39 is a sectional view showing the orientation state of the liquid crystal molecules and the dichroic fluorescent dye molecules when the transparent/scattering state switching element of the present embodiment is in the scattering state; and FIG. 40 is a sectional view showing the orientation state of the liquid crystal molecules and the dichroic fluorescent dye molecules when the transparent/scattering state switching element of the present embodiment is in the transparent state.

As shown in FIG. 38, the display device 29 and the light source device 19 of Embodiment 10 differ from the display device 2 and the light source device 1 of Embodiment 1 in that a transparent/scattering state switching element 120 is used, and a blue LED 52 is used. The transparent substrates 109 and the electrode 110 of the transparent/scattering state switching element 120 have the same structure as in the transparent/scattering state switching element 122 in Embodiment 1, but the transparent/scattering state switching element 120 differs in that a PDLC layer 119 in which luminescent liquid crystal molecules 180 are introduced is used instead of the PDLC layer 111 in which dichroic dye molecules are introduced. The polymer matrix 111a and the liquid crystal molecules 111b in the PDLC layer 119 in which luminescent liquid crystal molecules 180 are introduced are the same as in the PDLC layer 111, but the PDLC layer 119 differs from the PDLC layer 111 in that luminescent liquid crystal molecules 180 are used. The luminescent liquid crystal molecules 180 are a type of molecule that emits light when a charge is injected through an electric field, but since the molecular structure is also anisotropic in the same manner as normal liquid crystal molecules, light can be emitted at different intensities in the major axis direction and the minor axis direction of the molecules. The luminescent liquid crystal molecules 180 in the present embodiment have a narrow rod-shaped molecular structure that is parallel to the molecular major axis direction, and the luminescent liquid crystal molecules 180 have more pronounced light emission characteristics in the molecular minor axis direction than in the molecular major axis direction. The color of the emitted light is yellow. Specifically, yellow light is emitted in the molecular minor axis direction when an electric field is applied. Aspects of the present embodiment other than those described above are the same as in Embodiment 1.

The following description concerns operation of the display device according to the present embodiment thus configured, i.e., the operation of the light source device according to the present embodiment. The operation performed during a wide-angle display will first be described. As shown in FIG. 39, since voltage is not applied to the transparent/scattering state switching element 120 during wide-angle display, and the liquid crystal molecules 111b are oriented in various directions, an extremely small refractive index distribution occurs, and a scattering state is created. Highly directive light emitted from the optical film 4 is thereby uniformly scattered by the transparent/scattering state switching element 120 in a wide angle range, and a wide-angle display is created. At this time, the luminescent liquid crystal molecules 180 are oriented in various directions in the same manner as the liquid crystal molecules 111b. Specifically, although the introduced luminescent liquid crystal molecules 180 are oriented in various directions in the same manner as the liquid crystal molecules 111b, an electric field is not applied, and light is therefore not emitted. As a result, short-wavelength light in the light of the blue LED 52 is strongly scattered by the refractive index distribution of the microstructure, and the light is emitted as white light from the transparent/scattering state switching element 120.

The operation performed during a narrow-angle display will next be described. As shown in FIG. 40, when a voltage is applied to the electrode 110 of the transparent/scattering state switching element 120, an electric field in the Z-axis direction is applied to the PDLC layer 119. This electric field in the Z-axis direction causes the liquid crystal molecules 111b in the PDLC layer 119 to change orientation so that the major axis direction coincides with the Z-axis direction, and the luminescent liquid crystal molecules 180 also change orientation in the same manner so that the major axis direction thereof coincides with the Z-axis direction. As previously mentioned, since the refractive index of the polymer matrix 111a is set so as to substantially match the refractive index of the liquid crystal molecules 111b in the minor axis direction, no difference in refractive index occurs between the polymer matrix 111a and the liquid crystal molecules 111b in the Z-axis direction. Furthermore, since the luminescent liquid crystal molecules 180 also change orientation so that the major axis direction thereof coincides with the Z-axis direction, yellow light is emitted in the frontal direction. According to the configuration described above, a mixture of the light from the blue LED 52 and the yellow light emitted by the luminescent liquid crystal molecules 180 is observed from the frontal direction, and white light is created. This configuration makes it possible to obtain the same color as the color produced when the transparent/scattering state switching element 120 is in the scattering state. Specifically, the display can be switched without a color change occurring between the wide-angle display and the narrow-angle display.

In the present embodiment, luminescent liquid crystal molecules can be used to prevent a color change from occurring between the wide-angle display and the narrow-angle display. Particularly in comparison to Embodiment 1 of the present invention, since there is no absorption of visible light by the dichroic dye molecules, there is no reduction in luminance, and a bright display can be provided. Unlike Embodiment 9 of the present invention, there is also no dependence on the light source. Dichroic dye molecules may also be jointly used in the same manner as in the aforementioned embodiment.

A case was described in the present embodiment in which the transparent/scattering state switching element was in the transparent state when a voltage was applied, but it is apparent that a white light source and luminescent liquid crystal molecules that emit blue light are preferably used in the case of a transparent/scattering state switching element that is in the scattering state when a voltage is applied. The reason for this is that during the transparent state in which a voltage is not applied, because light is not emitted by the luminescent liquid crystal molecules, and there is no color change due to scattering, the white light of the light source is emitted without modification. In the scattering state in which a voltage is applied, the scattering in the scattering-induced short-wavelength band is corrected by the blue color of light emitted by the luminescent liquid crystal molecules, and white light is emitted.

Furthermore, simple luminescent molecules whose light emission direction is not anisotropic may also be used instead of the luminescent liquid crystal molecules in the present embodiment. In this case, the luminescent molecules may be mixed in the polymer matrix of the PDLC layer. Operations and effects in Embodiment 10 other than those described above are the same as in Embodiment 1.

The embodiments described above may be implemented independently, or may be implemented in a suitable combination thereof.

Examples of display devices in which the present invention can be advantageously used include the display devices of mobile phones, PDAs, gaming devices, digital cameras, video cameras, video players, and other portable terminal devices; and the display devices of notebook computers, cash dispensers, vending machines, and other terminal devices.

What is claimed is:

1. A display panel comprising:
    a light source for emitting white light in a plane;
    a transparent/scattering state switching element which includes a liquid crystal layer, the liquid crystal layer including liquid crystal molecules and a blue dichroic dye of which orientation states are changed by voltage application, and the transparent/scattering state switching element being capable of switching between a transparent state for transmitting the white light emitted from the light source and a scattering state for scattering the white light by changing the orientation state of the liquid crystal molecules; and
    a transmissive liquid crystal display panel that transmits light emitted from the transparent/scattering state switching element to thereby add an image to the light,
    wherein a wide-angle display and a narrow-angle display are switched upon switching between the transparent state and the scattering state of the transparent/scattering state switching element,
    wherein the liquid crystal molecules have a characteristic of scattering more light in a blue wavelength band than light in other wavelength bands out of incident white light from the light source in the scattering state, and
    wherein the blue dichroic dye whose light absorption in the blue wavelength band is weaker than light absorption in the other wavelength bands is included in such an amount so as to compensate for the light in a blue wavelength band that has been more scattered by the liquid crystal molecules and to correct a color of the light emitted by the transparent/scattering state switching element into white color, same as incident light, when the transparent/scattering state switching element switches from the transparent state to the scattering state, thereby preventing a change in the color of the light emitted by the transparent/scattering state switching element at the time of switching between the transparent state and the scattering state.

2. The display panel according to claim 1, wherein said liquid crystal layer is a polymer-dispersed liquid crystal layer in which regions of the liquid crystal molecules are dispersed in a polymer film.

3. The display panel according to claim 2, wherein said blue dichroic dye is disposed in a region of said liquid crystal molecules.

4. The display panel according to claim 2, wherein said liquid crystal molecules in said polymer-dispersed liquid crystal layer comprise a rod-shaped molecular structure and positive dielectric anisotropy,
    wherein a refractive index of said polymer film is substantially equal to a refractive index of said liquid crystal molecules in a minor axis direction,
    wherein said dichroic dye comprises a rod-shaped molecular structure, and exhibits a stronger blue color when viewed from a molecular minor axis direction than when viewed from a molecular major axis direction, and
    wherein the polymer-dispersed liquid crystal layer is driven by a vertical electric field.

5. The display panel according to claim 1, wherein said liquid crystal molecules in said polymer-dispersed liquid crystal layer comprise a rod-shaped molecular structure and positive dielectric anisotropy,
    wherein a refractive index of said polymer film is substantially equal to a refractive index of said liquid crystal molecules in a minor axis direction,
    wherein said blue dichroic dye comprises a rod-shaped molecular structure, and exhibits a stronger yellow color when viewed from a molecular minor axis direction than when viewed from a molecular major axis direction, wherein said transparent/scattering state switching element has comb-shaped electrodes, and the polymer-dispersed liquid crystal layer is driven by a horizontal electric field generated between the comb-shaped electrodes, and wherein a light-incident surface of the polymer-dispersed liquid crystal layer has a polarizing plate whose transmission axis is disposed in the electric field direction of the polymer-dispersed liquid crystal layer.

6. The display panel according to claim 1, comprising a light-direction regulating element for regulating a direction of a light emitted from said planar light source unit and emitting the light to said transparent/scattering state switching element.

7. A terminal device comprising the display device according to claim 1.

8. The terminal device according to claim 7, wherein the device comprises at least one of a mobile phone, a personal information terminal, a gaming device, a digital camera, a video camera, a video player, a notebook-type personal computer, a cash dispenser, and a vending machine.

9. The display panel according to claim 1, wherein, in the transparent state, the blue dichroic dye comprise a substantially parallel alignment facing normal to a light emitting surface and light receiving surface of the transparent/scattering state switching element.

* * * * *